(12) United States Patent
Ahn

(10) Patent No.: US 6,980,609 B1
(45) Date of Patent: Dec. 27, 2005

(54) MATCHED FILTER, FILTERING METHOD AND DIGITAL BROADCAST RECEIVER USING THE SAME

(75) Inventor: Keun Hee Ahn, Inchon-Kwangyokshi (KR)

(73) Assignee: LG Electronics Inc., Seoul (KR)

( * ) Notice: Subject to any disclaimer, the term of this patent is extended or adjusted under 35 U.S.C. 154(b) by 823 days.

(21) Appl. No.: 09/645,437

(22) Filed: Aug. 25, 2000

(30) Foreign Application Priority Data

Aug. 25, 1999 (KR) .............................. 1999/35453

(51) Int. Cl.[7] .......................... H03D 1/00; H04L 27/06
(52) U.S. Cl. ...................... 375/343; 375/341; 375/342
(58) Field of Search ................ 375/232, 326, 375/343, 350; 708/314, 323

(56) References Cited

U.S. PATENT DOCUMENTS

| | | | | |
|---|---|---|---|---|
| 5,555,268 A | * | 9/1996 | Fattouche et al. | 375/141 |
| 5,745,525 A | * | 4/1998 | Hunsinger et al. | 375/285 |
| 5,802,102 A | * | 9/1998 | Davidovici | 375/152 |
| 5,872,815 A | * | 2/1999 | Strolle et al. | 375/321 |
| 6,055,281 A | * | 4/2000 | Hendrickson et al. | 375/329 |
| 6,192,088 B1 | * | 2/2001 | Aman et al. | 375/326 |
| 6,426,972 B1 | * | 7/2002 | Endres et al. | 375/229 |

* cited by examiner

Primary Examiner—Jay K. Patel
Assistant Examiner—Qutub Ghulamali
(74) Attorney, Agent, or Firm—Birch, Stewart, Kolasch & Birch, LLP

(57) ABSTRACT

A digital passband matched filter is automatically adapted to a carrier wave ω in accordance with a frequency offset of the carrier wave, to obtain a passband digital signal having no frequency distortion due to the frequency offset. Thus, a receiver in which drawbacks such as decrease of SNR and increase of circuit complexity caused by the fixed baseband/passband matched filter is obtained. Since a cosine wave generating section operates in a carrier wave frequency restoring mode and a carrier wave frequency adaptive mode, respectively, a single cosine wave ROM table can be used regardless of the respective operating modes, thereby reducing circuit complexity. Since the digital passband matched filter acts to renew the filter coefficients adapted to the carrier wave adaptive mode only, power consumption required to operate the filter can be minimized.

32 Claims, 32 Drawing Sheets

$COS(\omega) = COS(\omega_C + \Delta\omega)$ : cosine
$SIN(\omega) = SIN(\omega_C + \Delta\omega)$ : sine
$\omega = (\omega_C + \Delta\omega)$ = carrier frequency
$\omega_C$ = center frequency of carrier frequency
$\Delta\omega$ = frequency offset of carrier frequency

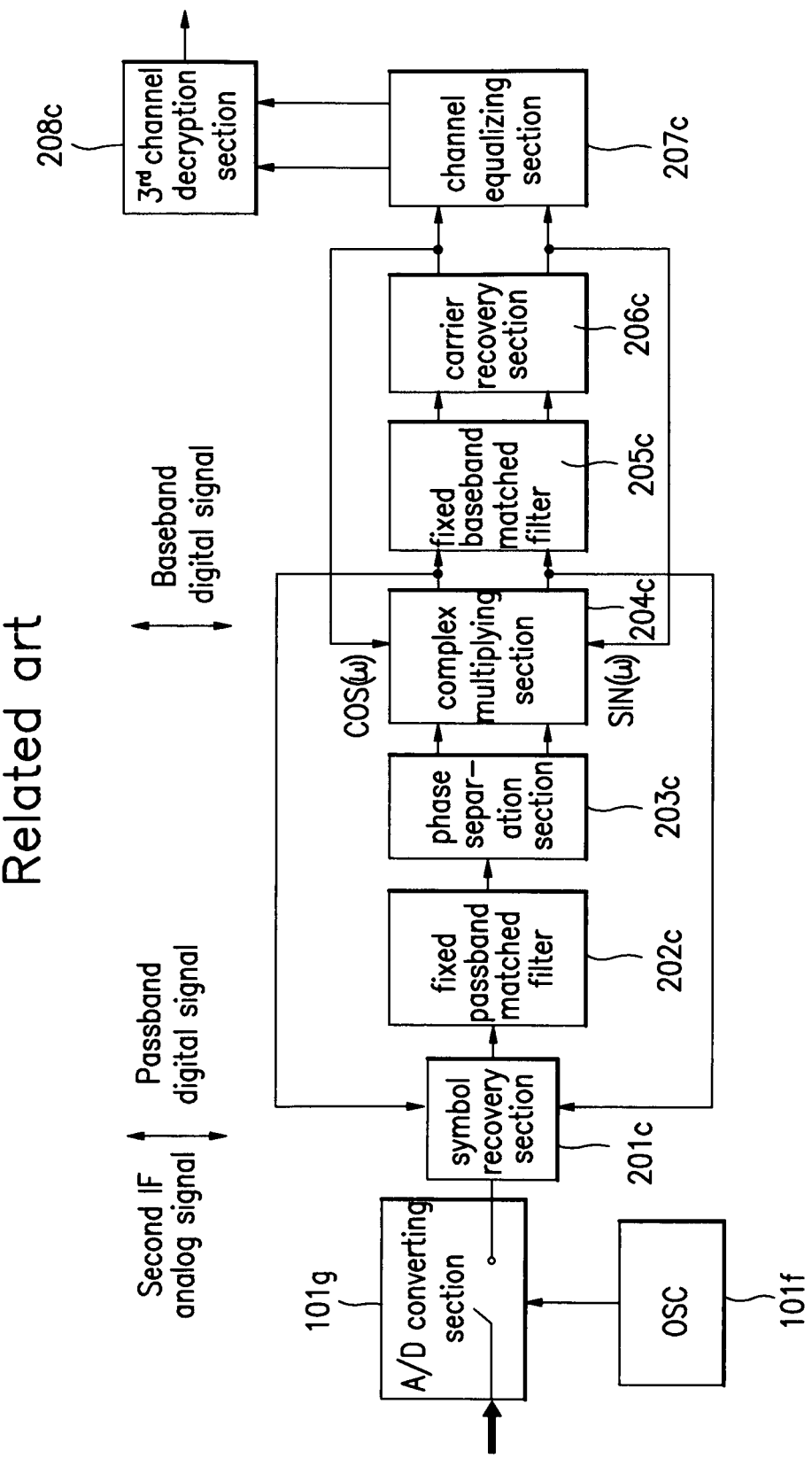

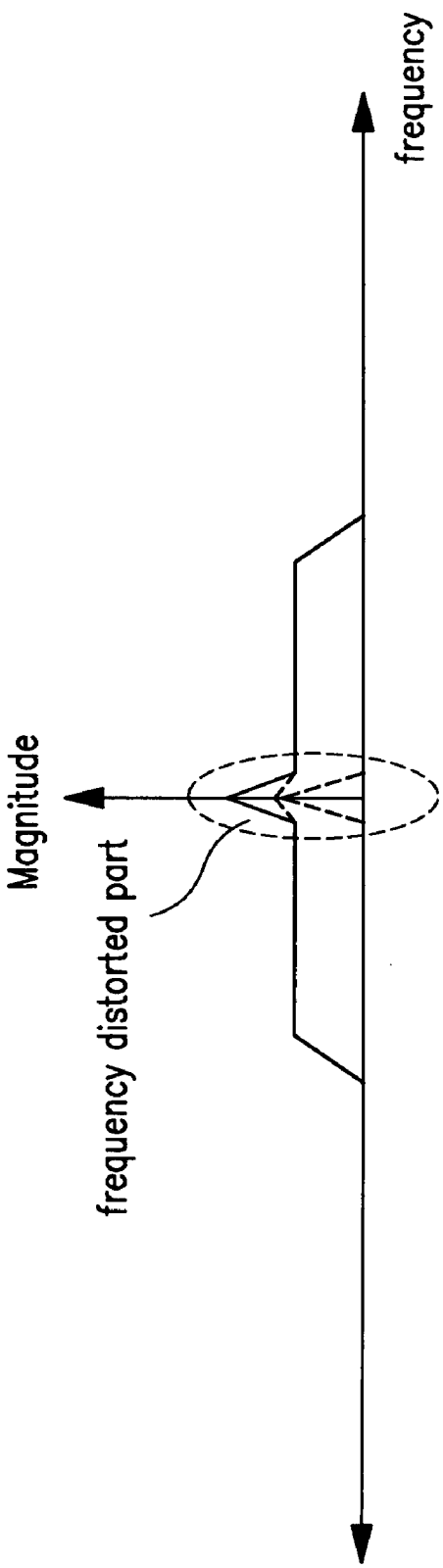

–●●–: input signal frequency response of a fixed passband filter
–✦✦–: distorted output signal frequency response
of a fixed passband matched filter

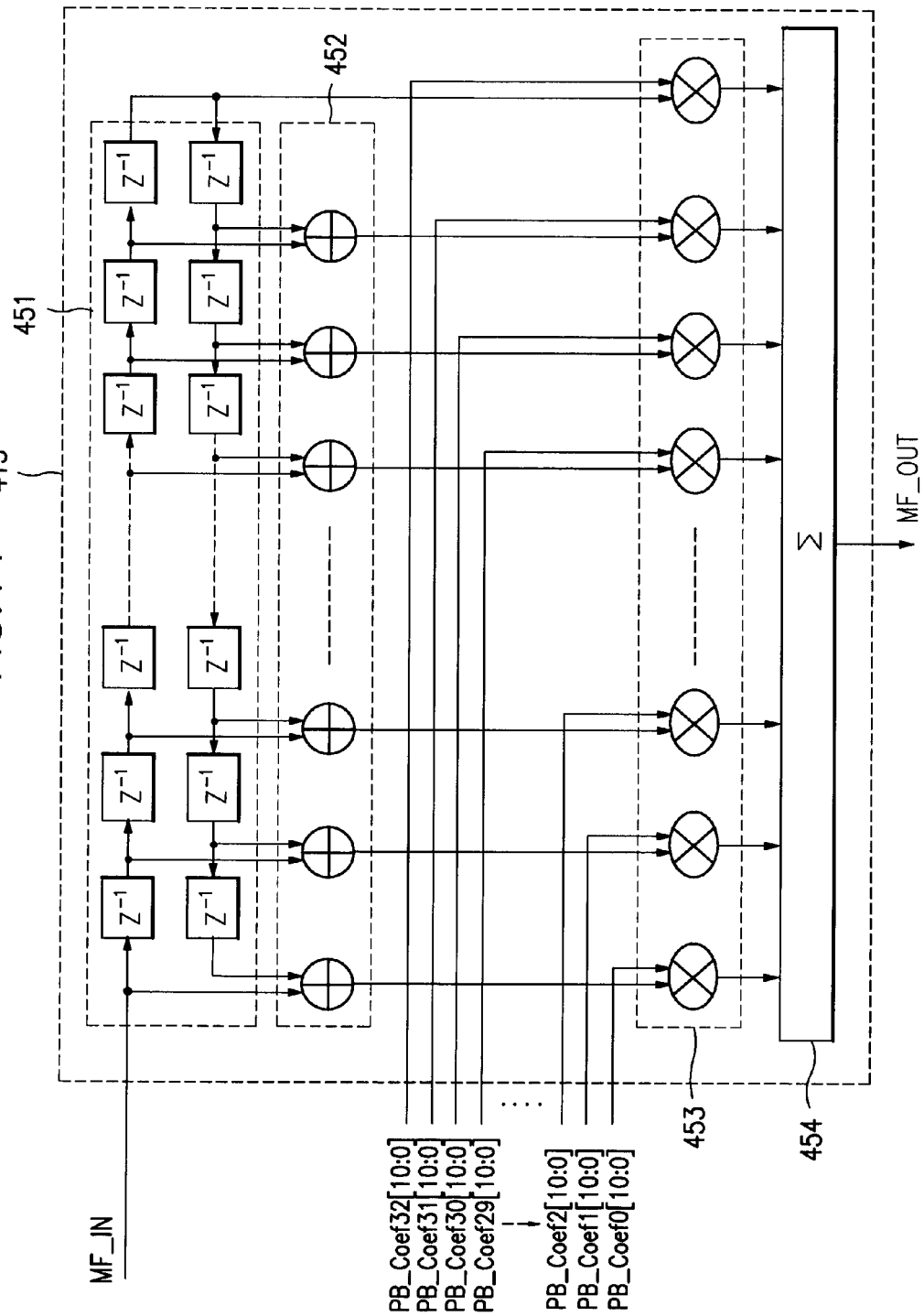

frequency response for
fixed baseband matched filter cosine frequency response
having a carrier frequency
$\omega = (\omega_c + \Delta\omega) > \omega$ matched filter frequency
response automatically adapted
carrier frequency

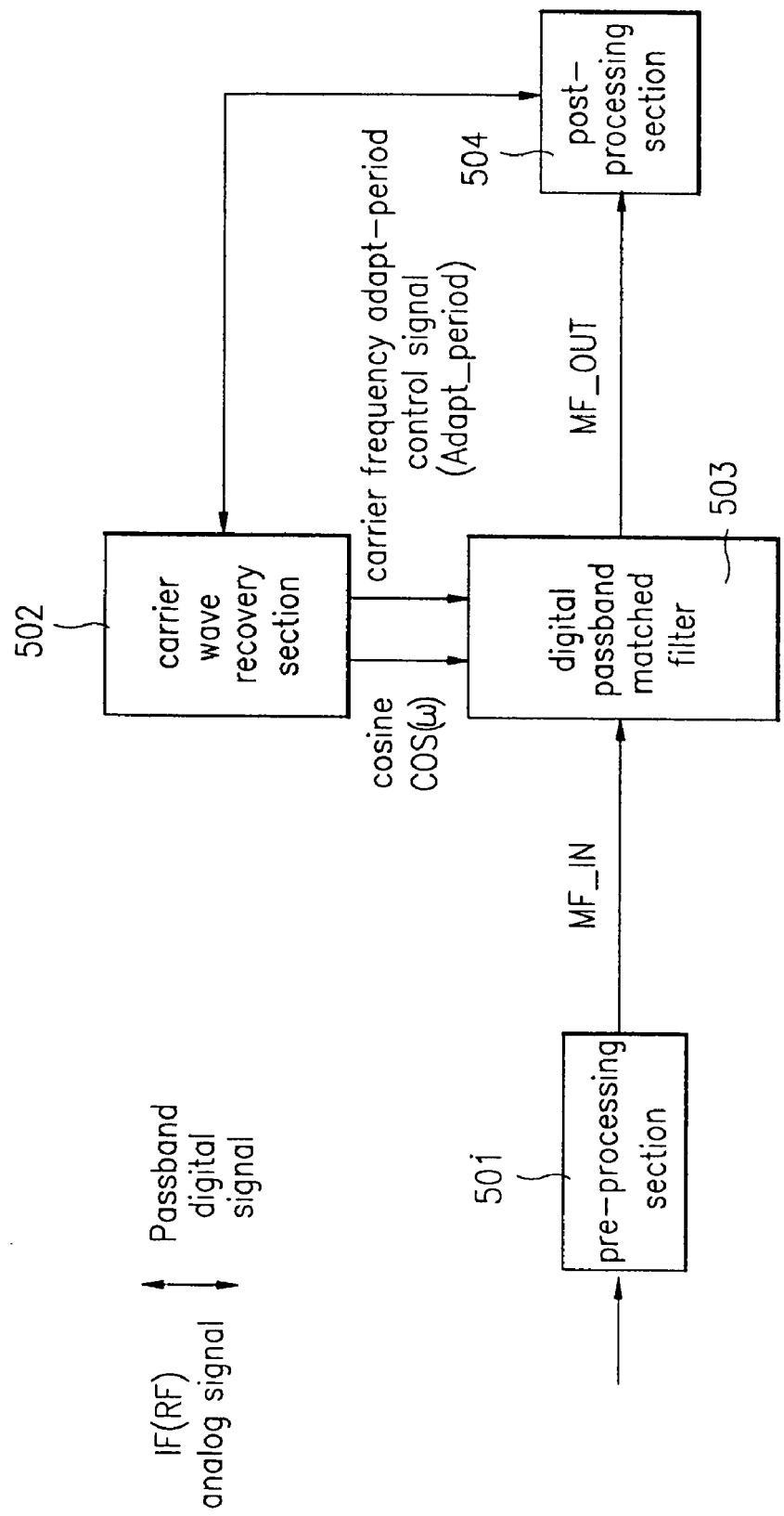

MATCHED FILTER, FILTERING METHOD AND DIGITAL BROADCAST RECEIVER USING THE SAME

BACKGROUND OF THE INVENTION

1. Field of the Invention

The present invention relates to a digital broadcast receiver, and more particularly to a matched filter of a digital passband which is variable depending on the recovery result of a carrier wave, and a filtering method and a digital broadcast receiver using the same.

2. Description of the Related Art

A digital broadcast receiving technology currently being developed through diverse media (ground wave, cable, satellite) is oriented toward an integrated system structure for integrated digital broadcasting.

In particular, the transmission system of a digital TV (e.g., HDTV) transmitting data at a high bit rate of more than about 20 Mb/s through band-limited 6 MHz requires a modulation/demodulation method of high band efficiency.

Further, the transmission system of a digital TV further requires a channel equalizer to compensate for non-ideal characteristics of a channel such as a symbol/carrier wave for recovery of a symbol and a carrier, multi-path or a Doppler effect, and a highly efficient channel decryption method for reliable transmission in the presence of jitter.

The integrated multimedia digital broadcast receiver is roughly divided into the following three receiving methods.

1) Ground Wave Receiving Method:
VSB (vestigial side band; SSB; ATSC: U.S. style)
OFDM (orthogonal frequency division multiplexing; DSB: European style)

2) Cable Broadcast Receiving Method:
QAM (quadrature amplitude modulation; DSB)

3) Satellite Broadcast Receiving Method:
QPSK (quadrature phase shift keying, DSB)

Depending on the receiving methods described above, different technical elements such as an analog receiving section, signal synchronizing method, channel equalizing method, matched filter, an channel decryption method constitute a technology.

However, it is critical to select sharable functions from the above technical elements to develop an optimal multimedia digital broadcast receiver.

FIG. 1 is a block diagram showing a multimedia digital broadcast receiver in general. Referring to FIG. 1, the multimedia digital broadcast receiver comprises an analog receiving section 101 for receiving and converting a radio frequency (RF) to an intermediate frequency (IF), and a digital demodulation section 102 for digitalizing the IF signal.

The analog receiving section comprises: a tuner 101a for converting and outputting an RF signal of 50–860 MHz to a first IF signal; a surface acoustic wave (SAW) for filtering a signal outputted from the tuner 101a; a first oscillator 101c for generating an oscillating frequency to generate a second IF signal; a mixer 101d for down-converting the signal filtered by the SAW to an oscillating frequency generated from the first oscillator 101c and converting the down-converted oscillating frequency to a second IF signal; an automatic gain control (AGC) amplifying section 101e for compensating for a gain of the second IF signal outputted from the mixer 101d; a second oscillator 101f for generating a sampling frequency; and an analog/digital (A/D) converting section 101g for converting the signal amplified by the ACG amplifying section 101e to a digital signal in accordance with the sampling frequency generated from the second oscillator 101f.

In the general multimedia digital broadcast receiver constituted as above, the analog receiving section 101 receives and converts the RF signal to the IF signal in output thereof.

To be specific, the tuner 101a in the analog receiving section 101 converts the RF signal of 50–860 MHz to the first IF signal of 44 MHz, and outputs the same to the SAW filter 101b employed for the purpose of removing the adjacent channel signal and jitter signal of the carrier wave from the I, Q baseband digital signals outputted from the complex number multiplying section 204b (see FIG. 2b).

Taking as an example for the digital broadcast signal, the SAW filter 101b removes all the interval from an output of the tuner 101a except the band of 6 MHz where information exists so as to be outputted to the mixer 101d.

Meanwhile, the first oscillator 101c generates an oscillating frequency for generating the second IF signal. The mixer 101d down-converts the signal filtered by the SAW filter 101b to the oscillating frequency of the first oscillator 101c, and converts the down-converted oscillating frequency to the second IF signal to be outputted to the AGC amplifying section 101e.

The AGC amplifying section 101e compensates for a gain of the second IF signal outputted from the mixer 101d to be outputted to the A/D converting section 101g. Since the signal passed through the SAW filter 101b is weak, the AGC amplifying section 101e compensates for an output of the SAW filter 101b with a signal gain such that the A/D converting section 101g at the tail end can convert an analog signal to a digital signal.

At this stage, the second oscillator 101f generates a sampling frequency for sampling the second IF signal. The A/D converting section 101g converts the signal amplified by the AGC amplifying section 101e to a digital signal in accordance with the sampling frequency generated from the second oscillator 101f.

The digital demodulation section 102 demodulates the digital signal converted by the analog receiving section 101, and outputs a resultant signal.

Of the constitutional elements of the multimedia digital broadcast receiver, the analog receiving section 101 has a typical structure regardless of a demodulation method, as shown in FIG. 1.

The digital demodulation section 102 has diverse configurations depending on the method of demodulation (VSB, OFDM, QAM, QPSK, etc.). The symbol recovery section, matched filter, phase separation section, carrier wave recovery section, channel equalizing section and the channel decryption section are the basic technical elements of the diverse kinds of digital demodulators.

The matched filter normally has characteristics of a dual filter structure, i.e., a fixed baseband matched filter and a fixed passband matched filter.

The digital demodulator can be embodied in three structures according to the structural characteristics of the matched filter, as shown in FIGS. 2a to 2c.

FIG. 2a is a schematic view of an OFDM/QAM/QPSK digital demodulator including a fixed baseband matched filter. FIG. 2b is a schematic view of an 8VSB digital demodulator including a fixed passband matched filter. FIG. 2c is a schematic view of a VSB (OFDM)/QAM/QPSK digital demodulator including both the fixed passband matched filter and the fixed baseband matched filter.

The OFDM/QAM/QPSK digital demodulator in FIG. 2a comprises first and a second complex number multiplying sections 201a, 202a, a symbol recovery section 203a, a fixed baseband matched filter 204a, a carrier wave recovery section 205a, channel equalizing section 206a and a channel decryption section 207a. The output of the fixed baseband matched filter 204a is fed back to the symbol recovery section 203a, while the output of the carrier wave recovery section 205a is fed back to the first and the second complex number multiplying sections 201a, 202a.

The 8VSB digital demodulator in FIG. 2b comprises a symbol recovery section 201b, fixed passband matched filter 202b, phase separation section 203b, complex number multiplying section 204b, carrier wave recovery section 205b, channel equalizing section 206b and a channel decryption section 207b. The output of the complex number multiplying section 204b is fed back to the symbol recovery section 201b, while the output of the carrier wave recovery section 205b is fed back to the complex number multiplying section 204b.

The VSB (OFDM)/QAM/QPSK digital demodulator in FIG. 2c comprises a symbol recovery section 201c, fixed passband matched filter 202c, phase separation section 203c, complex number multiplying section 204c, fixed baseband matched filter 205c, carrier wave recovery section 206c, channel equalizing section 207c and a channel decryption section 208c. The output of the complex number multiplying section 204c is fed back to the symbol recovery section 201c, while the output of the carrier wave section 206c is fed back to the complex number multiplying section 204c.

FIGS. 6a to 6c are schematic views illustrating an impulse response and a frequency response of the conventional fixed baseband matched filter and the fixed passband matched filter in 65-tap size of a symmetrical structure. Referring to FIGS. 6a to 6c, the roll-off factor of the fixed baseband matched filter and the fixed passband matched filter is 0.12, while their signal band is 6 MHz. The intermediate frequency of the fixed passband matched filter C is 5 MHz with a sampling frequency of 20 MHz. To be specific, FIG. 6b shows an impulse response of the fixed baseband matched filter and the fixed passband matched filter, in which the horizontal axis represents a frequency, while the vertical axis represents a decibel value.

As the basic technical elements of the digital demodulators are similar to each other as shown in FIGS. 2a to 2c, the 8VSB digital demodulator in FIG. 2b will be exemplified as an embodiment hereinafter.

The symbol recovery section 201b receives timing errors fed back by a re-sampler through baseband signal processing, and interpolates the timing error to the direction of reducing the errors between the digital signals outputted from the A/D converting section 101g which outputs the signal to the fixed passband matched filter 202b.

The fixed passband matched filter 202b filters the signal, which has been symbol-synchronized and outputted by the symbol recovery section 201b, and readjusts the signal to maximize the SNR at the symbol position.

In theory, receiving filters have characteristics of a rectangular band, and cannot realize the shape of a receiving filter having an infinite time delay. Thus, the detecting procedure in a system having such characteristics is quite sensitive to even a slight timing error, and although an inter-symbol influence can be avoided at an accurate sampling time, inter-symbol interference occurs where a slight error exists. Accordingly, a slight excess bandwidth is required to realize the system. For that purpose, the matched filter 202b is generally used for the digital demodulation section 102.

The output of the matched filter 202b is inputted to the phase separation section 203b, and is separated to an I signal and a Q signal to be outputted to the complex number multiplying section 204b. The complex number multiplying section 204b receives restored and fed-back carrier waves COS and SIN, which have been multiplied by the I, Q passband digital signals of the phase separation section 203b, and transfers the I, Q passband digital signals to the complex multiplying section 204b where the I, Q baseband digital signals are fed back to the symbol recovery section 201b and outputted to the carrier wave recovery section 205b.

The carrier wave recovery section 205b removes a frequency offset and phase jitter of the carrier wave from the I, Q baseband digital signals outputted from the complex multiplying section 204b, and feeds back the signals to the corresponding $COS(\omega)$ and $SIN(\omega)$ inputs of the complex number multiplying section 204b, while outputting the I, Q baseband digital signals with restored frequency offset and phase jitter to the channel equalizing section 206b.

The channel equalizing section 206b removes the inter-symbol interference caused by multi-paths from the signals restored by the carrier wave recovery section 205b to be outputted to the channel decryption section 207b. Thus, in a digital transmission system such as an HDTV, a transmission signal causes a bit detection error at the receiver due to the signal distortion generated due to passing through a channel, interruption by an NTSC signal, or distortion caused by a transmission/receipt system. In particular, the radio wave of the signal traveling through multi-paths causes an inter-symbol interference, which becomes a major cause of bit detection errors. Accordingly, the channel equalizing section 206b removes the inter-symbol interference.

The channel decryption section 207b removes a burst jitter and a sporadic jitter existing in the channel that is contained in the signal, from which the inter-symbol interference has been removed by the channel equalizing section 206b to be outputted for recovery of the transmission symbol.

Thus, the conventional digital demodulators, which are embodied in three structures as shown in FIGS. 2a to 2c in accordance with the structural characteristics of a filter in the form of a matched filter, poses the following problems.

First, the digital demodulator shown in FIG. 2a that uses a fixed baseband matched filter of two channels and a re-sampler of two channels is compatible with the OFDM/QAM/QPSK demodulation method but incompatible with any of the VSB demodulation methods. To be specific, if a baseband matched filter is used, the VSB demodulation method having single side band (SSB) characteristics causes a frequency distortion around DC, as shown in FIGS. 3a and 3b, when demodulating a passband signal to a baseband signal. Moreover, circuit complexity drastically increases due to a requirement of the fixed baseband matched filter of two channels and the re-sampler of two channels.

In other words, FIG. 3a shows frequency characteristics of the VSB passband digital signal of FIG. 2b, while FIG. 3b shows frequency characteristics of a VSB baseband digital signal appearing after filtering the demodulated passband VSB digital signal by means of the fixed baseband matched filter. FIG. 3b shows frequency distortion characteristics around the DC. Such a frequency distortion deteriorates an SNR performance of the demodulator, and places a burden on the channel equalizing section.

The VSB digital demodulator using the fixed baseband matched filter of a single channel and the re-sampler of a single channel as shown in FIG. 2b is incompatible with all the VSB (OFDM)/QAM/QPSK demodulation methods. To be specific, since the passband digital signal, for which a carrier wave has not been recovered as shown in FIG. 4a, is used for an input of the fixed baseband matched filter, an output spectrum of the passband digital signal passed through the fixed baseband matched filter has distorted frequency characteristics corresponding to the carrier frequency offset. Such a spectrum distortion of the passband digital output signal causes an inter-symbol interruption, thereby resulting in an increase of the additive white Gaussian noise (AWGN), which is a major cause of bit detection errors as well as a deterioration of a bit error rate (BER) and a signal to noise ratio (SNR) as shown in FIG. 5. Therefore, a demodulator including a fixed passband matched filter is incompatible with any of the VSB (OFDM)/QAM/QPSK demodulation methods.

FIG. 4a shows frequency characteristics of input data having a frequency response of the fixed passband matched filter and a frequency offset (−1000 KHz). FIG. 4b shows frequency distortion characteristics of a passband digital signal appearing after filtering the input data having the frequency offset (−1000 khz) as shown in FIG. 4a by means of the fixed passband matched filter. Such a frequency distortion deteriorates the SNR performance of the demodulator, and places a burden on the channel equalizer. FIG. 5 is a graph showing experimental values of a declining curve of the SBR performance of the receiver due to the frequency distortion as shown in FIG. 4a drawn in accordance with the frequency offset of the fixed passband matched filter. In case of a 256-QAM demodulation method, approximately 7 dB of SNR deteriorates under the frequency offset of 300 KHz with respect to the frequency offset of 0 Hz. In case of the 8VSB demodulation method, approximately 4 dB of SNR deteriorates under the frequency offset of 300 KHz with respect to the frequency offset of 0 Hz. These numerical values were measured at the output terminal of the channel equalizing section.

The digital demodulator of FIG. 2c using the fixed passband matched filter of a single channel for the 8VSB demodulation method and the fixed baseband matched filter of two channels for the OFDM/QAM/QPSK demodulation method may be used to supplement the drawbacks of the digital demodulator as shown in FIGS. 2a and 2b but cannot eliminate the problems of deterioration in the SNR performance as well as the escalating circuit complexity subsequent to employing the fixed baseband matched filter of two channels, as shown in FIGS. 4a and 4b.

In particular, the circuit complexity drastically escalates subsequent to deterioration of the SNR performance and the number of taps of the matched filter, as shown in FIG. 5. Thus, inconvenience still exists to determine what kind of matched filter should be employed depending on the demodulating method: the fixed passband matched filter 202c or the fixed baseband matched filter 205c. For instance, the fixed passband matched filter 202c is employed and the fixed baseband matched filter 205c is bypassed, when the demodulation method is 8VSB. The fixed baseband matched filter 205c is employed and the fixed passband matched filter 202c is bypassed when the demodulation method is OFDM/QAM/QPSK.

SUMMARY OF THE INVENTION

To solve the above problems, an object of the present invention is to provide a digital passband matched filter, filtering method, and a digital broadcast receiver using the same, which can supplement the drawbacks caused by the structural characteristics of the conventional fixed baseband/passband matched filter such as a deterioration of the SNR performance and increase of the circuit complexity by allowing the carrier wave frequency to automatically adapt to the carrier wave frequency offset.

Another object of the present invention is to provide a digital passband matched filter, filtering method, and a digital broadcast receiver using the same, which automatically adapts to a carrier wave frequency by renewing the coefficient of the passband matched filter only within an interval adaptable to the carrier wave frequency.

To achieve the above objects, there is provided a digital passband matched filter having a carrier recovery section for converting a passband digital signal of a specific channel into a baseband digital signal, removing a frequency offset and a phase jitter by demodulating the passband digital signal into a complex carrier frequency, the matched filter comprising: a control signal generation section for generating a coefficient renewal control signal to control a renewal of a passband matched filter to each N+1(N=(L−1)/2, L: a tap number) sample of a cosine wave address of M bit (M: a natural number) and a baseband filter selection address of K bit (K: a natural number) adapted to the carrier frequency outputted from the carrier recovery section; a cosine generation section for storing a cosine wave corresponding to 0~2π, and generating a cosine wave corresponding to the cosine wave address; a baseband filter coefficient output section for storing the baseband matched filter coefficient according to the number of N+1 (N=(L−1)/2, L: a tap number) samples, and selectively outputting the baseband matched filter coefficients in accordance with the baseband filter selection address; a passband filter coefficient generation section for generating passband matched filter coefficients adapted to the carrier frequency by convoluting the baseband matched filter coefficients outputted from the baseband filter coefficient output section by a cosine wave generated in the cosine generation section in a proper frequency region, and outputting the passband matched filter coefficients in accordance with a coefficient renewal control signal; and a L-tap Finite Impulse Response (FIR) filter for convoluting the passband digital signal in time axis based on a filter coefficient of the passband matched filter coefficients outputted from the passband filter coefficient generation section.

The control signal generation section comprises a K bit modulo-N counter for generating a baseband filter coefficient selection address of K bits by counting 0~N repeatedly; a comparison section for outputting a coefficient renewal control signal for renewing the passband filter coefficient when a counted value of the counter is N; an integrator for accumulating with a symbol unit and outputting the carrier wave outputted from the carrier recovery section outputting a zero value in accordance with an output of the comparison section; and an address generation section for generating a cosine address signal by extracting M bits from the outputs of the integrator, and providing the cosine address signal to the cosine generation section.

The baseband filter coefficient output section comprises a memory for prestoring the baseband matched filter coefficient according to the number of N+1; and a selection section for outputting the N+1 baseband matched filter stored in the memory in accordance with the baseband filter selection address signal.

To achieve the above objects, there is provided to digital passband matched filter having a carrier recovery section for converting a passband digital signal of a specific channel into a baseband digital signal, and removing a frequency offset and a phase jitter by demodulating the passband digital signal into a complex carrier frequency, the matched filter comprising a baseband matched filter coefficient storage ROM and a control signal generation section for storing the baseband matched filter coefficient according to the number of N+1 (N=(L−1)/2, L: a tap number) samples, selectively outputting the stored baseband matched filter coefficients on a carrier frequency adaptive mode established during a predetermined interval, while generating a coefficient renewal control signal for controlling a renewal of a passband matched filter to each N+1 sample; a passband filter coefficient generation section for generating passband matched filter coefficients adapted to the carrier frequency by convoluting the baseband matched filter coefficients by a cosine wave provided from the carrier recovery section in a proper frequency region, and outputting the passband matched filter coefficients in accordance with a coefficient renewal control signal; and a L-tap FIR filter for convoluting the passband digital signal in time axis based on a filter coefficient of the passband matched filter coefficients outputted from the passband filter coefficient generation section.

The carrier frequency adaptive range is a point of activating a reset signal, or duration from a point of activating a lock control signal generating in accordance with carrier recovery states in the carrier recovery section to an N+1 sample interval.

The baseband matched filter coefficient storage ROM and control signal generation section comprises a memory for prestoring the baseband matched filter coefficient according to the number of N+1; and a selection section for outputting the N+1 baseband matched filter stored in the memory in accordance with a baseband filter selection address signal; a K bit modulo-N counter for generating and outputting to the selection section a baseband filter coefficient selection address of K bits by repeatedly counting a carrier frequency adaptive interval control signal representing the carrier frequency adaptive interval up to 0~N; and a comparison section for generating and outputting a coefficient renewal control signal for renewing the passband filter coefficient when a counted value of the counter is N.

To achieve the above objects, there is provided to a method of filtering a digital passband matched filter having a carrier recovery section for converting a passband digital signal of a specific channel into a baseband digital signal removing a frequency offset and a phase jitter by demodulating the passband digital signal into a complex carrier frequency, the method comprising the steps of: generating a passband matched filter coefficients adapted to the carrier frequency by convoluting a carrier frequency outputted from the carrier recovery section by the stored baseband matched filter coefficients in a proper frequency range; and convoluting the passband matched filter coefficients by the passband digital signal in a time region.

The step of generating a passband matched filter coefficients comprises generating a coefficient renewal control signal for controlling a renewal of a passband matched filter to each N+1 (N=(L−1)/2, L: a tap number) sample of a cosine wave address of M bits (M: a natural number) and a baseband filter selection address of K bits (K:a natural number) adapted to the carrier frequency outputted from the carrier recovery section; b1) storing a cosine wave corresponding to 0~2π, and generating a cosine wave corresponding to the cosine wave address; c1) storing the baseband matched filter coefficient according to the number of N+1 (N=(L−1)/2, L: a tap number) samples, and selectively outputting the baseband matched filter coefficient in accordance with the baseband filter selection address; and d1) generating a passband matched filter coefficients adapted to the carrier frequency by convoluting the baseband matched filter coefficients by a cosine wave in a proper frequency region, and outputting the passband matched filter coefficients in accordance with coefficient renewal control signal.

The passband matched filter coefficients generating step comprises storing the baseband matched filter coefficients according to the number of N+1 (N=(L−1)/2, L: a tap number) samples, and selectively outputting the stored baseband matched filter coefficients on a carrier frequency adaptive mode established during a predetermined range, while generating a coefficient renewal control signal for controlling a renewal of a passband matched filter to each N+1 sample; and generating passband matched filter coefficients adapted to the carrier frequency by convoluting the baseband matched filter coefficients by a cosine wave provided from the carrier recovery section in a proper frequency region, and outputting the passband matched filter coefficients in accordance with a coefficient renewal control signal.

To achieve the above objects, there is provided to digital broadcast receiver outputting a passband digital signal by digitalizing an analog signal of a specific channel, the digital broadcast receiver comprising: a carrier recovery section for converting a passband digital signal of a specific channel into a baseband digital signal, removing a frequency offset of a carrier wave and a phase jitter by demodulating the passband digital signal into a sine/cosine wave synchronized in phase with each other and generating a carrier frequency adaptive interval control signal representing the carrier frequency adaptive mode during a predetermined interval; and a passband matched filter for generating passband matched filter coefficients adapted the carrier frequency by convoluting the cosine wave generated in the carrier recovery section by the stored baseband matched filter coefficients in a proper frequency range when the carrier frequency adaptive interval control signal is in an active state, and convoluting the passband matched filter coefficients by the passband digital signal in a time axis.

The carrier recovery section comprises a lock detection section for outputting a lock control signal corresponding to a recovery state of the carrier; a carrier frequency generation section for generating the carrier frequency by adding the frequency offset renewed by a symbol unit on a fixed intermediate frequency; and a cosine wave generation section for generating the carrier frequency adaptive interval control signal during a time beginning from a point of activation for the lock control signal or an initial system reset signal to a predetermined interval and the cosine wave for adapting the carrier wave, and generating the cosine wave for the carrier recovery in a non-activating interval of the carrier frequency adaptive interval control signal.

The cosine generation section comprises a first integrator for accumulating the carrier frequency with a symbol unit; a second integrator for accumulating with a symbol unit and outputting the carrier wave outputted from the carrier recovery section or outputting a zero value in accordance with the carrier frequency adaptive interval control signal; a selection section for selecting an output of the second integrator when the carrier frequency adaptive interval control signal is in an active state, while selecting an output of the first integrator when the carrier frequency adaptive interval control signal is in a non-active state; an address generation section for generating a cosine address signal of M bits by extracting M bits from an output of the selection section; a cosine ROM table, in which a plurality of cosine waves are previously stored, for outputting the cosine wave corresponding to the cosine wave address signal generated in the address generation section; and an adaptive interval control signal generation section for generating (activating) activates the carrier frequency adaptive interval control signal during a time beginning from a point of activation for the lock control signal or an initial system reset signal to an N+1 sample interval by performing a logical combination of the lock control signal of the lock detection section and the initial system reset signal.

The passband matched filter comprises a baseband matched filter coefficient storage ROM and control signal generation section for storing the baseband matched filter coefficient according to the number of N+1 (N=(L−1)/2, L: a tap number) samples, selectively outputting the stored baseband matched filter coefficients according to activation of the carrier frequency adaptive interval control signal, while generating a coefficient renewal control signal for controlling a renewal of a passband matched filter to each N+1 sample; a passband filter coefficient generation section for generating passband matched filter coefficients adapted to the carrier frequency by convoluting the baseband matched filter coefficients of the cosine wave provided from the cosine wave generation section of the carrier recovery section in a proper frequency region, and renewing the passband matched filter coefficients in accordance with coefficient renewal control signal; and a L-tap FIR filter for convoluting the passband digital signal in time axis based on a filter coefficient of the passband matched filter coefficients outputted from the passband filter coefficient generation section.

To achieve the above objects, there is provided a multimedia digital broadcast receiver outputting a passband digital signal by digitalizing an analog signal of a specific channel, the digital broadcast receiver comprising: a carrier recovery section for converting a I, Q passband digital signal of a specific channel into a baseband digital signal, removing a frequency offset of a carrier wave and a phase jitter by demodulating the passband digital signal into a sine/cosine wave synchronized in phase with each other; a passband matched filter for generating passband matched filter coefficients adapted to the carrier frequency by convoluting a cosine wave according to the stored baseband matched filter coefficients in a proper frequency range after generating the cosine wave from the carrier frequency outputted form the carrier recovery section, and convoluting the passband matched filter coefficients according to the passband digital signal in a time axis; a phase separation section for separating the I, Q passband digital signal from the passband digital signal filtered in the passband matched filter; and a channel equalizing and decryption section for removing an interference among symbols included in the I, Q passband digital signal provided from the carrier recovery section, and removing a burst and sporadic noises included in the signal in which the interference among symbols are removed.

The passband matched filter comprises a control signal generation section for generating a coefficient renewal control signal for controlling a renewal of a passband matched filter to each N+1 (N=(L−1)/2, L: a tap number) sample of a cosine wave address of M bits (M a natural number) and a baseband filter selection address of K bits (K:a natural number) adapted to the carrier frequency outputted from the carrier recovery section; a cosine generation section for storing a cosine wave corresponding to 0~2π, and for generating a cosine wave corresponding to the cosine wave address: a baseband filter coefficient output section for storing the baseband matched filter coefficient according to the number of N+1 (N=(L−1)/2, L: a tap number) samples, and selectively outputting the baseband matched filter coefficient in accordance with the baseband filter selection address; a passband filter coefficient generation section for generating passband matched filter coefficients adapted to the carrier frequency by convoluting the baseband matched filter coefficients outputted from the baseband filter coefficient output section according to a cosine wave generated in the cosine generation section in a proper frequency region, and outputting the passband matched filter coefficients in accordance with the coefficient renewal control signal; and a L-tap FIR filter for convoluting the passband digital signal in time axis based on a filter coefficient of the passband matched filter coefficients outputted from the passband filter coefficient generation section.

The passband filter coefficient generation section comprises a multiplying section for convoluting the cosine wave generated in the cosine wave generation section according to the baseband matched filter coefficients selectively outputted from the baseband filter coefficient output section in a proper frequency region; a serial delay section, including a plurality of delays, for successively delaying outputs signals of the multiplying section; and a parallel delay section, including a plurality of delays connected with one another in parallel which is enabled by the coefficient renewal control signal, for delaying in parallel the baseband matched filter coefficients of N+1 tap adapted to the carrier frequency by simultaneously delaying the output of the serial delay section.

The carrier recovery section comprises a lock detection section for outputting a lock control signal corresponding to a recovery state of the carrier; a carrier frequency generation section for generating the carrier frequency by adding the frequency offset renewed by the symbol unit on a fixed intermediate frequency; and a cosine wave generation section for generating the carrier frequency adaptive interval control signal during a time beginning from a point of activation for the lock control signal or an initial system reset signal to a predetermined interval and the cosine wave for adapting the carrier wave, and generating the cosine wave for the carrier recovery in a non-activating interval of the carrier frequency adaptive interval control signal.

The passband matched filter comprises a baseband matched filter coefficient storage ROM and control signal generation section for storing the baseband matched filter coefficient as much as the number of N+1 (N=(L−1)/2, L: a tap number) samples, selectively outputting the stored baseband matched filter coefficients according to activation of the carrier frequency adaptive interval control signal, while generating a coefficient renewal control signal for controlling a renewal of a passband matched filter to each N+1 sample; a passband filter coefficient generation section for generating passband matched filter coefficients adapted to the carrier frequency by convoluting the baseband matched filter coefficients of the cosine wave provided from the cosine wave generation section of the carrier recovery section in a proper frequency region, and renewing the passband matched filter coefficients in accordance with a coefficient renewal control signal; and a L-tap FIR filter for convoluting the passband digital signal in time axis based on a filter coefficient of the passband matched filter coefficients outputted from the passband filter coefficient generation section.

BRIEF DESCRIPTION OF THE DRAWINGS

FIG. 2c is a configuration block diagram of a conventional VSB(OFDM)/QAM/QPSK.

FIG. 3b is a view showing frequency characteristics of a VSB baseband digital signal appearing after filtering the demodulated VSB digital signal by means of a conventional fixed baseband matched filter.

FIG. 5 is a view showing a SNR performance deteriorating curve of the receiver in accordance with the frequency offset in FIG. 4a.

FIG. 14 is a detailed block diagram of the 65-tap FIR in FIG. 9.

FIG. 16 is a sketch view of the multimedia digital broadcast receiver in accordance with a second example of the present invention.

DESCRIPTION OF PREFERRED EMBODIMENTS

Referring to the following drawings, preferred embodiments of the present invention will be described in detail.

A receiver and a demodulator are used together in the present invention and a multimedia digital broadcast receiver is referred to as a VSB(OFDM)QAM/QPSK multimedia digital broadcast receiver for efficient description.

A digital passband matched filter of the present invention generates a digital passband matched filter coefficient adapted to a carrier frequency by convoluting a baseband matched filter coefficient fixed on a cosine wave based on a carrier frequency in a proper frequency range. In other words, the passband matched filter filters a frequency region according to a frequency offset in real time by being adapted to the carrier frequency according to the passband matched filter coefficient automatically adapted to the carrier frequency. If passband digital signals each having a frequency offset of a 1000 KHz enter by means of an input of a digital passband matched filter, they become passband-matched-filtered as much as a 1000 KHz frequency offset respectively by the adapted passband matched filter. Thus, an output signal without a frequency distortion is generated.

Such a filtering process in accordance with the present invention is separately described with a first example and a second example. In other words, the first example is provided to renew coefficients of a digital passband matched filter by means of a specific frequency and the second example is provided to renew coefficients of a digital passband matched filter only in a carrier frequency adaptive mode.

First Embodiment of the Present Invention

Figure 1:
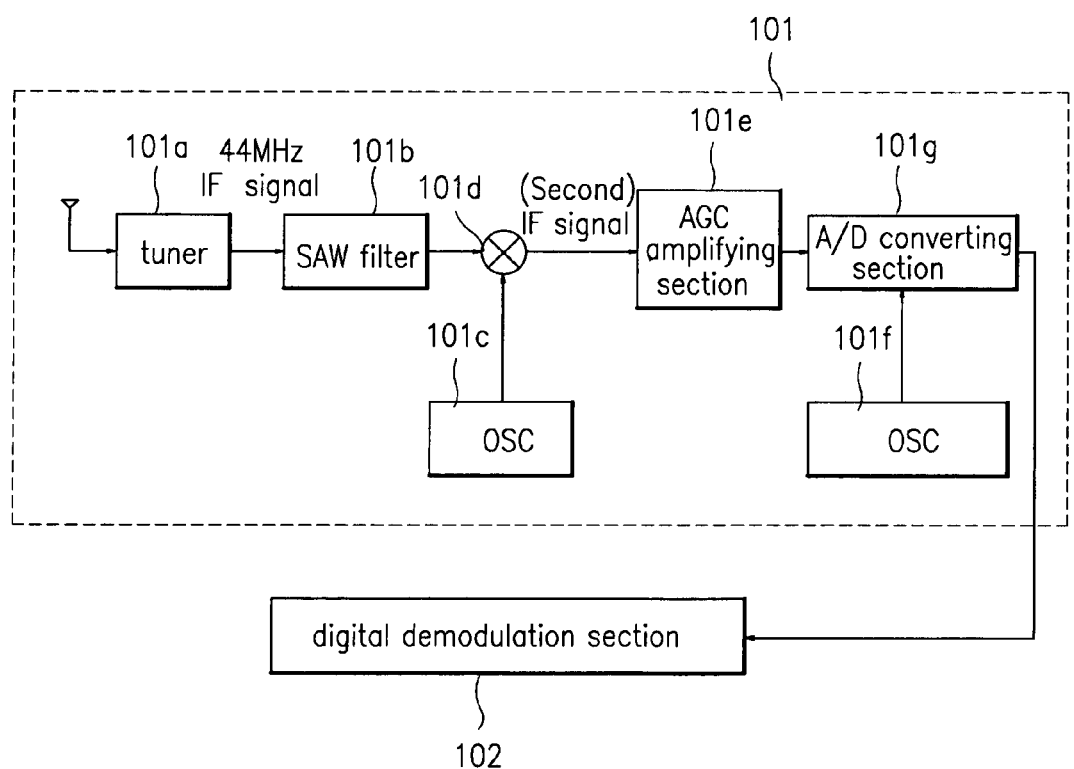
FIG. 1 is a configuration block diagram of a general multimedia digital broadcast receiver.
Figure 2A:
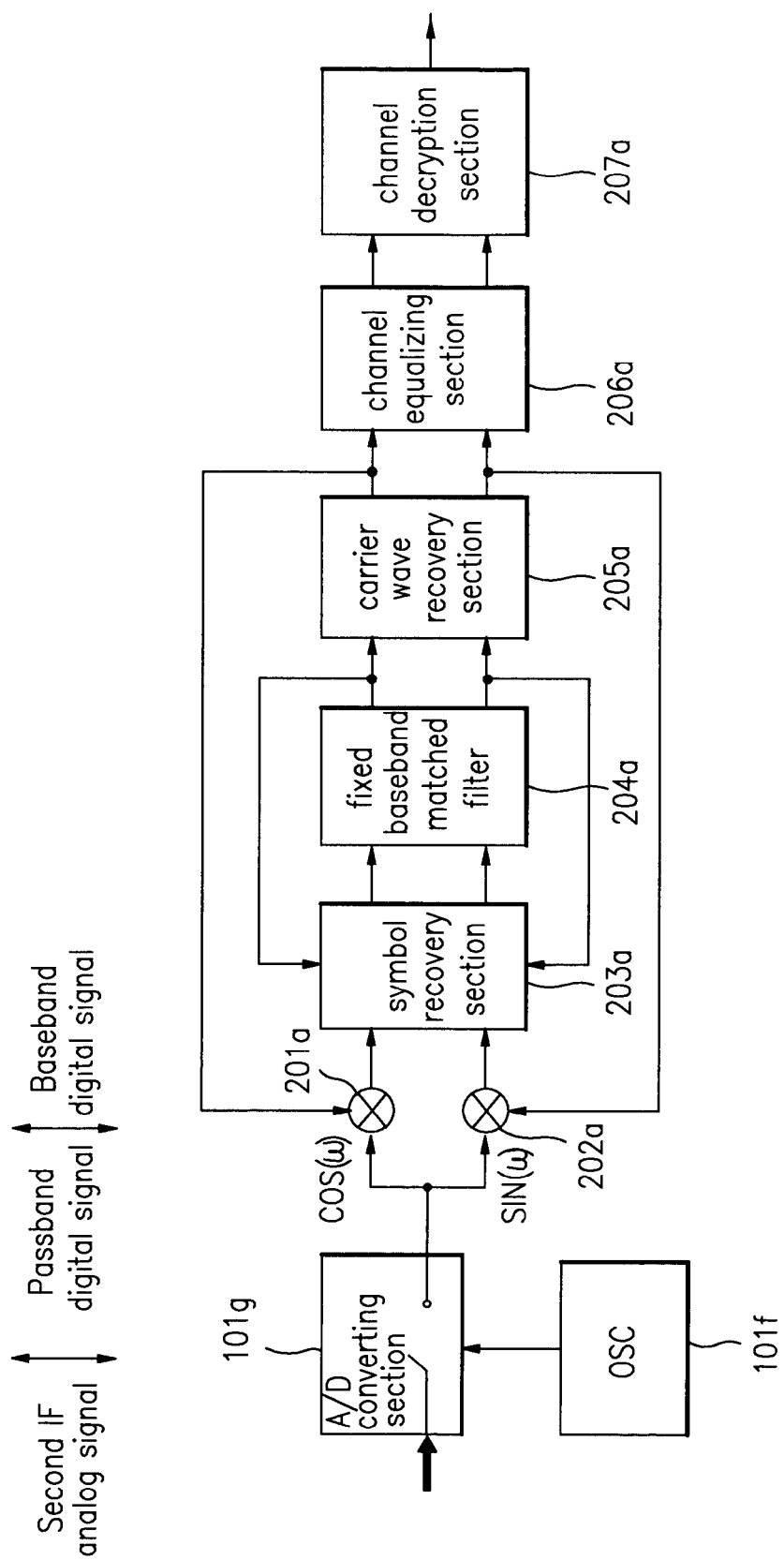
FIG. 2a is a configuration block diagram of a conventional OFDM/QAM/QPSK digital demodulator.
Figure 2B:
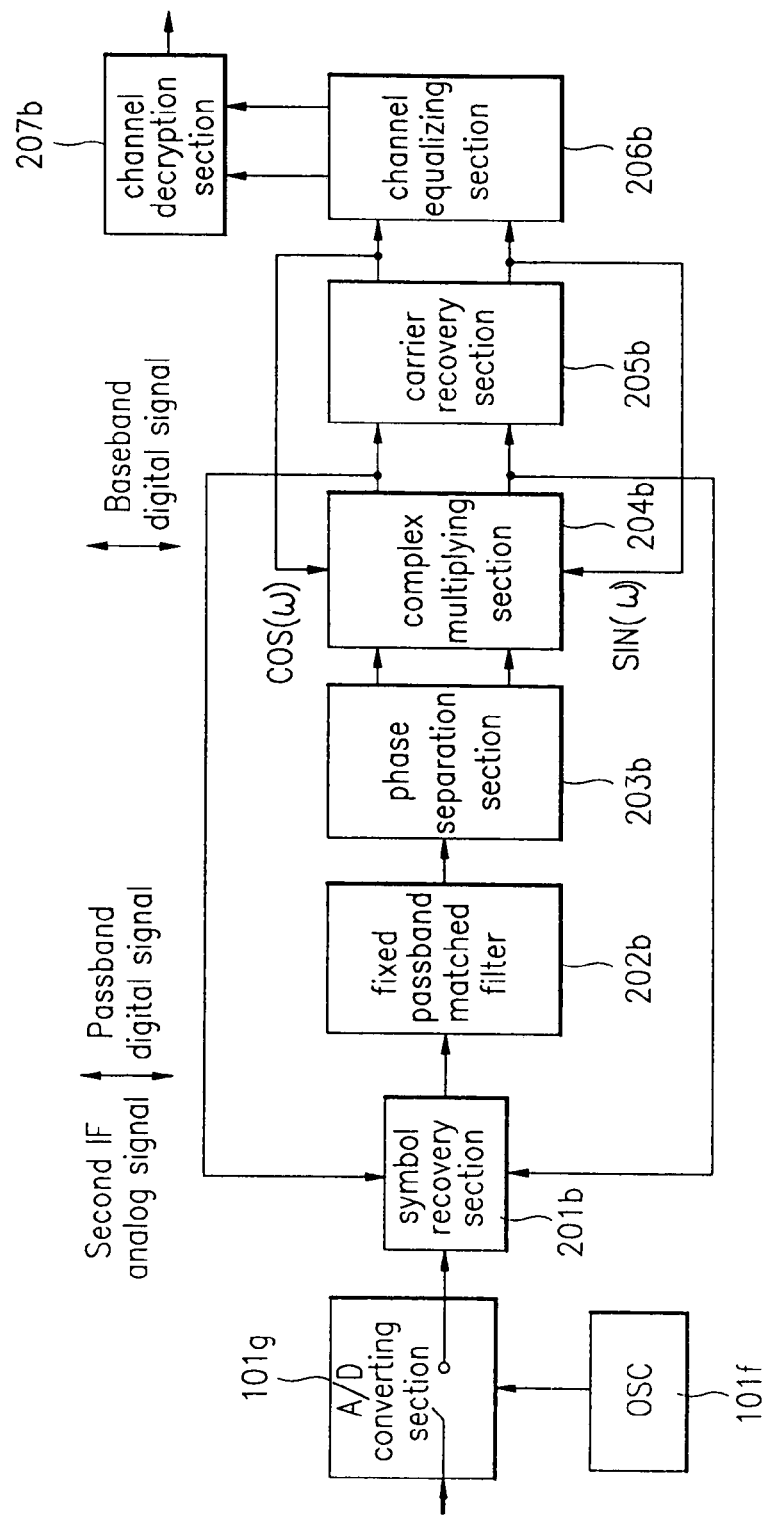
FIG. 2b is a configuration block diagram of a conventional VSB digital demodulator.
Figure 3A:
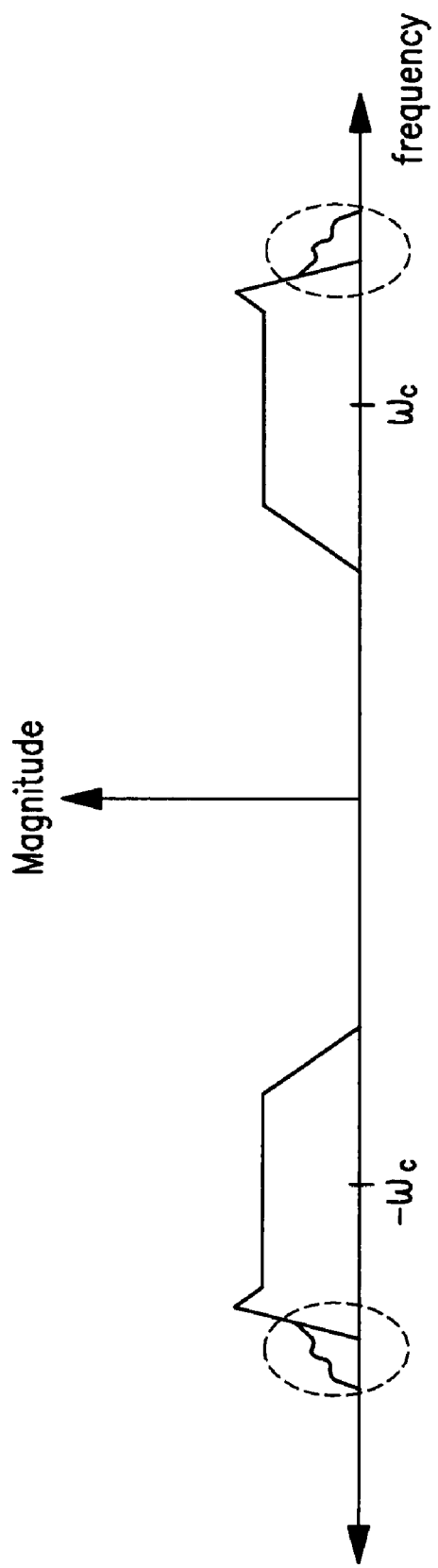
FIG. 3a is a view showing frequency characteristics of the VSB passband digital signal in FIG. 2b.
Figure 4A:
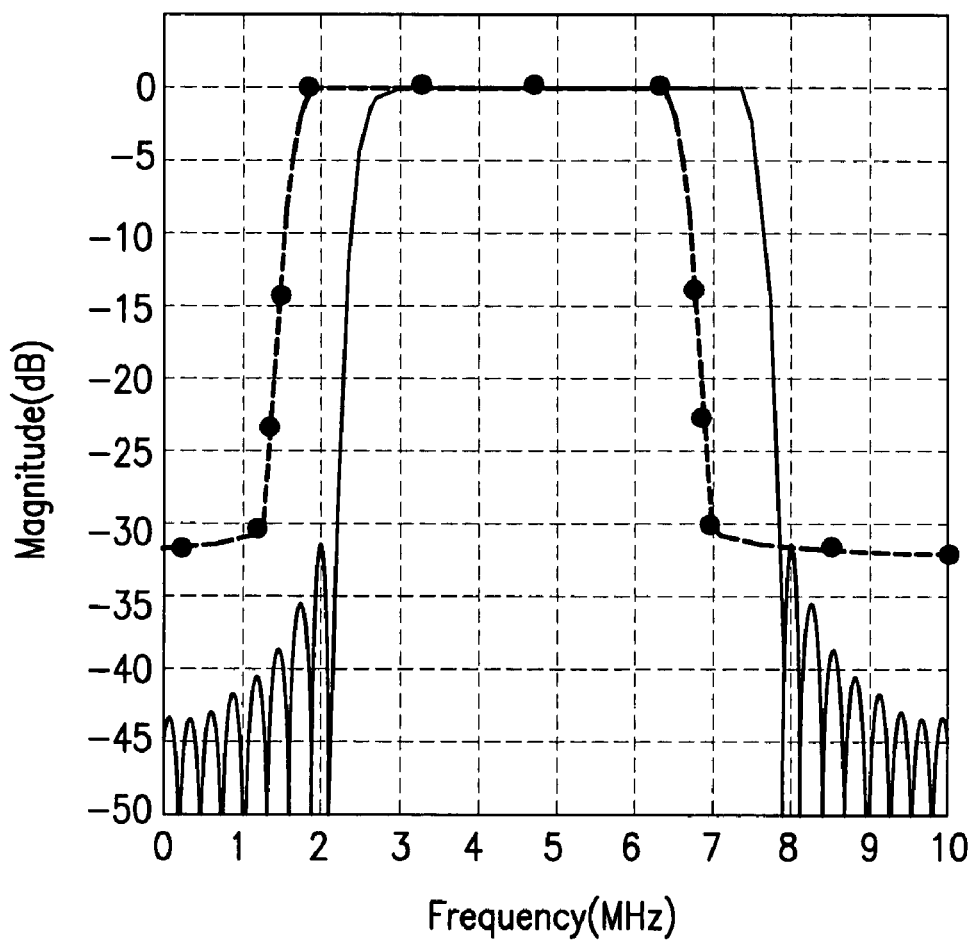
FIG. 4a is a view showing frequency characteristics of input data having a frequency response and a frequency offset of a conventional fixed passband matched filter.
Figure 4B:
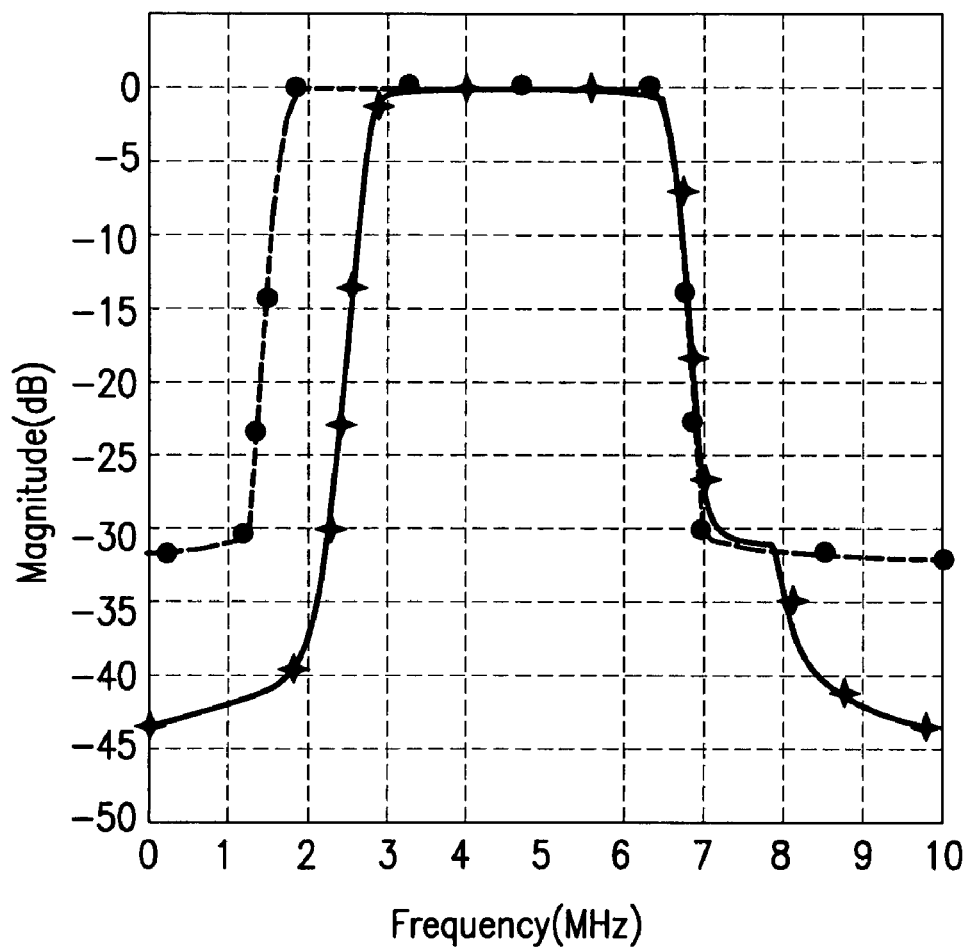
FIG. 4b is a view showing frequency distortion characteristics of the passband digital signal appearing after filtering the input data having the frequency offset in FIG. 4a by means of the fixed passband matched filter.
Figure 5:
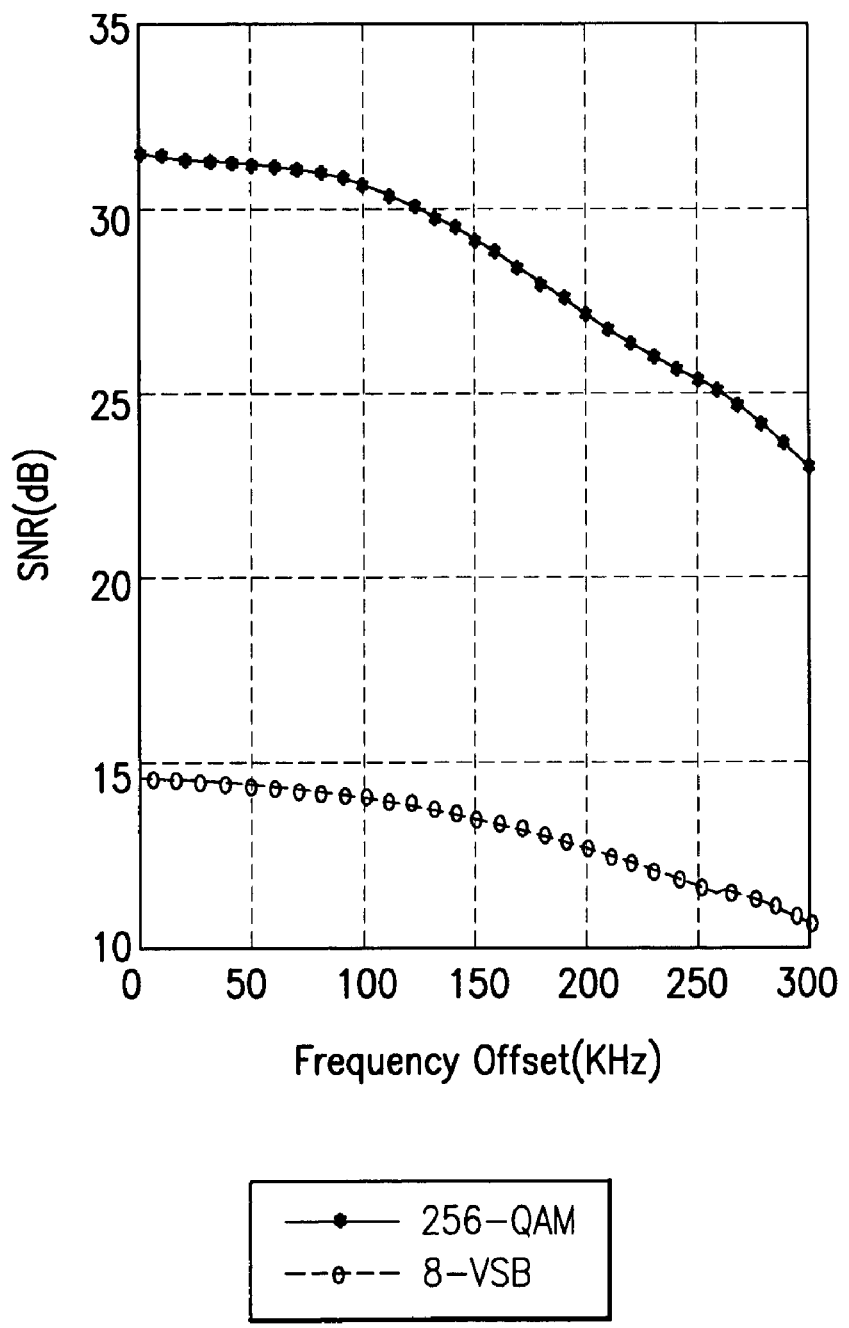
Figure 6A:
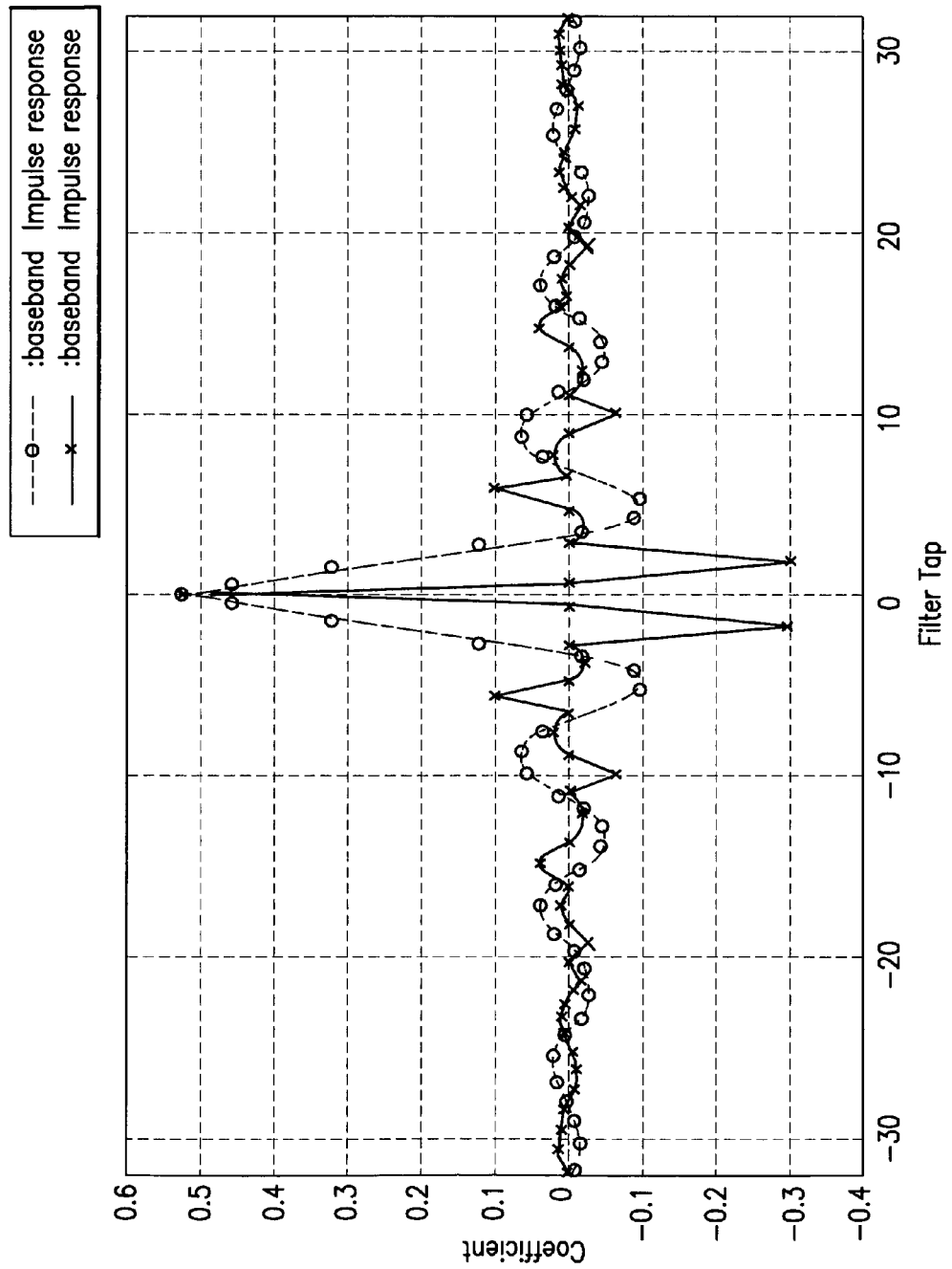
FIG. 6a is a view showing an impulse response of the fixed passband matched filter and the conventional fixed baseband matched filter.
Figure 6B:
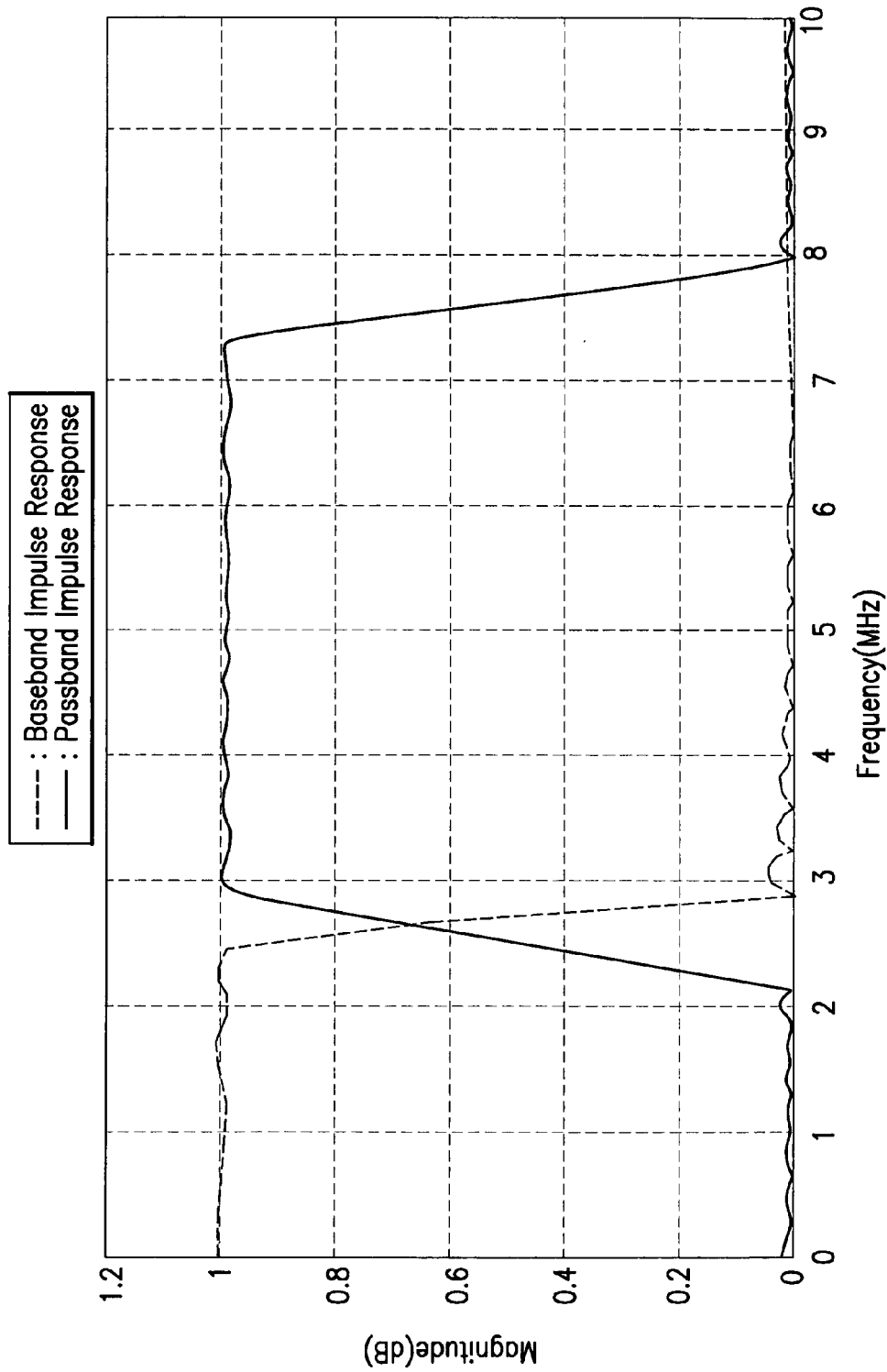
FIG. 6b is a view showing a frequency response of the fixed passband matched filter and the conventional fixed baseband matched filter.
Figure 6C:
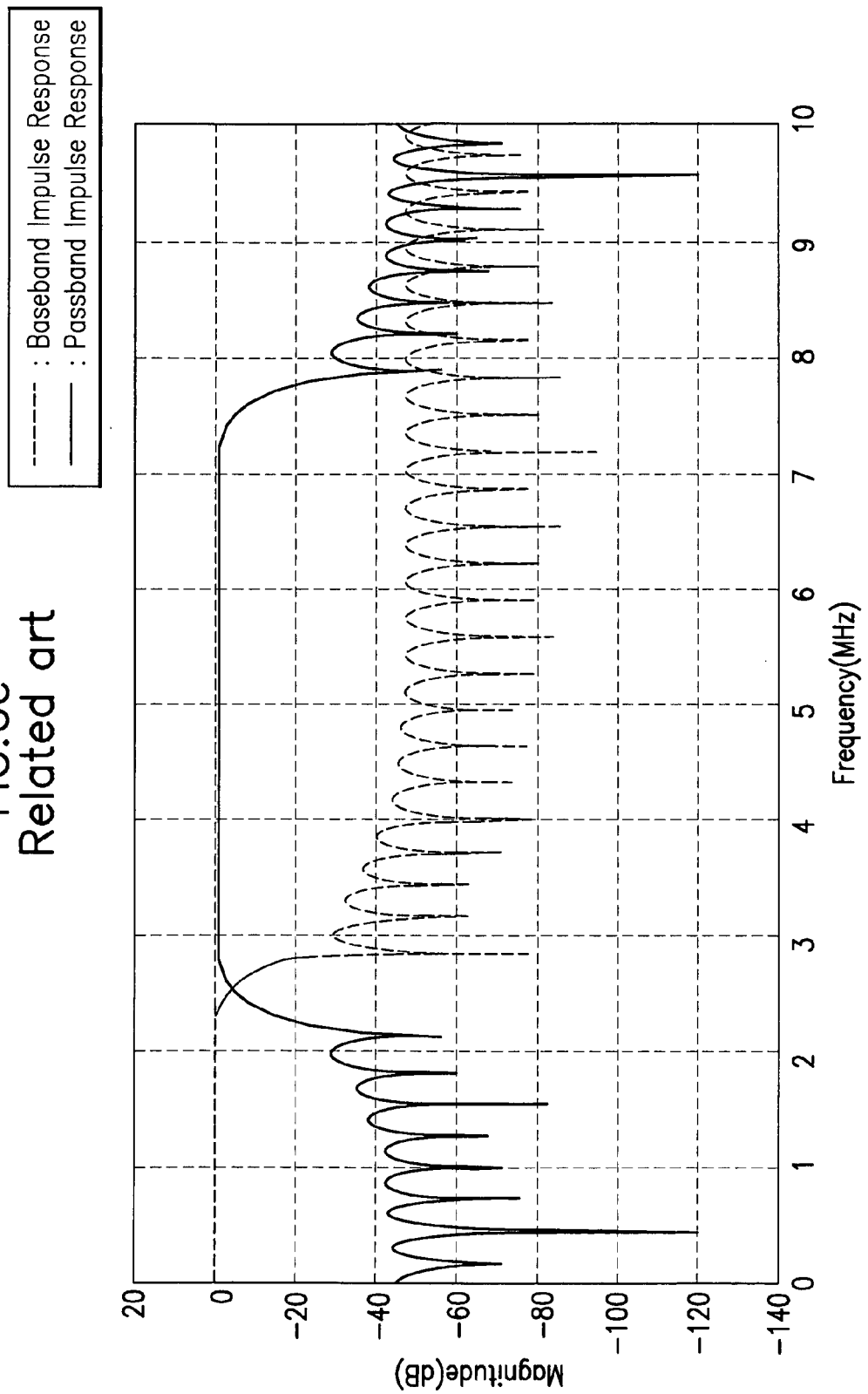
FIG. 6c is a view showing a frequency response of the fixed passband matched filter and the conventional fixed baseband matched filter.
Figure 7:
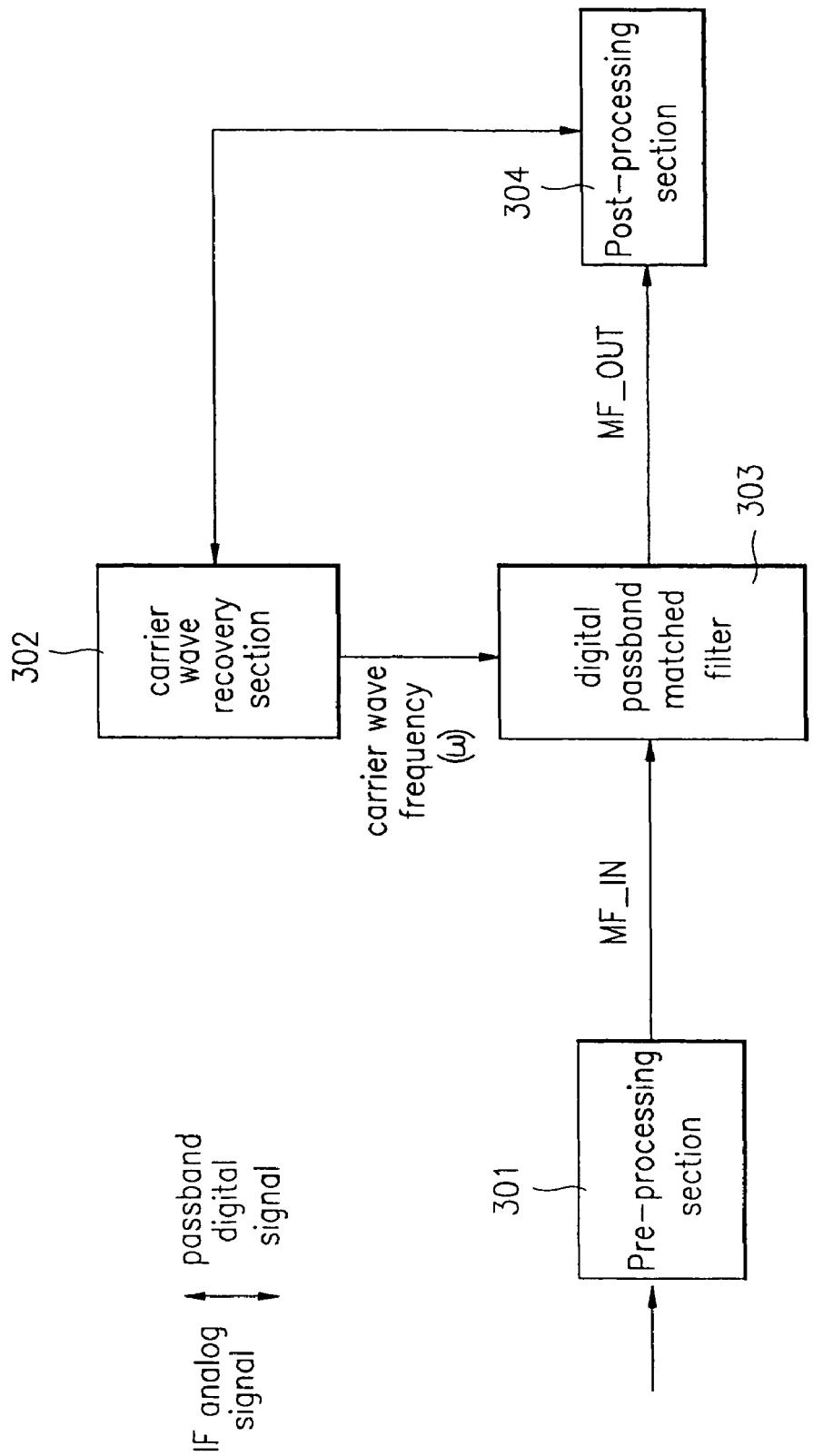
FIG. 7 is a sketch view showing a multimedia digital broadcast receiver in accordance with a first example of the present invention.

FIG. 7 is a configuration block diagram of a multimedia broadcast receiver in accordance with Example 1 of the present invention. The multimedia broadcast receiver comprises: a pre-processing section 301 digitalizing an IF analog signal and outputting a passband digital signal; a digital passband matched filter 303 filtering a digital signal by automatically adapting a passband digital signal outputted form the pre-processing section 301 to a fed back carrier frequency; a post-processing section 304 processing an output of the digital passband matched filter 303; and a carrier wave recovery section 302 transiting the passband digital signal into a baseband digital signal by recovering the carrier wave from the passband digital signal outputted from the post-processing section 304 and feeding back the recovered carrier frequency to the digital passband matched filter 303.

Figure 8:
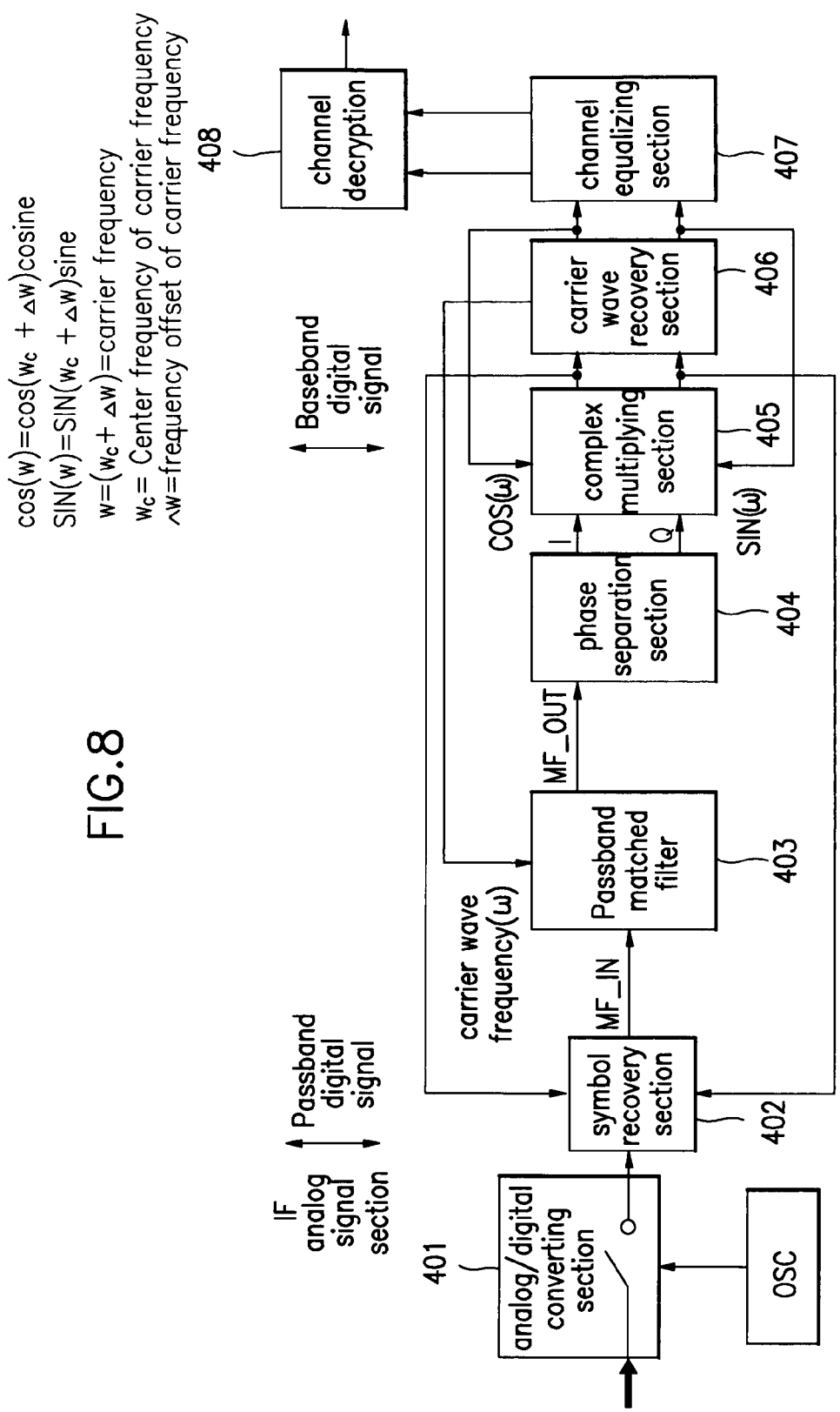
FIG. 8 is a configuration block diagram of a VSB(OFDM) QAM/QPSK digital demodulator in accordance with the first example of the present invention, being equipped with a digital passband matched filter automatically adapting to a carrier frequency in FIG. 7.

FIG. 8 is a configuration block diagram in accordance with the first example of the present invention, being equipped with the digital passband matched filter automatically adapting the carrier frequency in FIG. 7, and in particular showing an example of the VSB(OFDM)/QAM/QPSK multimedia digital broadcast receiver.

The VSB(OFDM)/QAM/QPSK multimedia digital broadcast receiver (referring to FIG. 8) comprises: an A/D converting section 401, which converts a second analog IF signal into a passband digital signal according to a fixed sampling frequency generated from an oscillator; a symbol recovery section 402 which uses a re-sampler accomplishing a clock recovery of a passband symbol column outputted from the A/D converting section 401 during a complete digital process; a digital passband matched filter 403 automatically adapts to a carrier frequency contained in a passband digital signal outputted from the symbol recovery section 402; a phase separation section 404 separates the passband digital signal outputted form the digital passband matched filter 403 into an I signal and a Q signal; a complex number multiplying section 405 converts the I, Q passband digital signals separated by the phase separation section 404 into a baseband digital signal by multiplying a cosine wave (COS) and a sine wave (SIN) based on a carrier frequency by the I, Q passband digital signal separated from the phase separation section 404; a carrier wave recovery section 406 removes a carrier frequency offset and phase noise caused by a tuner or a mixer of an analog receiver from the I, Q baseband digital signal and feeds back the carrier frequency to the digital passband matched filter 403; a channel equalizing section 407 removes an inter-channel interference caused through multi-paths outputted from the carrier wave recovery section 406; and a channel decryption section 408 improves a SNR performance by removing a burst jitter and a sporadic jitter existing in channels outputted from the channel equalizing section 407. The complex number multiplying section 405 may be contained within the carrier wave recovery section 406.

Figure 9:
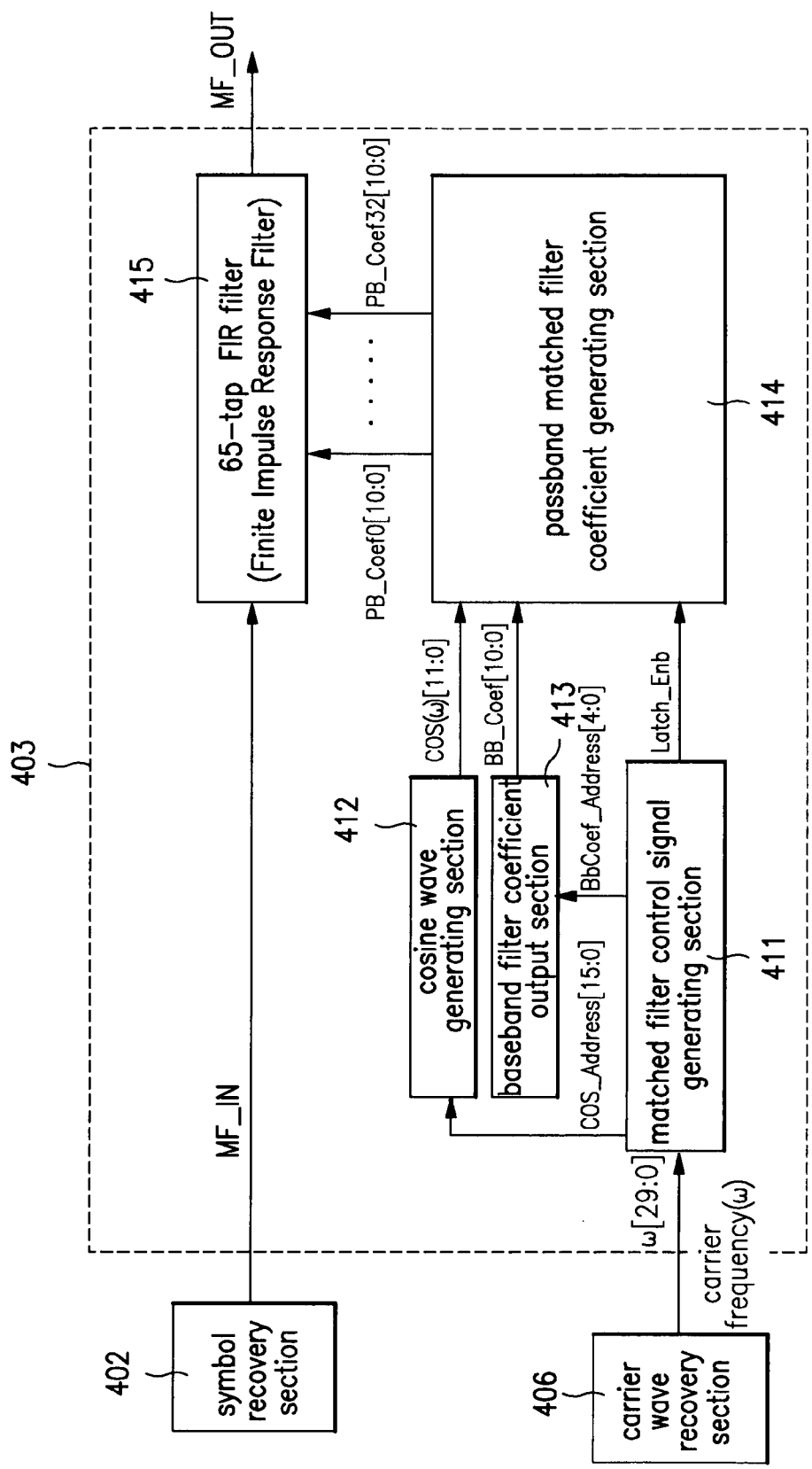
FIG. 9 is a detailed block diagram of the digital passband matched filter in FIG. 8.

FIG. 9 is a detailed block diagram of the digital passband matched filter of the first example of the present invention. The digital passband matched filter comprises: a control signal generating section 411 which generates a control signal for renewing a passband filter coefficient of a specific bit, a fixed baseband filter coefficient selection address (BbCoef-Address[4:0]) of a specific bit and a cosine wave address (COS-Address[15:0]) of a specific bit adapted to the carrier frequency ($\omega$) fed back from the carrier wave recovery section 406; a cosine wave generating section outputs a cosine wave COS($\omega$)[11:0] of a specific bit based on a carrier frequency according to the cosine wave address (COS-Address[15:0]) outputted from the control signal generating section 411; a baseband filter coefficient output section 413 respectively stores fixed base matched filter coefficients corresponding to the demodulation method of VSB(OFDM)/QAM/QPSK according to the number of N+1 (N=(L−1)/2, L: a tap number) sample signals and selectively outputs a baseband filter coefficient stored according to the baseband filter coefficient selection address (BbCoef-Address[4:0]) outputted from the control signal generating section 413; a passband matched filter coefficient generating section 414 generates a passband matched filter coefficient adapted to the carrier frequency according to a cosine wave ($\omega$) [11:0] generated from the cosine wave generating section 412, a filter coefficient BB-Coef[10:0] outputted from the baseband filter coefficient generating section 413 and a coefficient renewal control signal Latch-Enb outputted from the matched filter control signal generating section 411; and a L-tap FIR (Finite Impulse Response) filter 415 filters the passband digital signal outputted from the symbol recovery section 402 into a passband matched filter coefficient adapted to the carrier frequency.

In other words, the passband matched filter coefficient generating section 414 convolutes the cosine wave (COS($\omega$) [11:0]) outputted from the cosine wave generating section 412 and the baseband matched filter coefficient (BB-Coef [10:0]) outputted from the baseband filter coefficient output section 413 and then outputs passband matched filter coefficients (PB-Coef 0[10:0]-PB-Coef32[10:0]) adapted to the carrier frequency ($\omega$) by sampling according to the coefficient renewal control signal (Latch-Enb) outputted from the control signal generating section 411.

The cosine wave generating section 412 includes a look-up table storing the cosine wave COS ($\omega$) corresponding to [−1 −+1]. The cosine wave COS ($\omega$) stored in the cosine wave generating section 412 is referred/generated by a cosine wave address signal (COS-Address [M−1:0]) of M bit (for example, M=16) generated in the matched filter control signal generating section 411. The look-up table of the cosine wave generating section 412 is used for the carrier frequency adaption and the carrier wave recovery section 406 includes a sine/cosine wave look-up table for a carrier wave recovery. The look-up table of the cosine wave generating section 412 is used only for carrier frequency adaption and the look up table of the carrier wave recovery section 406 is used only for carrier frequency recovery.

Further, fixed baseband matched filter coefficients of (N+1) sample signals stored in the baseband filter coefficient output section 413 are referred/generated by the selection address signal (BbCoef-Address[K−1:0]) of K bit (for example, K=5) generated in the matched filter control signal generating section 411.

Figure 10:
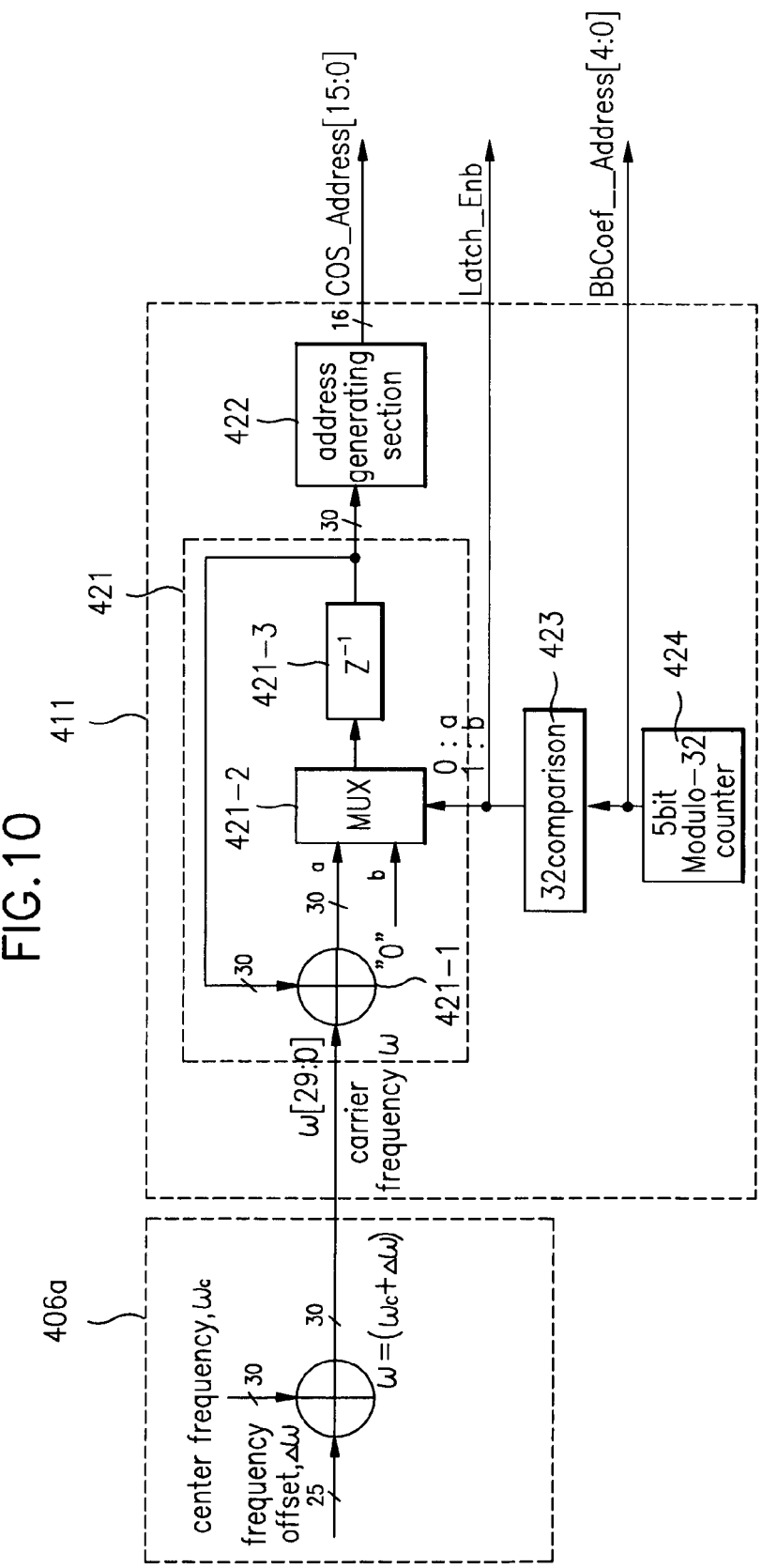
FIG. 10 is a detailed block diagram of the matched filter control signal generating section and a carrier wave recovery section in FIG. 9.

FIG. 10 is a detailed block diagram of a carrier frequency generating section 406a of the carrier wave recovery section 406 generating a carrier frequency ($\omega$) of 12 bits corresponding to [0−2$\pi$] and of the matched filter control signal generating section 411. The carrier frequency generating section 406a includes an adder generating a carrier frequency ($\omega$) $\omega$[29:0] of 30 bits by adding a fixed middle frequency($\omega_c$) of 30 bits to a frequency offset($\Delta\omega$) of 25 bits renewed with a symbol unit by the carrier wave recovery section 406.

The matched filter control signal generating section 411 comprises the parts of: a 5 bit-modulo-32 counting section 424 generating the fixed baseband filter coefficient selection address (BbCoef-Address[4:0]) by repeatedly counting a specific bit; a comparison section 423 outputting a coefficient renewal control signal (Latch-Enb) for renewing a passband filter coefficient adapted to the carrier frequency ($\omega$) when the counting section 424 resets 0; an integration section 421 accumulating the carrier frequency ($\omega$) outputted from the carrier frequency generating section 406a with a symbol unit according to the signal outputted from the comparison section 422; and an address generating section 422 generating the cosine wave address signal (COS-Address[15:0]) by extracting a specified number bit from the integration section 421.

The integration section 421 comprises: an adder which adds the carrier frequency to the fed back frequency delayed with a symbol unit; a selector 421-2 which selectively outputs either an output of the adder or a reset signal (0); and a delayer 421-3 which outputs an output signal to the address generating section 422 by delaying the output signal outputted through the selector by an amount as much as 1 symbol and feeds back to the adder 421-1. The selector 421-2 uses the output of the comparison section 423 as a selection signal.

Figure 11:
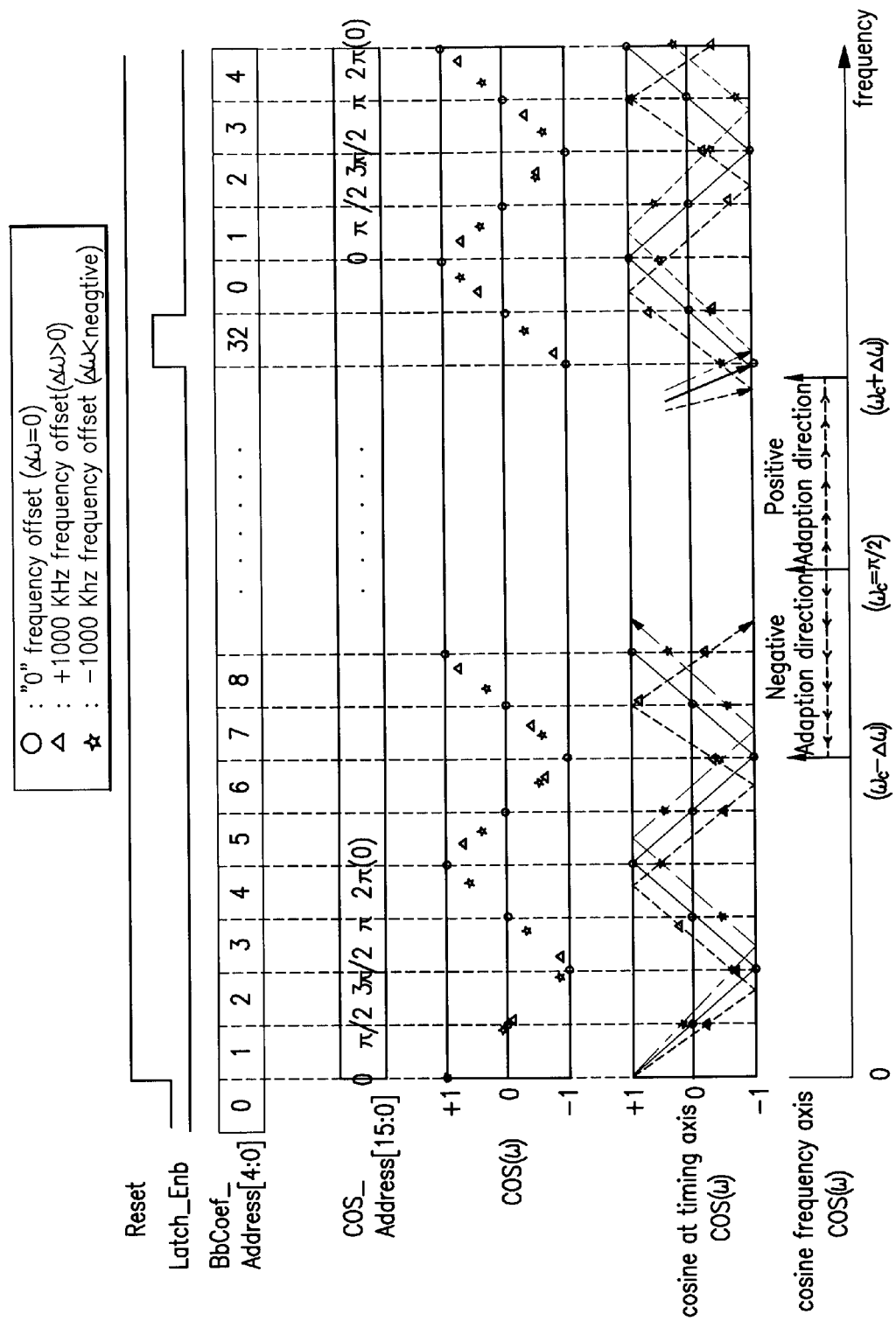
FIG. 11 is a timing view showing cosine wave generation in accordance with digital passband matched filter control signals in FIG. 8.

FIG. 11 is a timing view of the cosine wave (cos(T)) and the control signal of the control signal generating section 411 in FIG. 10.

Figure 12:
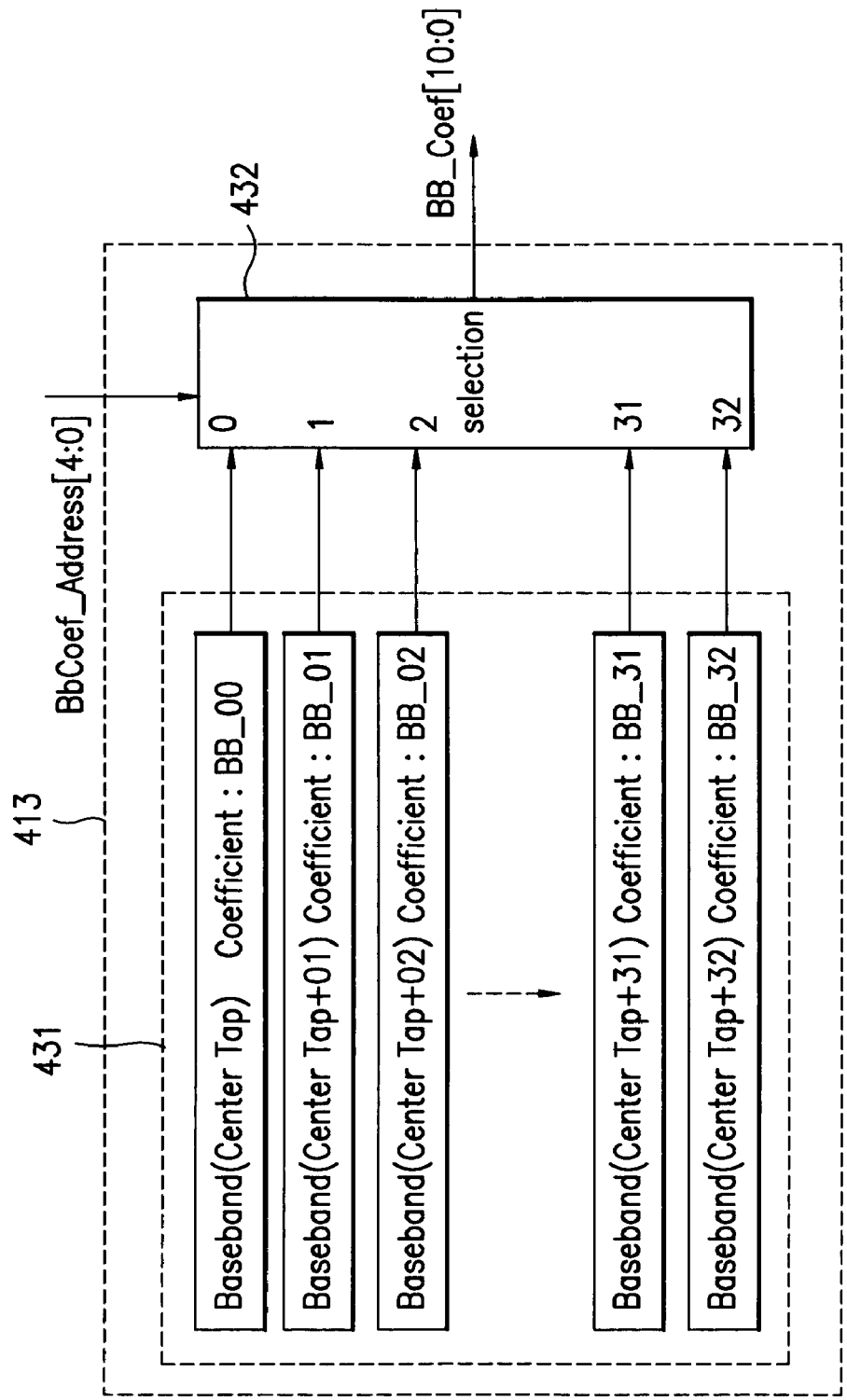
FIG. 12 is a detailed block diagram of a baseband filter coefficient generating section in FIG. 9.

FIG. 12 is a detailed block diagram of the baseband filter coefficient output section 413 in FIG. 9. The baseband filter coefficient output section comprises the parts of: a memory ROM 431 storing the fixed baseband matched filter coefficient (BB-Coef) of 11 bits respectively corresponding to the VSB(OFDM)/QAM/QPSK demodulation method according to (NT+1) sample signals; a selection section 432 selectively outputting in regular succession baseband filter coefficients stored in the ROM 431 according to the fixed baseband filter coefficient selection address signal (BbCoef-Address[4:0]) outputted from the control signal generating section 411.

According to the first example of the present invention, the pre-processing section 301 outputs an input IF signal to the matched filer 303 by converting the input IF analog signal to a passband digital signal. The matched filter 303 outputs the passband digital signal (MF-IN) to the post-processing section 304 and automatically adapts the passband digital signal (MF-IN) outputted from the pre-processing section 301 according to the carrier frequency ($\omega$) fed back from the carrier wave recovery section 302. The post-processing section 304 outputs an output (MF-OUT) of the matched filter 303 to the carrier wave recovery section 302 by post-processing the output of the matched filter 303.

The carrier wave recovery section 302 re-outputs the carrier frequency ($\omega$) by recovering the carrier frequency ($\omega$) from the passband digital signal post-processed in the post-processing section 304 and feeds it back to the matched filter 303.

The matched filter 303 repeatedly filters the passband digital signal (MF-IN) by automatically adapting the passband digital signal (MF-IN) outputted from the pre-processing section 301 to the fed back carrier frequency ($\omega$).

Figure 15A:
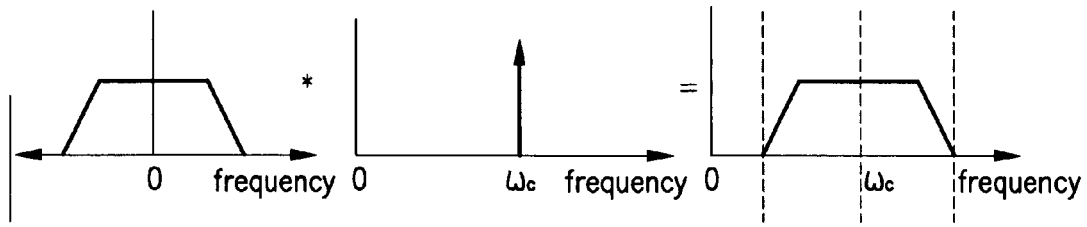
FIGS. 15a to 15c are views showing a frequency response of a matched filter automatically adapting to a carrier wave by convoluting the frequency response of the fixed baseband matched filter according to a frequency response of a cosine wave having a carrier frequency.
Figure 15B:
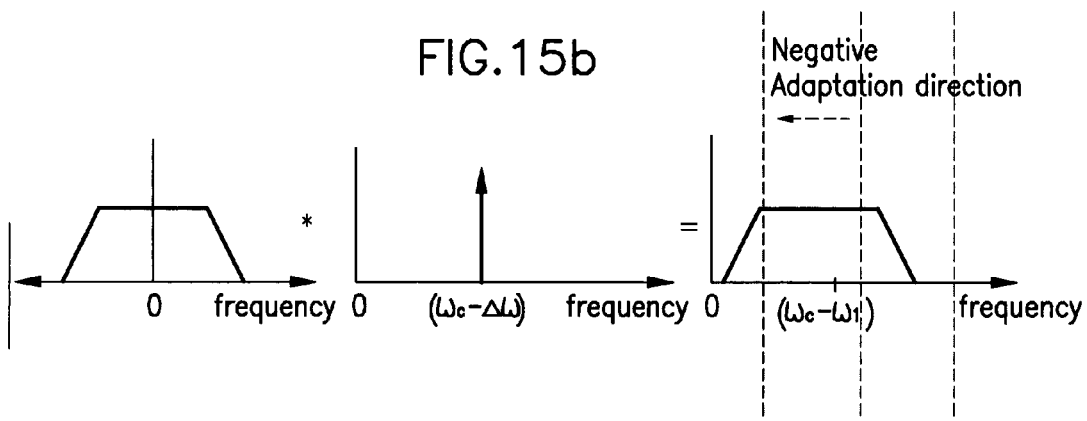
Figure 15C:
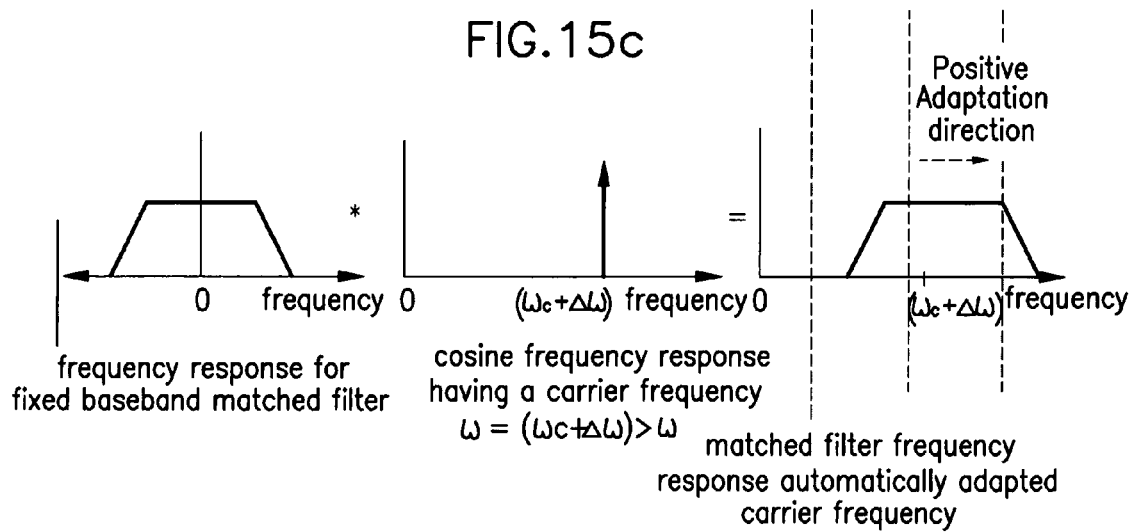

In other words, the matched filter 303 repeats the following processes as shown in FIGS. 15a to 15c: generating a passband filter coefficient adapted to the carrier wave ($\omega$) by convoluting the cosine wave based on the carrier frequency ($\omega$) fed back from the carrier wave recovery section 302 according to the already stored baseband filter coefficient in a proper frequency region; and outputting the passband digital signal without a frequency distortion caused by the frequency offset ($\Delta\omega$) by convoluting the passband filter coefficient according to the passband digital signal inputted from the pre-processing section 301 in a time region. FIGS. 15a to 15c are views showing the frequency response of the digital passband matched filter in accordance with the present invention, which automatically adapts to the carrier frequency by convoluting the frequency response of the fixed baseband matched filter according to the frequency response of the cosine wave (COS($\omega$)) having the carrier frequency ($\omega$).

The following is described using the example of the VSB(OFDM)QAM/QPSK multimedia digital broadcast receiver in FIG. 8 from among multimedia digital broadcast receivers the matched filter and the carrier wave recovery section are adaptable.

In other words, the A/D converting section 401 outputs a second IF signal (for example, a VSB(OFDM)/QAM/QPSK analog signal) to a symbol recovery section 402 using a re-sampler by converting the second IF signal outputted from an analog receiving section 101 according to a fixed sampling frequency generated in an oscillator. The symbol recovery section 402 outputs the symbol-recovered passband digital signal to the digital passband matched filter 403 by interpolating to the direction of reducing inter-passband digital signal errors outputted from the A/D converting section 401. For instance, if a digital signal of 6 MHz sampled as a fixed 25 MHz signal passes through the symbol recovery section 402, it becomes interpolated N times of a real symbol ratio (for example, in case of VSB, n=2 and in case of QAM, n=4).

The digital passband matched filter 403 generates the cosine wave (COS($\omega$)) from the carrier frequency fed back from the carrier wave recovery section 406 of the real platform and outputs the passband digital signal having a frequency offset ($\Delta\omega$) outputted from the symbol recovery section 402 to the phase separation section 404 and automatically adapts the passband digital signal to the cosine wave (COS($\omega$)). The phase separation section 404 outputs the passband signal filtered in the digital passband filtered in the digital passband matched filter 403 to the complex number multiplying section 405 by separating the passband digital signal into an I signal and a Q signal. The complex number multiplying section 405 digitally demodulates the I, Q passband digital signals into the cosine wave (COS($\omega$)) and the sine wave (SIN($\omega$)) fed back in the carrier wave recovery section 406 of the rear platform and transits the I, Q passband digital signals into an I, Q baseband digital signal, thereby outputting it to the carrier wave recovery section 406. The I, Q baseband digital signal outputted from the complex number multiplying section 405 has the frequency offset and the phase noise generated in the tuner and the mixer.

Thus, the carrier wave recovery section 406 outputs the I, Q baseband digital signals to the channel equalizing section 407 by removing the frequency offset and the phase noise of the carrier wave from the I, Q baseband digital signals.

The carrier frequency generated in the carrier wave recovery section 406 is fed back to the passband matched filter 403, and the cosine wave (COS($\omega$)) and the sine wave (SIN($\omega$)) based on the carrier frequency ($\omega$) are fed back to the complex number multiplying section 405. The carrier frequency ($\omega$) is a sum of a middle frequency ($\omega_c$) of the carrier wave and the frequency offset ($\Delta\omega$) of the carrier wave.

The channel equalizing section 407 removes an inter-symbols interference due to multi-paths and outputs it to the channel decryption section 408, and the channel decryption section 408 removes a burst jitter and a sporadic jitter existing in the channel, thereby improving SNR performance.

FIG. 9 is a detailed block diagram showing an example of the digital passband matched filter 403. The digital passband matched filter 403 convolutes the baseband matched filter coefficients of N+1 tap (N=(L−1)/2, L: a matched filter tap number) stored in the ROM by the carrier frequency (ω) fed back from the carrier wave recovery section 406 in a proper frequency region and generates passband matched filter coefficients adapted to the carrier frequency (ω). The digital passband matched filter 403 convolutes the passband digital signal outputted from the symbol recovery section 402 by the L-tap FIR (Finite Impulse Response) having passband matched filter coefficients adapted to the carrier frequency (ω) based on the coefficient in a time axis so as to acquire the passband digital signal without a frequency distortion due to the frequency offset (Δω).

For this, the control signal generating section 411 repeatedly generates during a (N+1) sample (tap) interval the selection address BbCoef-Address[4:0] of fixed baseband matched filter coefficients corresponding to (1~N) and the cosine wave address signal COS-Address [15:0] of M (for example, M=16) bit corresponding to (0~2π) after feeding back the carrier frequency (ω) from the carrier frequency generating section 406a of the carrier wave recovery section 406 in accordance with FIG. 10. The control signal during a (N+1) repeating interval is repeatedly generated by the counter of K bits (for example, k=32). And the control signal generating section generates the coefficient renewal control signal Latch-Enb for renewing the passband matched filter coefficients adapted to the carrier frequency (ω) for 1 sample (tap) interval every (N+1) sample (tap).

The carrier wave recovery section 406 generally detects the middle frequency (ω$_c$) of the carrier wave and recovers the frequency offset (Δω) generated in the tuner and the mixer. Thus, the carrier frequency generating section 406a generates the carrier frequency (ω), ([29:0], of 30 bits through an adder adding the frequency offset (Δω) of 25 bits renewed with a symbol units by the fixed middle frequency (ω$_c$) of 30 bits to the carrier wave recovery section 406, thereby outputting to the control signal generating section 411.

Thus, the adder within an integration section of the control signal generating section 411 outputs the carrier frequency to the selector (421-2) by adding the carrier frequency (ω), ([29:0], of 30 bits to the feed-back frequency fed back after being delayed by an amount as much as 1 symbol in the delayer 421-3 of the rear platform.

The counter 424 within the control signal generating section 411 generates the baseband filter coefficient selection address (BbCoef-Address[4:0]) by repeatedly counting (0~N). For instance, if the counter is a 5 bit-modulo 32 counter, it resets to 0 and repeatedly counts 0~32 when the count value is 32. The baseband filter coefficient selection address (BbCoef-Address[4:0]) of 5 bits corresponding to (0~32) is outputted to the baseband filter coefficient output section 413 and simultaneously to the comparison section 423 of 32 bits. Summarily, the baseband filter coefficient selection address (BbCoef-Address[4:0])is repeatedly generated during a 33 sample (tap) interval and the control signal of the 33 sample repeating interval is repeatedly generated by the counter 424 of 5 bits.

The 32 comparison section 423 outputs the coefficient renewal control signal to the selection signal of the selector 421-2 of the integration section 421 and the passband matched filter coefficient generating section 414 by generating the coefficient renewal control signal (Latch-Enb) becoming 'logic 1' for 1 sample shown in FIG. 11 when an output of the counter resets to 32, or 0. In other words, the comparison section 423 activates the coefficient renewal control signal (Latch-Enb) for renewing the passband filter coefficient adapted to the carrier frequency (T) during 1 sample interval every 33rd sample (tap).

The selector 421-2 selects the output of an adder 421-1 when the selection signal outputted from the comparison section 423 is 0, and outputs to a delay 421-3 with selecting the reset signal 0 when the selection signal is 1. The delay 421-3 makes a feedback to the adder 421-1 by delaying 1 symbol of the output of the selector 421-2 and coincidently outputs to an address generating section 422.

The address generating section 422 outputs 16 ([29:14]) bits selected from the integrated signal in the integral section 421 after generating a cosine address signal COS_Address [15:0].

That is, the integral section 421 makes the cosine address signal COS_Address[15:0] to a logic 0 on every 33rd sample by a coefficient renewal recovery control signal Latch_enb outputted from the 32 comparison section 423. It means that the cosine address signal COS_Address[15:0] always starts with the logic 0 in the period of 33 samples.

The cosine wave section 412 outputs the read cosine COS [11:0] of the 12 bit size from the lookup table stored in the cosine address signal COS_Address[15:0]) of the 16 bit size outputted from the control signal generating section 411 to the passband matched filter coefficient generating section 414. That is, the cosine COS [11:0] generated by the cosine address signal COS_Address [15:0] starts with +1, and +1 is multiplied with a center tap coefficient of the fixed baseband matched filter stored in the ROM 431 of the baseband filter coefficient generating section 413. The calculated result becomes an applied center tap coefficient of the passband filter coefficient.

FIG. 11 is a cosine generation timing drawing according to the matched filter control signal and shows an embodiment of FIG. 10. If a symbol rate of the system normalized to a symbol frequency 5 MHz is $$\frac{\pi}{2}$$

and the sample rate is 2, one period of the carrier wave without Δω=0 the frequency offset Δωis 2π and the period is exactly comprised of 4 samples. The center frequency ω$_c$ of the time is $$\frac{\pi}{2}.$$

Further, a period of the carrier wave having a positive frequency offset Δω (Δω>0) becomes less than 2π and the number of the sample in one period is less than 4 samples. Therefore, the center frequency ω$_c$ is $$\frac{\pi}{2} + \Delta\omega.$$

Also a period of the carrier wave having a negative frequency offset $\Delta\omega(\Delta\omega<0)$ is larger than $2\pi$, and the number of the sample in the period is greater than 4 samples. Accordingly, the center frequency $\omega_c$ is $$\frac{\pi}{2} - \Delta\omega.$$

The waves at a timing axis and a frequency axis of the cosine $COS\omega$ according to each frequency offset $\Delta\omega$ is shown in FIG. 11.

Meanwhile, the baseband filter coefficient generating section 413 outputs the baseband filter coefficient stored in the baseband filter coefficient selecting address BbCoef_Address[4:0] generated from the control signal generating section 411 by reading from the ROM 431.

That is, the baseband filter coefficient generating section 413 previously stores the fixed baseband matched filter coefficients by as many as N+1 (that is, 33) in the ROM 431 as shown in FIG. 12. The stored 33 fixed baseband matched filter coefficients BB_00~BB_32 in the ROM 431 are orderly outputted to the passband matched filter coefficient generating section 414 through a multiplexer 432. Here, the fixed baseband filter coefficients BB_00~BB_32 according to every digital demodulation method such as VSB, OFDM, QAM, QPSK, 3PSK, etc. are stored each in the ROM 431.

The 33 fixed baseband matched filter coefficients BB_00~BB_32 stored in the ROM 431 are each inputted to the multiplexer 432. And the multiplexer 432 outputs by orderly selecting the baseband matched filter coefficients BB_00~BB_32, inputted by the baseband filter coefficient selection address BbCoef_Address[4:0] of the 5 bit size which repeats 0 through 32 generated from the control signal generating section 411 to the passband matched filter coefficient generating section 414.

The passband matched filter coefficient generating section 414 convolutes the fixed baseband matched filter coefficient BB_Coef[10:0] of the 33 taps outputted from the cosine COS [11:0] of the 12 bit size and the baseband filter coefficient generating section 413 generated from the cosine wave section 412 in the frequency region, and generates the passband matched filter coefficients of the 33 taps PB_coef0 [10:0], PB_coef1[10:0], PB_coef2[10:0], . . . , PB_coef31 [10:0], PB_coef32[10:0] adapted to the carrier frequency of the 11 bit size. The passband matched filter coefficients PB_coef0[10:0], PB_coef1[10:0], PB_coef2[10:0], . . . , PB_coef31[10:0], PB_coef32[10:0] are outputted to the L-tap FIR filter 415 according to a coefficient renewal control signal Latch_Enb outputted from the control signal generating section 411.

Figure 13:
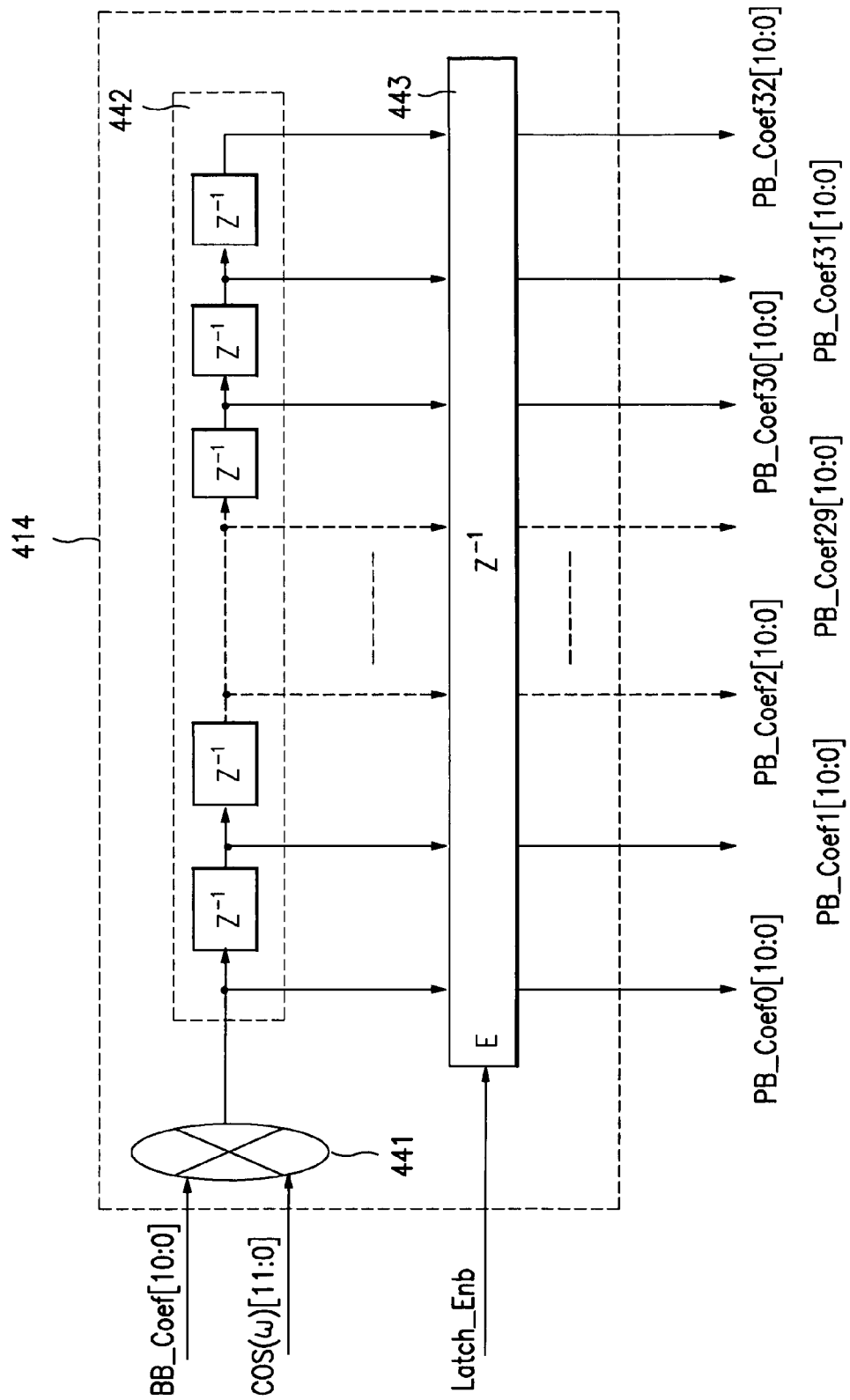
FIG. 13 is a detailed block diagram of the passband filter coefficient generating section in FIG. 9.

FIG. 13 is a detail block diagram of the passband matched filter coefficient generating section 414 which comprises only one multiplexer 441, serial delay section 442 of the number of N (e.g. N=32), and coefficient renewal parallel delay section 443 of the number of N+1, instead of using the multiplexer of the number of N+1 for lessening the degree of circuit complexity. The coefficient renewal parallel delay section 443 of the number of N+1 is enabled by the coefficient renewal control signal Latch_Enb generated from the control signal generating section 411.

Referring to FIG. 13, the multiplexer 441 outputs the fixed baseband matched filter coefficients BB_Coef[10:0] of the 33 taps generated from the baseband filter coefficient generating section 413 and the cosine COSco [11:0] of the 12 bit size outputted from the cosine wave section 412 to a serial delay section 442 by convoluting per sample unit in the frequency region.

The serial delay section 442 orderly stores the convolution result of the multiplexer 441 in the 32 delays by the serial method and then outputs to a coefficient renewal parallel delay section 443.

The coefficient renewal parallel delay section 443 is enabled by the coefficient renewal control signal Latch_Enb generated from the control signal generating section 411 and simultaneously outputs the convolution results stored in the serial delay section 442 to the L-tap FIR filter 415 by delaying 1 symbol. That is, the coefficient renewal parallel delay section 443 of the 33 taps is renewed by the coefficient renewal control signal Latch_Enb changed to the logic '1' on every 33 samples, and becomes the passband matched filter coefficient of the 33 taps PB_coef[10:0], PB_coef1 [10:0], PB_coef2[10:0], . . . , PB_coef31[10:0], PB_coef2 [10:0] well-adapted to the renewal value to the carrier frequency $\omega$ of the 11 bit size.

FIG. 14 is a detail block diagram of the L-tap FIR filter 415 which is a conventional FIR filter of symmetric structure in comprising a serial delay section 451 of the number of L (e.g. L=65); an adder for adding the 1 symbol delayed signal from the serial delay section 451 and the delayed signal; an adding section 452 of the number of N (e.g. N=32) for adding the 2 symbol delayed signal and the 64 symbol delayed signal; a multiplying section 453 of the number of N for respectively convoluting the adding section 452 and the passband matched filter coefficient of the 33 taps PB_coef0[10:0], PB_coef1[10:0], PB_coef2[10:0], . . . , PB_coef31[10:0], PB_coef32[10:0]; and an adding section 454 for adding all the outputs of the multiplying section 453 of the number of N. The L-tap FIR filter 415 performs a role of the passband matched filter considering the passband filter coefficient adapted to the carrier frequency generated from the passband matched filter coefficient generating section 414 as the coefficient of the FIR filter, and filters the outputted data of the symbol recovery section 402 having the frequency offset to the passband.

That is, the L-tap FIR filter section 415 is a 65-tap FIR filter having the passband matched filter coefficient of the 33 taps PB_coef0[10:0], PB_coef1[10:0], PB_coef2 [10:0], . . . , PB_coef31[10:0], PB_coef32[10:0] adapted to the carrier frequency generated from the passband matched filter coefficient generating section 414 as the filter coefficients, and gains a passband digital signal without any frequency distortion by the frequency offset $\Delta\omega$ when convoluting the passband digital signal generated from the symbol recovery section 402 to the 65-tap FIR filter at a timing axis.

Finally, the output data of the digital passband matched filter section 403 does not have the distortion by the frequency offset $\Delta\omega$.

Second Embodiment of the Present Invention

FIG. 16 is a structural diagram of a multimedia digital broadcast receiver according to a second embodiment of the present invention, which comprises a pre-processing section 501 for outputting the passband digital signal; a carrier wave section 502 generating the cosine COS having the carrier frequency as the center frequency and the carrier frequency adapt-period Adapt_Period control signal; the cosine COS outputted from the carrier wave recovery section 502; and a digital passband matched filter section 503 for outputting the carrier frequency by automatically adapting from the pre-processing section 501 according to the carrier frequency adapt-period control signal Adapt_Period to the post-processing section 504.

Figure 17:
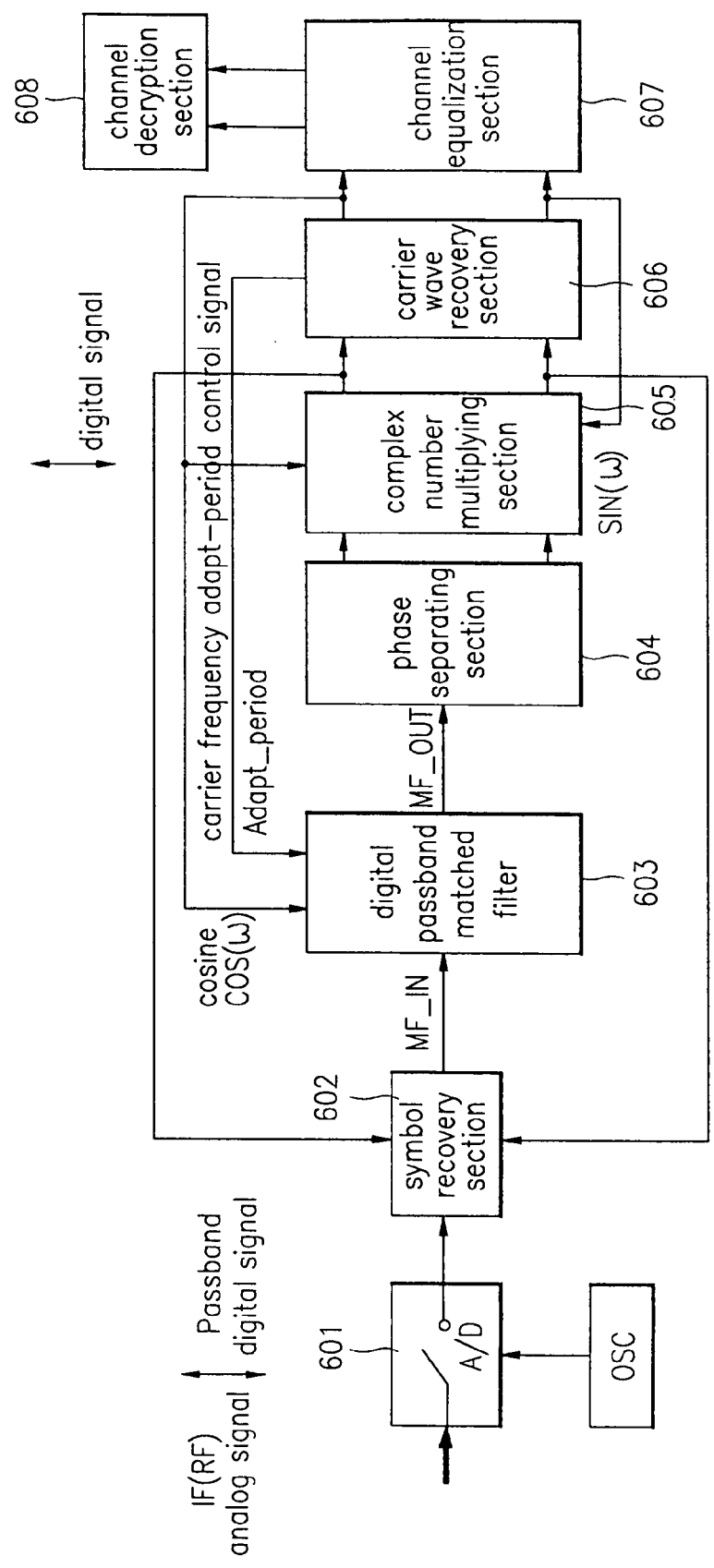
FIG. 17 is a configuration block diagram of the VSB (OFDM)/QAM/QPSK in accordance with the present invention, being equipped with a carrier wave recovery section generating a carrier frequency adaptive interval control signal and with a digital passband matched filter automatically adapting to the carrier frequency in FIG. 16.

FIG. 17 is a structural diagram of a digital demodulator according to the second embodiment of the present invention equipped with the carrier recovery section 502 generating the digital passband matched filter 503 automatically adapting the carrier frequency, cosine wave having the carrier frequency as the center frequency, and the carrier recovery section 502 generating the carrier frequency adapt-period control signal as shown in FIG. 16, which is an embodiment of a VSB(OFDM)/QAM/QPSK multimedia digital broadcast receiver.

Referring to FIG. 17, an A/D converting section 601, a symbol recovery section 602, a digital passband matched filter section 603, a phase separating section 604, a complex number multiplying section 605, a carrier recovery section 606, a channel equalizing section 607 and a channel decryption section 608 are assembled.

That is, a difference between the second embodiment from the first embodiment in FIG. 8 is that the cosine COSω having the carrier frequency as the center frequency from the carrier recovery section 606 and the carrier frequency adapt-period control signal Adapt-Period of a predetermined interval are fed back to the digital passband matched filter 603. The digital passband matched filter 603 renews the coefficient of the passband matched filter only in the carrier frequency adapt-period according to the carrier frequency adapt-period control signal Adapt_Period. Thereby, one cosine ROM table is used for recovering the carrier frequency adaptive and the carrier frequency recovery so as to reduce the complexity of the circuit and to minimize the electrical energy consumption for operating the passband matched filter.

Figure 18:
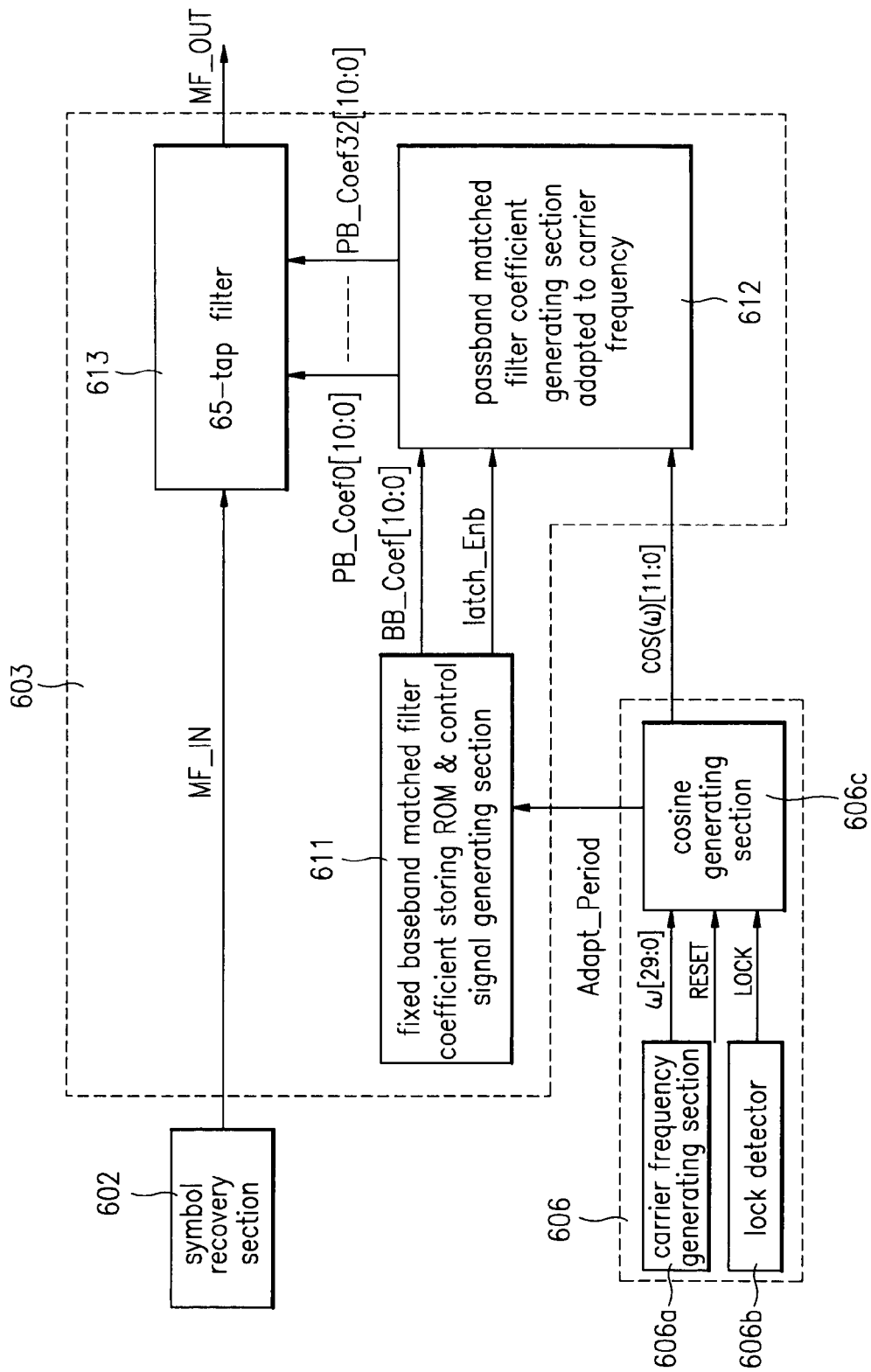
FIG. 18 is a detailed block diagram of the carrier wave recovery section and the digital passband matched filter in FIG. 17.

FIG. 18 is a detail block diagram of the carrier wave recovery section generating the digital passband matched filter, the cosine having the carrier frequency as the center frequency, and the carrier frequency adapt-period control signal. The carrier wave recovery section 606 comprises a carrier frequency generating section 606a for generating the carrier frequency; a lock detector 606b for outputting a lock control signal LOCK when capturing the frequency offset from the carrier wave recovery section 606; and a cosine wave generating section 606c for generating the cosine COS ω [11:0] having the carrier frequency as the center frequency and the carrier frequency adapt-period control signal Adapt_Period of 1 bit size according to the carrier frequency ω[29:0], the early system reset signal and the lock control signal LOCK of the lock detector 606b.

The digital passband matched filter 603 stores each fixed baseband matched filter coefficient by a number as great as the number of N+1 corresponding to the VSB(OFDM)/QAM/QPSK recovery method, and comprises a baseband matched filter coefficient storing ROM and control signal generating section 611 for outputting the fixed baseband matched filter coefficients BB_Coef[10:0] and the control renewal control signal Latch_Enb according to the carrier frequency adapt-period control signal Adapt_Period generated from the cosine wave generating section 606c. A passband matched filter coefficient generating section 612 generates the passband matched filter coefficient well-adapted to the carrier frequency according to the cosine COS ω [11:0] generated from the cosine wave generating section 606c of the carrier recovery section 606, filter coefficients BB_Coef[10:0] generated from the fixed baseband matched filter coefficient storing ROM and control signal generating section 611. A L-tap FIR(Finite Impulse Response) filter 613 filters the passband digital signal generated from the symbol recovery section 602 to the passband matched filter coefficient adapted to the carrier wave.

Figure 19:
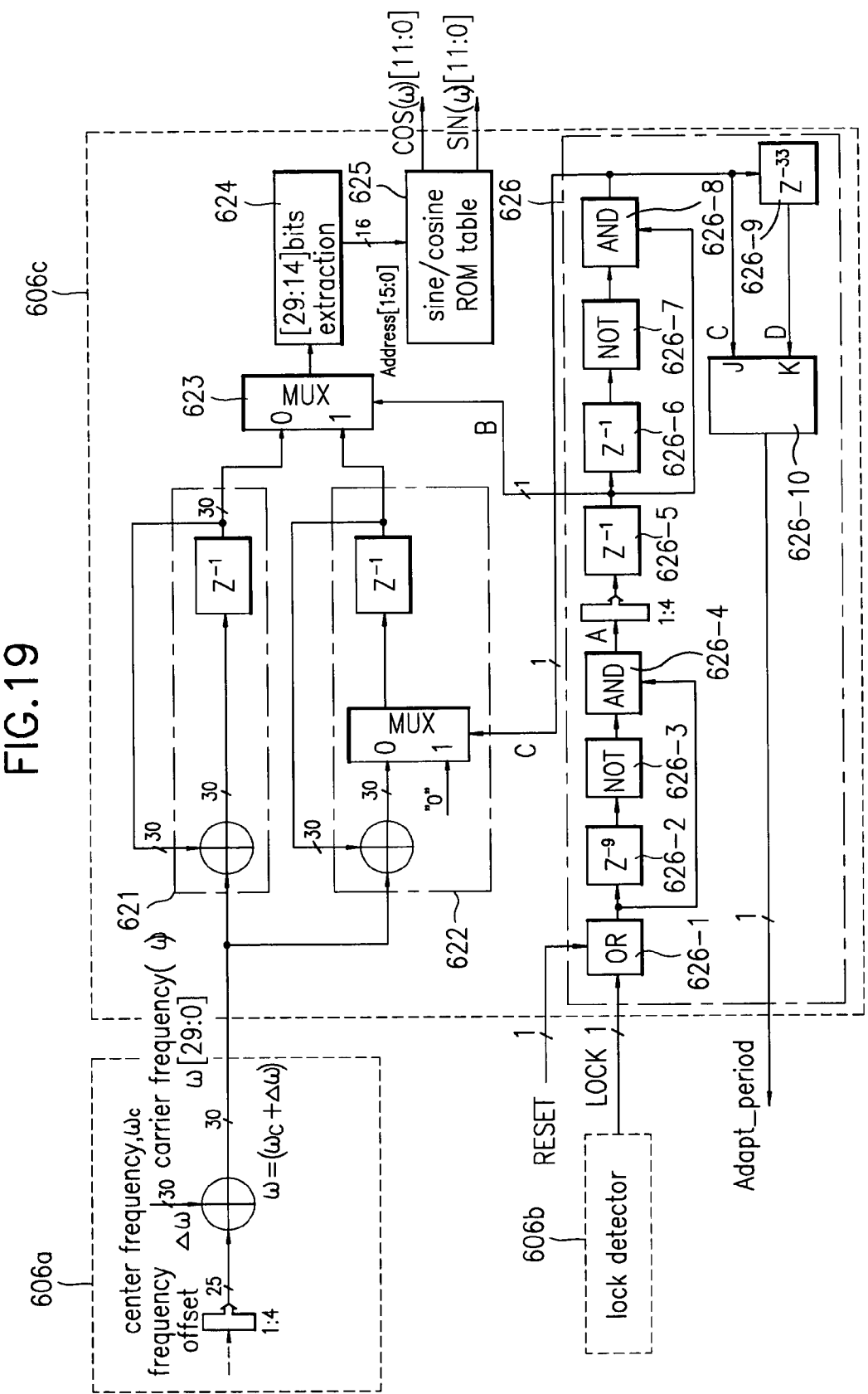
FIG. 19 is a detailed block diagram of the cosine wave generating section in FIG. 18.

FIG. 19 is a detailed block diagram of the carrier wave recovery section generating the cosine COS ω of 12 bit size, the sine SIN ω and the carrier frequency adapt-period control signal Adapt_Period. The carrier wave recovery section 606 comprises the carrier frequency generating section 606a; the lock detector 606b; and the cosine wave generating section 606c.

A detailed explanation for the carrier frequency generating section 606a is omitted in that it has the same structure and operation as the carrier frequency generating section 406a.

The cosine wave generating section 606c comprises an integral section 621 for the carrier frequency recovery having the adder and the delay; an integral section 622 for the carrier frequency adaptation having the adder, selector and delay; a selecting section 623 for selecting the output of the integral section 622 for the carrier frequency adaptation and an address generating section 624 for generating the address Address[15:0] corresponding to the output of the selecting section 623. The adapt-period control signal generating section 626 controls the integral section 622 for the carrier frequency adaptation and the selecting section 623 by generating a first through a fourth signal A~D from the lock control signal LOCK of the lock detector 606b, a reset signal RESET, and the sine/cosine ROM table 625 outputting the cosine and the sine stored in the address Address[15:0] from the address generating section 624.

Figure 20:
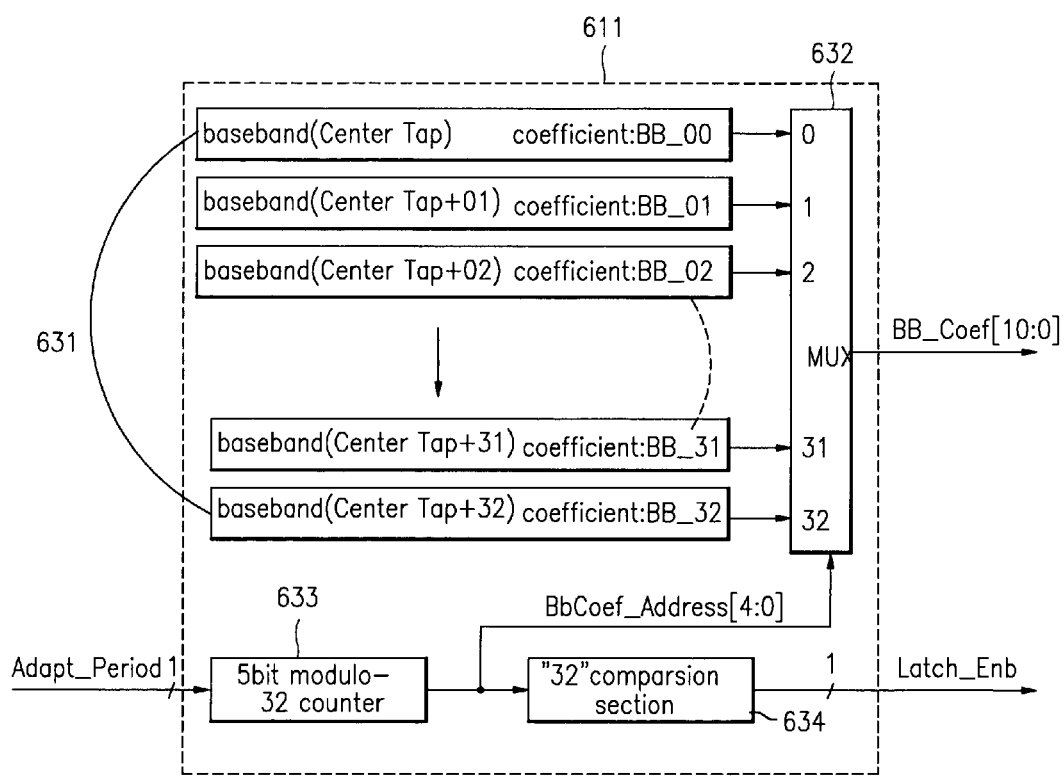
FIG. 20 is a detailed block diagram of the fixed baseband matched filter coefficient storage ROM and a control signal generating section in FIG. 18.

FIG. 20 is a detailed block diagram of the fixed matched filter coefficient storing ROM and control signal generating section 611, which is comprised as described below. A ROM 631 stores the fixed baseband matched filter coefficient BB_00~BB_32 of each 11 bit size corresponding to the VSB(OFDM)/QAM/QPSK demodulation method by a number as great as the number of N+1. A counter 633 generates the baseband filter coefficient selecting address Bbcoef_Address[K-1:0] of K bit (e.g. K=5) by counting the carrier frequency adapt-period control signal Adapt_Period. A selecting section 632 orderly outputs the fixed baseband matched filter coefficient stored in the ROM 631 according to the filter coefficient selecting address BbCoef_Address [K-1:0] generated from the counter 633. And a comparison section 634 of the number of 32 generates the coefficient renewal control signal Latch_Enb of 1 bit size for renewing the passband matched filter coefficient adapted to the carrier frequency for 1 sample (or tap) on every 33 samples (or taps) whenever the output of the counter 633 is reset.

Here, the counter 633 is a K bit modulo-N counter generating the baseband filter coefficient selecting address BbCoef_Address[K-1:0] of K bits by repeatedly counting the carrier frequency adapt-period control signal Adapt_Period from 0 to N. The first and second embodiments show the use of the 5 bit modulo-32 counter. That is, if the counter 633 is the 5 bit modulo-32, it repeatedly counts from 0 to 32 by resetting the counted value of every 32 to 0. And the baseband filter coefficient selecting address BbCoef_Address[4:0] of the 5 bit size corresponding to 0~32 is outputted to the selecting section 632 and the 32 comparison section 634 together.

Figure 21:
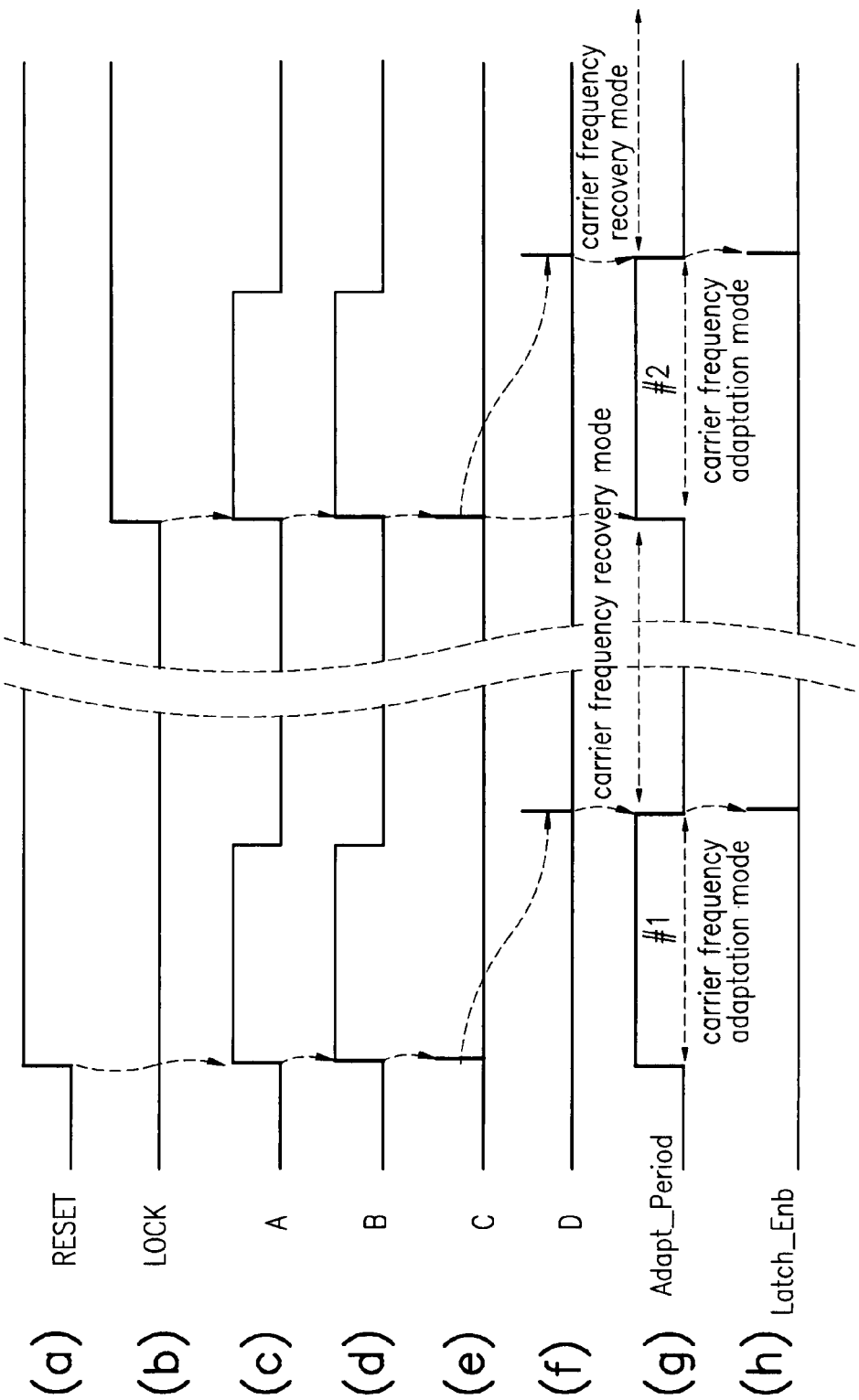
FIG. 21 is a timing view showing control signals of the carrier wave recovery section and the digital passband matched filter in accordance with the second example of the present invention.

FIG. 21 is a timing diagram of the control signals of the digital passband matched filter and the carrier wave recovery section in FIGS. 18 through 20, and FIG. 22 is another timing diagram showing an embodiment of the cosine generation according to the control signals of the digital passband matched filter and the carrier wave recovery section in FIGS. 18 through 20. As comprised above, the second embodiment of the present invention explains the VSB(OFDM0/QAM/PQSK) multimedia digital broadcast receiver in FIG. 17 as the embodiment.

That is, A/D converting section 601 outputs a second IF signal (e.g. VSB(OFDM)/QAM/QPSK analog signal) outputted from the analog receiving section 101 according to the fixed sampling frequency generated from an oscillator to a symbol recovery section 602 using a re-sampling after converting to the passband digital signal. The symbol recovery section 602 outputs the symbol-recovered passband digital signal to the digital passband matched filter 603 by interpolating for reducing an error between the passband digital signal from the A/D converting section 601 and the signal.

The digital passband matched filter 603 outputs the passband digital signal without any frequency distortion while automatically adapting to the passband digital signal generated with the frequency offset $\Delta\omega$ from the symbol recovery section 602 to the passband digital signal, by using the cosine COS $\omega$ generated from the carrier wave recovery section 606 at the rear end, to the phase separating section 604. The phase separating section 604 separates the filtered passband digital signal in the digital passband matched filter 603 into an I signal and Q signal, and outputs to the complex number multiplying section 605. The complex number multiplying section 605 digitally modulates each of the I and Q passband digital signals to the cosine COS $\omega$ and the sine SIN $\omega$ fed back from the carrier wave recovery section 606 at the rear, and then outputs the I and Q passband digital signals to the carrier recovery section 606 after transforming the I and Q baseband digital signals. At this time, the I and Q baseband digital signals generated from the complex number multiplying section 605 includes the carrier frequency offset and the phase noise generated from a tuner and a mixer.

Accordingly, the carrier wave recovery section 606 outputs the I and Q baseband digital signals to the channel equalizing section 607 after removing the carrier frequency offset and the phase noise. At this time, the cosine COS $\omega$ having the carrier frequency as the center frequency and the carrier frequency adapt-period control signal Adapt_Period are returned to the digital passband matched filter 603 and the complex number multiplying section 605, and the sine SIN having the carrier frequency as the center frequency is returned to the complex number multiplying section 605 only.

The operation of the channel equalizing section 607 and the channel decryption section 609 is omitted in that the detailed explanation is the same as FIG. 8.

FIG. 18 is a detailed block diagram showing an embodiment of the digital passband matched filter 603 and the carrier wave recovery section 606. The fixed baseband matched filter coefficients of the number of N+1 (e.g. N=32) stored in the ROM as the cosine COS generated from the carrier frequency adaptive mode of the carrier frequency 606 is convoluted in the frequency region and generates the passband matched filter coefficient adapted to the carrier frequency.

If the passband digital signal outputted from the symbol recovery section 602 is convoluted at the timing axis to the L-tap FIR filter considering the passband matched filter coefficient adapted to the carrier frequency as a coefficient, the passband digital signal without any frequency distortion is obtained by the frequency offset ($\omega$).

To accomplish this, the cosine wave generating section 606c of the carrier wave recovery section 606 generates the cosine COS $\omega$ of a 12 bit size having the carrier frequency $\omega$ as the center frequency and the carrier frequency adapt-period control signal of the 1 bit size Adapt_Period by receiving the following: a carrier frequency $\omega$ [29:0] of the 30 bit size generated from the carrier frequency generating section 606a; the lock control signal of the 1 bit size LOCK generated from the lock detector 606b; and the early system reset signal of the 1 bit size RESET.

At this time, the output of the cosine wave generating section 606c has different meanings according to the following two operating modes.

i) Carrier frequency adaptive mode: as in the activating state of the lock control signal LOCK or the reset signal RESET, which activates the carrier frequency adapt-period control signal Adapt_Period for notifying the passband matched filter coefficient adapted to the carrier frequency for the intervals of N+1 (e.g. 33 samples) and generates the cosine COS $\omega$ of the 12 bit size having the values from 0 to $2\pi$ corresponding to the function of the carrier frequency adaptation.

ii) Carrier frequency recovery mode: as in the inactivating state of the lock control signal LOCK or the reset signal RESET, which inactivates the carrier frequency adapt-period control signal Adapt_Period and generates the cosine COS $\omega$ of the 12 bit size having the values from 0 to $2\pi$ corresponding to the function of the carrier frequency recovery.

As described above, the cosine wave generating section 606c reduces the circuit complexity from using one cosine ROM table in the carrier wave recovery section 606 without any relations to each operating mode by using the second operating mode. That is, the carrier frequency adaptive mode and the carrier frequency recovery mode is performed by one cosine ROM table. Also, the digital passband matched filter 603 minimizes the electrical energy consumption requested in the filter operation because of the renewal of the filter coefficient adapted to the carrier frequency in the carrier frequency adaptive mode only.

FIG. 19 is a detailed block diagram of carrier frequency generating section 606a of the carrier wave recovering section 606 and a cosine wave generating section 606c for generating cosine wave COS($\omega$) and a carrier frequency adaptive period control signal Adapt_Period for interface with the digital passband matched filter 603.

An adder of the carrier frequency generating section 606a adds a fixed intermediate frequency $\omega_c$ of 30 bits to a frequency offset $\Delta\omega$ of 25 bits renewed for each unit of symbol by the carrier wave recovery section 606, so that a carrier frequency $\omega$[29:0] of 30 bits is generated and then output to the cosine wave generating section 606c.

The cosine wave generating section 606c receives the carrier frequency $\omega$[29:0] generated by the carrier frequency generating section 606a, a lock control signal of 1 bit generated by the lock detector 606b, and an initial system reset signal RESET of 1 bit, so that the cosine wave generating section 606c should be in two modes, i.e., the carrier frequency adaptive mode and the carrier frequency recovery mode. That is, if the lock control signal LOCK is active or the reset signal is active, the cosine wave generating section is operating in the carrier frequency adaptive mode. Otherwise, the cosine wave generating section is operating in the carrier frequency recovery mode.

At this time, the carrier frequency recovery mode is operated by a carrier frequency recovery integrating section 621 consisting of an adder and a delayer. If the second control signal B output from the adaptive period control signal generating section 626 has a logic value '0', an address Address[15:0] referring to the sine wave/cosine wave ROM table 625 is generated based on the output of the carrier frequency recovery integrating section 621.

The carrier frequency adaptive mode is operated by a carrier frequency adaptive integrating section 622 consisting of an adder, a selector and a delayer. If the second control signal B output from the adaptive period control signal generating section 626 has a logic value '1', an address Address[15:0] referring to the sine wave/cosine wave ROM table 625 is generated based on the output of the carrier frequency adaptive integrating section 622.

In other words, the output of the carrier frequency recovery integrating section 621 and the output of the carrier frequency adaptive integrating section 622 are output to the selector 623. The selector 623 selects either the output of the carrier frequency recovery integrating section 621 or the output of the carrier frequency adaptive integrating section 622 in accordance with the control signal of the adaptive period control signal generating section 626. Then, the selector 623 outputs the selected output to the address generating section 624. The address generating section 624 extracts M (for example, M=16 bits; [29:14]) from the output of the selector and generates a sine wave/cosine wave address signal Address[15:0] of M bits (for example, M=16) corresponding to (0~2π). The address signal Address[15:0] generated by the address generating section 624 is used as a single address of the sine wave/cosine wave ROM table 625. The sine wave/cosine wave ROM table 625 reads out the cosine wave of 12 bits COS(ω)[11:0] and the sine wave SIN(ω)[11:0] which are stored in the input address Address [15:0]. At this time, the cosine wave COS(ω)[11:0] is fed back to the digital passband matched filter 603 and the complex number multiplying section 605 while the sine wave SIN(ω)[11:0] is fed back to the complex number multiplying section 605 only.

The cosine wave COS(ω)[11:0] generated by the sine wave/cosine wave ROM table 625 using the address signal Address[15:0] generated by the carrier frequency adaptive mode as the input value starts from +1 by the third control signal C of the adaptive period control signal generating section 626 input to the selector of the carrier frequency adaptive integrating section 602. The +1 is multiplied by a center tap coefficient of the fixed baseband matched filter stored in the ROM of the fixed baseband matched filter coefficient ROM & control signal generating section 611. The multiplied result becomes a center tap coefficient of the adapted passband filter coefficient.

That is to say, the selector of the carrier frequency adaptive integrating section 622 selects the output of the adder if the third control signal C is 0, while the selector selects a reset signal 0 and outputs it to the delayer if the third control signal C is 1. The delayer delays the output of the selector by 1 symbol and outputs it to the selector 623 while also feeding it back to the adder.

At this time, the third control signal C has a logic value '1' for 1 sample whenever the lock control signal LOCK or the reset signal RESET becomes active. Accordingly, the address generating section 624 for an address signal from the output of the carrier frequency adaptive integrating section 622 allows the cosine wave address signal Address [15:0] to have a logic value 0 for each period of 33 samples by the third control signal C. That is, in the carrier frequency adaptive mode, the cosine wave address signal Address[15: 0] starts from the logic value 0 for each period of 33 samples.

Meanwhile, the OR gate 626-1 of the adaptive period control signal generating section 626 for generating the first to fourth control signals A~D and the carrier frequency adaptive period control signal Adapt_Period performs a logic OR operation of the reset signal RESET as shown in (a) of FIG. 21 and the lock control signal LOCK as shown in (b) of FIG. 21. Then, the OR gate 626-1 outputs the resultant value to the delayer 626-2. That is, the OR gate 626-1 outputs the logic value 1 to the delayer 626-2 only when the lock control signal LOCK or the reset signal RESET becomes active. The delayer 626-2 delays the output of the OR gate 626-1 for 9 symbols and outputs the delayed value to the inverter 626-3. The inverter 626-3 inverts the output of the delayer. The signal inverted by the inverter 626-3 is output to the AND gate 626-4. The AND gate 626-4 performs a logic AND operation of the output of the delayer 626-2 at the output of the inverter 626-3. Then, the AND gate 626-4 generates the first control signal A as shown in (c) of FIG. 21 and outputs it to the delayer 626-5. The delayer 626-5 delays the first control signal A by 1 symbol and generates the second control signal B as shown in (d) of FIG. 21. Then, the delayer 626-5 outputs the second control signal B to the selector 623 and at the same time outputs it to the delayer 626-6. The delayer 626-6 delays the output of the delayer 626-5 by 1 symbol and outputs the delayed value to the inverter 626-7. The inverter 626-7 inverts the output of the delayer 626-5. The signal inverted by the inverter 626-7 is output to the AND gate 626-8. The AND gate 626-8 performs logic AND operation of the output of the delayer 626-5 at the output of the inverter 626-7. Then, the AND gate 626-8 generates the third control signal C as shown in (e) of FIG. 21 and outputs it to the selector of the carrier frequency adaptive integrating section 622, the delayer 626-9, and the J-K flip-flop 626-10. That is, the third control signal has a logic value '1' for 1 sample when the lock control signal LOCK or the reset signal RESET becomes active as shown in (e) of FIG. 21.

The delayer 626-9 delays the third control signal C by 33 symbols to generate the fourth control signal D as shown in (f) of FIG. 21 and outputs it to the J-K flip flop 626-10. That is, the fourth control signal has a logic value '1' for 1 sample at a certain time period (for example, 33 sample period) after the lock control signal LOCK or the reset signal RESET becomes active as shown in (f) of FIG. 21.

The J-K flip flop 626-10 generates the third control signal C input to the J terminal and the carrier frequency adaptive period control signal Adapt_Period as shown in (g) of FIG. 21 from the fourth control signal D input to the K terminal using characteristics of the J-K flip-flop. That is, the carrier frequency adaptive period control signal Adapt_Period has a logic value '1' for a certain time period (for example, 33 sample periods) after the lock control signal LOCK or the reset signal RESET becomes active as shown in (g) of FIG. 21. At this time, the cosine wave generating section 660c is operating in the carrier frequency adaptive mode.

Meanwhile, the fixed baseband matched filter coefficient ROM & control signal generating section 611 of the digital passband matched filter 603 stores in advance the fixed baseband matched filter coefficients BB_Coef[10:0] in the ROM 631 by (N+1)(for example, N=32). The 33 fixed baseband matched filter coefficients BB_Coef[10:0] stored in the ROM 631 are subsequently output to the passband matched filter coefficient generating section 612 through the multiplexer 632. Here, the fixed baseband matched filter coefficients BB_Coef[10:0] are stored in the ROM 631 according to digital demodulation methods such as VSB, OFDM, QAM, QPSK and 3PSK.

Also, the 33 fixed baseband matched filter coefficients BB_Coef[10:0] stored in the ROM 631 are referred/generated by the counted value of the 5-bit modulo-32 counter 633. That is, the carrier frequency adaptive period control signal Adapt_Period of 1 bit is input to the 5-bit modulo-32 counter 633 and then counted. The 5-bit modulo-32 counter 633 is reset to 0 whenever the counted value becomes 32. The 5-bit signal output from the 5-bit modulo-32 counter 633 is provided as the selective signal BbCoef_Address[4:0] of the multiplexer 632 to select the 33 fixed baseband matched filter coefficients BB_Coef[10:0] stored in the ROM 631.

That is to say, the 5-bit modulo-32 counter 633 repeatedly counts the carrier frequency adaptive period control signal Adapt_Period from 0 to 32 so as to generate the selective address signal BbCoef_Address[4:0] of the multiplexer 632. Accordingly, the selective address signal BbCoef_Address[4:0] of the multiplexer 632 is generated for 33 sample(tap) periods in the carrier frequency adaptive mode.

Furthermore, the output of the counter 633 is output to the 32 comparison section 634. The 32 comparison section 634 generates the coefficient renewal control signal Latch_Enb for 1 sample as shown in (h) of FIG. 21 whenever the output of the counter 633 is reset to 32, i.e., 0. The 32 comparison section 634 then outputs it to the passband matched filter coefficient generating section 612. That is, the 32 comparison section 634 generates the coefficient renewal control signal Latch_Enb for renewing the passband filter coefficient adapted to the carrier frequency ($\omega$) for 1 sample period for each period of 33 sample(tap) by activation of the carrier wave adaptive period control signal Adapt_Period of 1 bit generated in the carrier frequency adaptive mode.

Figure 22:
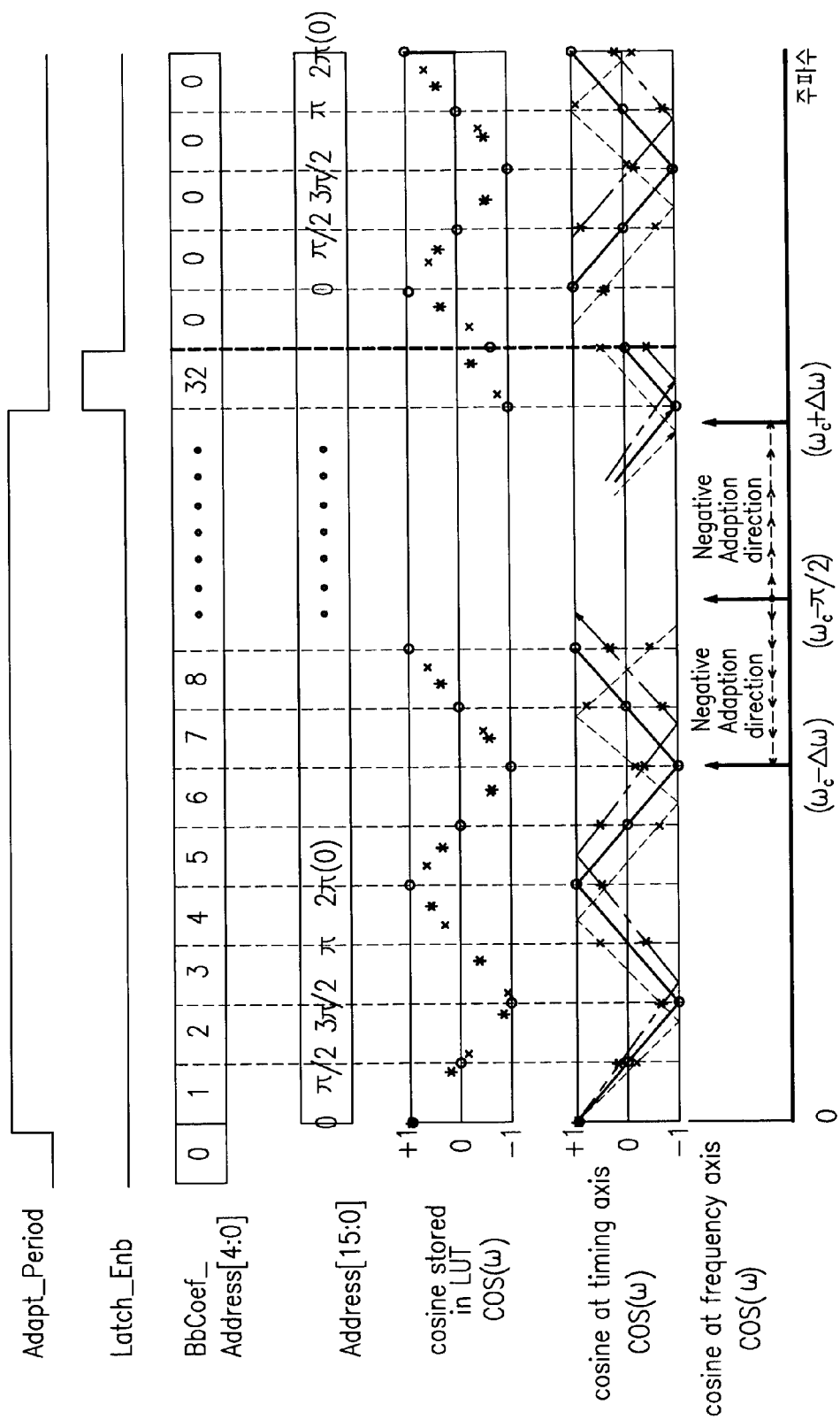
FIG. 22 is a timing view showing the cosine wave generation in accordance with control signals of the carrier wave recovery section and the digital passband matched filter in accordance with the second example of the present invention.

FIG. 22 is a timing chart for generating the cosine wave according to the matched filter control signal, and shows embodiments of FIGS. 19 and 20. Supposing that a symbol rate of the system normalized to a symbol frequency of 5 MHz is $\pi/2$ and its sample rate is $2\pi$, 1 period of the carrier wave having no frequency offset $\Delta\omega$ ($\Delta\omega=0$) is $2\pi$ and consists of 4 samples, accurately. In this case, the intermediate frequency $\omega_c$ is $\pi/2$. Also, 1 period of the carrier wave having the positive frequency offset $\Delta\omega(\Delta\omega>0)$ is smaller than $2\pi$ and consists of samples smaller than 4 samples. Accordingly, the intermediate frequency $\omega_c$ is $\pi/2+\Delta\omega$. Furthermore, 1 period of the carrier wave having the negative frequency offset $\Delta\omega$ ($\Delta\omega<0$) is greater than $2\pi$ and consists of samples greater than 4 samples. Accordingly, the intermediate frequency $\omega_c$ is $\pi/2)T$. The waveforms in a temporal axis and a frequency axis of the cosine wave $\cos(\omega)$ according to the respective frequency offsets as above are shown in FIG. 22.

Meanwhile, the passband matched filter coefficient generating section 612 convolutes the cosine wave $\cos(\omega)$ of 12 bits generated by the cosine wave generating section 606c of the carrier wave recovery section 606 and the fixed baseband matched filter coefficients BB_Coef[10:0] of 33 taps output from the fixed baseband matched filter coefficient ROM & control signal generating section 611 in the frequency area. The passband matched filter coefficient generating section 612 then generates the passband matched filter coefficients PB_Coef0[10:0], PB_Coef1[10:0], PB_Coef2[10:0], . . . , PB_Coef3[10:0], PB_Coef32[10:0] having 33 taps adapted to the carrier frequency of 11 bits. The passband matched filter coefficient generating section 612 finally outputs them to the L-tap FIR filter 613 for each period of 33 sample in accordance with the coefficient renewal control signal Latch_Enb output from the fixed baseband matched filter coefficient ROM & control signal generating section 611.

The configurations of the passband matched filter coefficient generating section 612 and the L-tap FIR filter 613 is identical to those of FIG. 13 and FIG. 14. Accordingly, in the second embodiment of the present invention, the description of their configuration and operation will be omitted.

Figure 23:
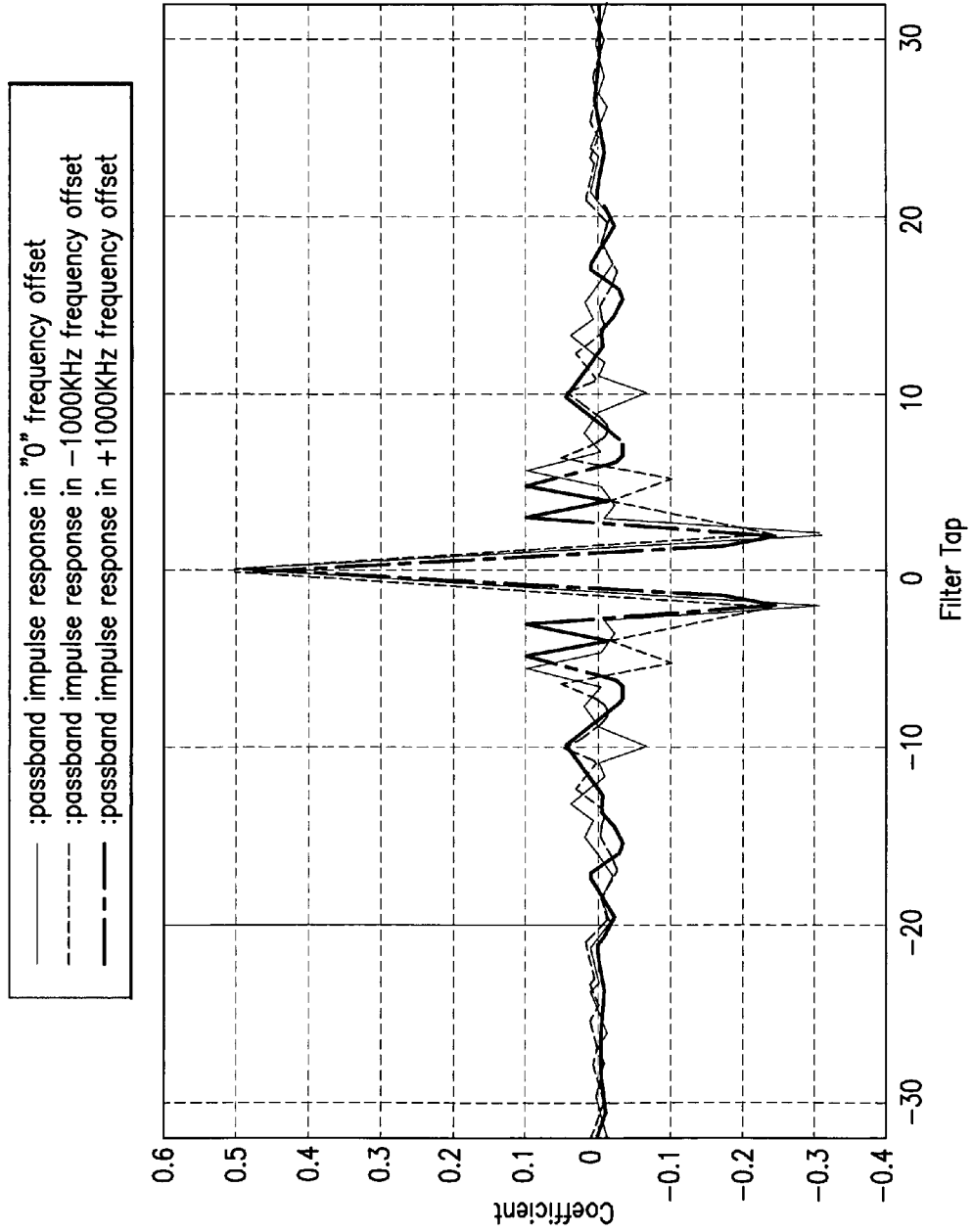
FIG. 23 is a view showing an impulse response caused by the frequency offset of the digital passband matched filter automatically adapting the carrier frequency in accordance with the present invention.
Figure 24:
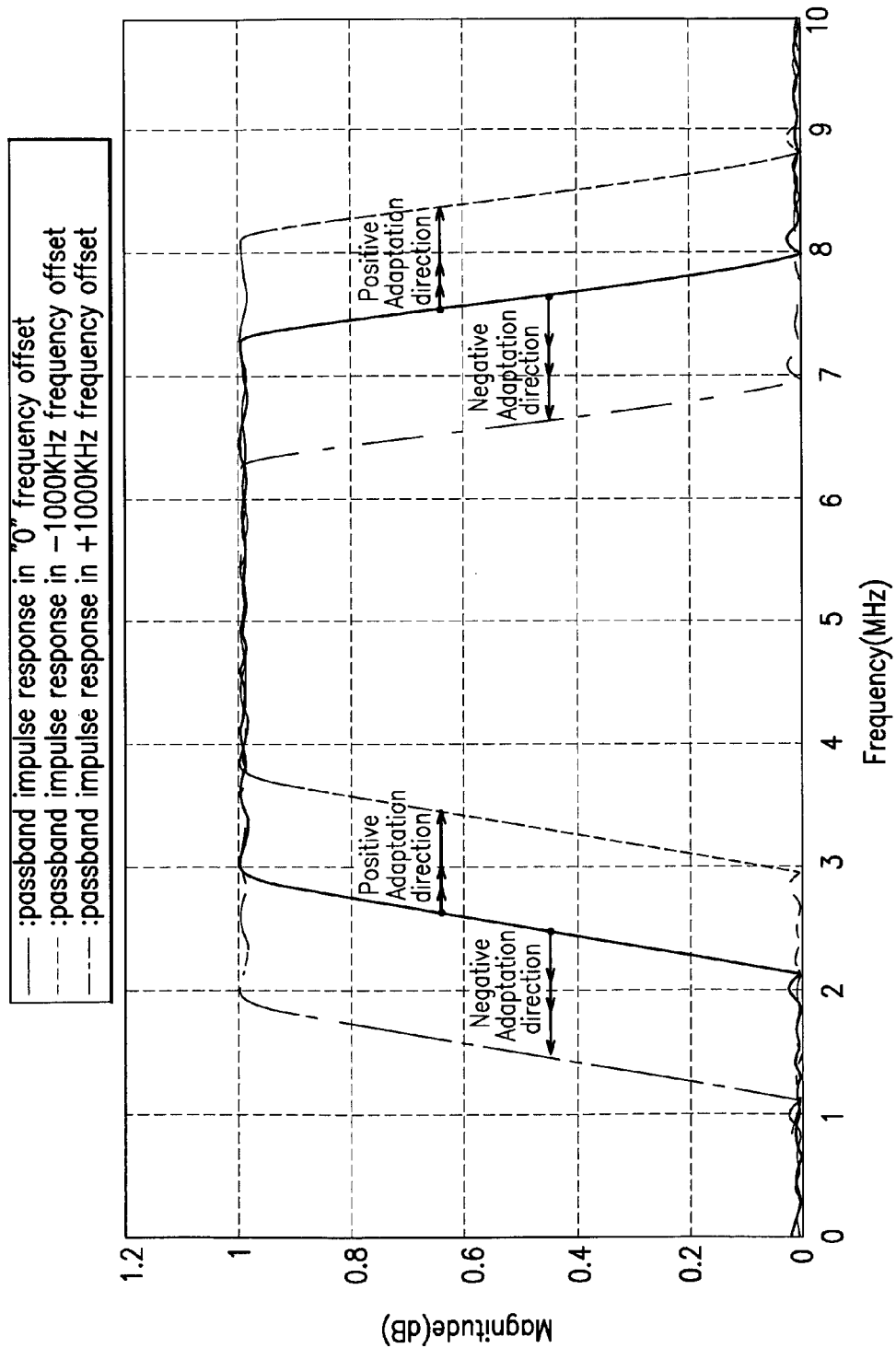
FIGS. 24 and 25 are views showing a frequency response caused by the frequency offset of the digital passband matched filter automatically adapting to the carrier frequency in accordance with the present invention.
Figure 25:
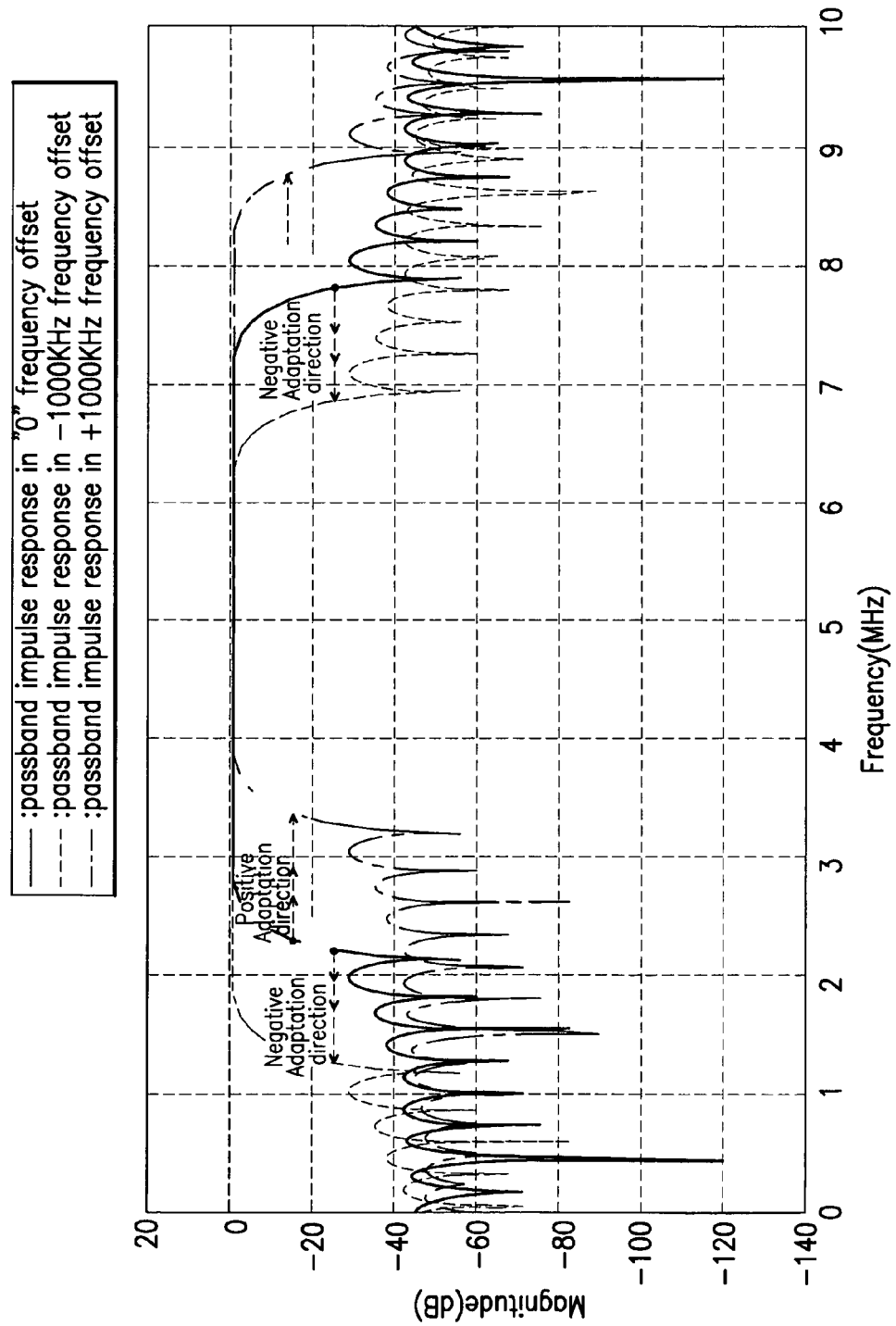

FIGS. 23 to 25 show spectrums of impulse response and frequency response according to the frequency offset $\Delta\omega$ of 65-tap FIR filter of the digital passband matched filter. In this embodiment, the frequency offset $\Delta\omega$ is ±1000 KHz. Referring to FIG. 23, if the frequency offset $\Delta\omega$ is 0, the impulse response of the digital passband matched filter automatically adapted to the carrier frequency is identical to the impulse response of the fixed passband matched filter. If the frequency offset $\Delta\omega$ is −1000 KHz, the impulse response of the digital passband matched filter automatically adapted to the carrier frequency is smaller than the impulse response of the fixed passband matched filter. That is, the digital passband matched filter has the impulse response having the low frequency, obtained by subtracting the frequency offset $\Delta\omega$ from the intermediate frequency $\omega_c$. If the frequency offset $\Delta\omega$ is +1000 KHz, the impulse response of the digital passband matched filter automatically adapted to the carrier frequency is greater than the impulse response of the fixed passband matched filter. That is, the digital passband matched filter has the impulse response having the high frequency, obtained by adding the frequency offset $\Delta\omega$ to the intermediate frequency $\omega_c$.

FIGS. 24 and 25 show the frequency response according to the frequency offset $\Delta\omega$ of the digital passband matched filter automatically adapted to the carrier frequency. If the frequency offset $\Delta\omega$ is 0, the frequency response of the digital passband matched filter automatically adapted to the carrier frequency is identical to the frequency response of the fixed passband matched filter. If the frequency offset $\Delta\omega$ is −1000 KHz, the frequency response of the digital passband matched filter automatically adapted to the carrier frequency is smaller than the frequency response of the fixed passband matched filter. That is, the digital passband matched filter has the frequency response having the low intermediate frequency 4 MHz, obtained by subtracting the frequency offset $\Delta\omega$ from the intermediate frequency 5 MHz. If the frequency offset $\Delta\omega$ is +1000 KHz, the frequency response of the digital passband matched filter automatically adapted to the carrier frequency is greater than the frequency response of the fixed passband matched filter. That is, the digital passband matched filter has the frequency response having the high intermediate frequency 6 MHz, obtained by adding the frequency offset $\Delta\omega$ to the intermediate frequency 5 MHz.

Figure 26:
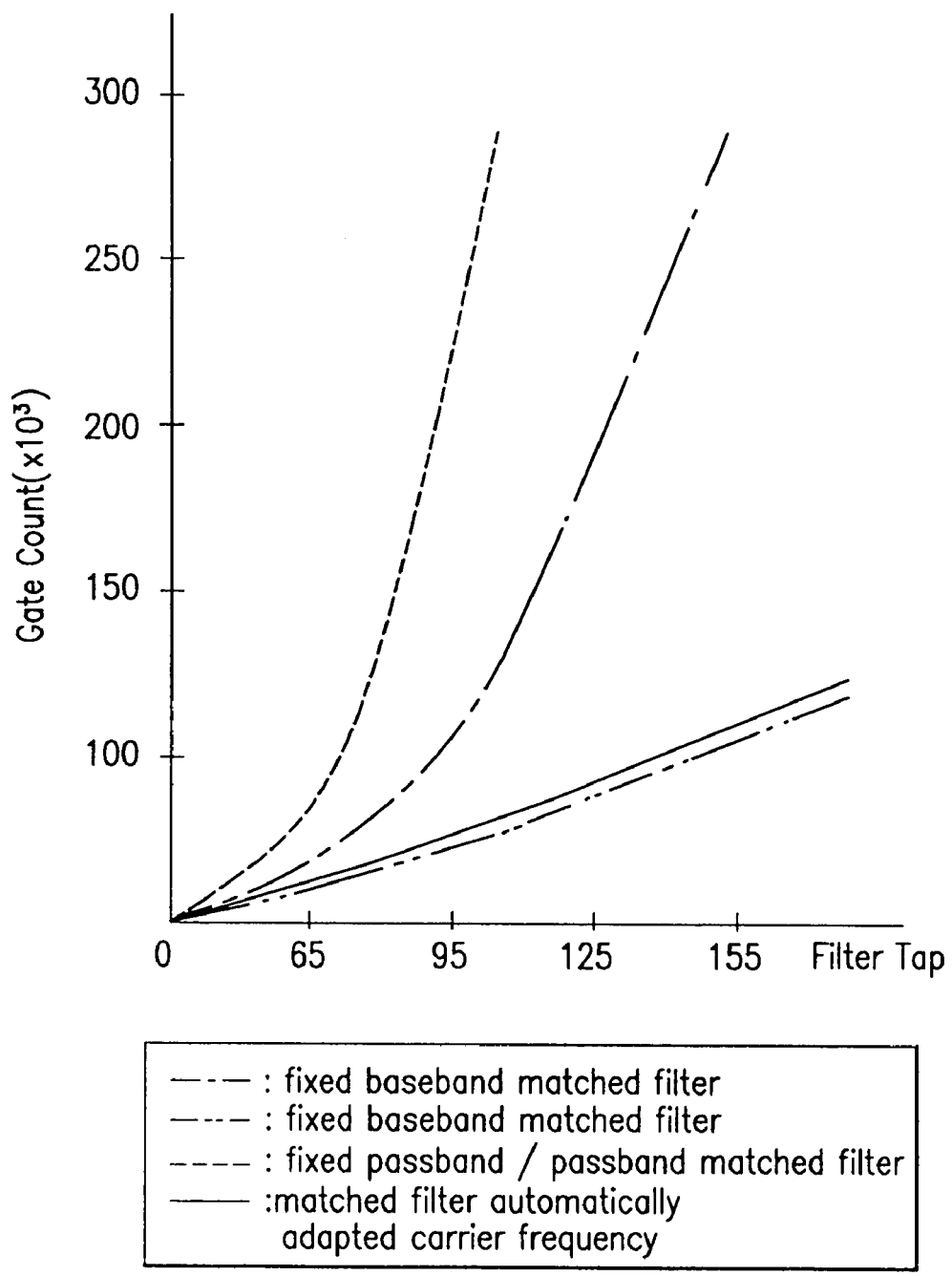
FIG. 26 is a circuit complex curve comparing the present invention and prior arts.

FIG. 26 shows circuit complexity curves according to the number of filter taps, in which circuit complexity by the related art fixed baseband matched filter, circuit complexity by the related art fixed passband matched filter, circuit complexity by the related art fixed baseband/passband matched filter, and circuit complexity by the digital passband matched filter of the present invention automatically adapted to the carrier frequency are shown. That is, it is noted that the following relation of the circuit complexity can be obtained from FIG. 26.

Circuit complexity of the related art fixed baseband/passband matched filter>circuit complexity of the related art fixed baseband matched filter>circuit complexity of the related art fixed passband matched filter>circuit complexity of the digital passband matched filter of the present invention automatically adapted to the carrier frequency.

Meanwhile, in the first and second embodiments of the present invention, the cosine wave has been used as the carrier wave multiplied by the baseband matched filter coefficients.

However, the sine wave may be used as the carrier wave. In this case, a 90° phase delayer is additionally used.

As described above, in the present invention, for convenience of description of the matched filter, experiment results and figures are limited to the 65-tap matched filter having a symmetrical structure. Likewise, the multimedia digital broadcast receiver is limited to the VSB(OFDM)/QAM/QPSK multimedia digital broadcast receiver. Therefore, the method and apparatus related to the digital passband matched filter automatically adapted to the carrier wave according to the present invention is applicable to all of receivers based on the passband matched filter.

As examples of the receivers, there are a single VSB ground wave digital receiver, a single OFDM ground wave digital receiver, a single QAM cable digital receiver, a single QPSK satellite digital receiver, a single 8 PSK satellite digital receiver, a composite VSB(OFDM)/QAM ground wave/cable digital receiver, a composite VSB(OFDM)/QPSK ground wave/satellite digital receiver, a composite VSB(OFDM)/8 PSK ground wave/satellite digital receiver, a multimedia VSB(OFDM)/QAM/QPSK ground wave/cable/satellite digital receiver, a multimedia VSB(OFDM)/QAM/8 PSK ground wave/cable/satellite digital receiver, and other digital receivers based on the passband matched filter.

As aforementioned, the matched filter, the filtering method and the digital broadcast receiver based on the matched filter according to the present invention have the following advantages.

Since the digital passband matched filter is automatically adapted to the carrier wave T in accordance with the frequency offset of the carrier wave, it is possible to obtain the passband digital signal having no frequency distortion due to the frequency offset. Thus, an optimal receiver can be obtained, in which drawbacks such as decrease of SNR and increase of circuit complexity caused by the fixed baseband/passband matched filter are solved.

Particularly, since the cosine wave generating section is operating in the carrier frequency restoring mode and the carrier frequency adaptive mode, respectively, a single cosine wave ROM table can be used regardless of the respective operating modes, thereby reducing circuit complexity more efficiently. Furthermore, since the digital passband matched filter automatically adapted to the carrier wave acts to renew the filter coefficients adapted to the carrier wave adaptive mode only, power consumption required to operate the filter can be minimized.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital passband matched filter having a carrier recovery section for converting a passband digital signal of a specific channel into a baseband digital signal, removing a frequency offset and a phase jitter by demodulating the passband digital signal into a complex carrier frequency, the matched filter comprising:
   a control signal generation section for generating a coefficient renewal control signal to control a renewal of a passband matched filter to each N+1 (N=(L−1)/2, L: a tap number) sample of a cosine wave address of M bits (M: a natural number) and a baseband filter selection address of K bits (K: a natural number) adapted to the carrier frequency outputted from the carrier recovery section;
   a cosine generation section for storing a cosine wave corresponding to 0~2π, and generating a cosine wave corresponding to the cosine wave address;
   a baseband filter coefficient output section for storing the baseband matched filter coefficient according to a number of N+1 (N=(L−1)/2, L: a tap number) samples, and selectively outputting the baseband matched filter coefficients in accordance with the baseband filter selection address;
   a passband filter coefficient generation section for generating passband matched filter coefficients adapted to the carrier frequency by convoluting the baseband matched filter coefficients outputted from the baseband filter coefficient output section according to the cosine wave generated in the cosine generation section in a proper frequency region, and outputting the passband matched filter coefficients in accordance with the coefficient renewal control signal; and
   a L-tap Finite Impulse Response (FIR) filter for convoluting the passband digital signal in a time axis based on a filter coefficient of the passband matched filter coefficients outputted from the passband filter coefficient generation section.

2. The digital passband matched filter of claim 1, wherein the control signal generation section comprises:
   a K bit modulo-N counter for generating a baseband filter coefficient selection address of K bits by counting 0~N repeatedly;
   a comparison section for outputting a coefficient renewal control signal for renewing the passband filter coefficient when a counted value of the counter is N;
   an integrator for accumulating with a symbol unit and outputting the carrier wave outputted from the carrier recovery section or outputting a zero value in accordance with an output of the comparison section; and
   an address generation section for generating a cosine address signal by extracting M bits from the outputs of the integrator, and providing the cosine address signal to the cosine generation section.

3. The digital passband matched filter of claim 2, wherein the cosine address signal generated in the address generation section starts at 0 with a period of N+1 sample signal outputted from the comparison section; and the cosine wave generated in reference to the cosine address signal starts at +1; and
   wherein, the +1 become a central tap coefficient of the passband matched filter by multiplying a central tap coefficient of the passband matched filter.

4. The digital passband matched filter of claim 1, wherein the baseband filter coefficient output section comprises:
   a memory for prestoring the baseband matched filter coefficient as according to the number of N+1; and
   a selection section for outputting the N+1 baseband matched filter stored in the memory in accordance with a baseband filter selection address signal.

5. The digital passband matched filter of claim 4, wherein the baseband matched filter coefficients are stored according to the number of N+1 in the memory, respectively.

6. The digital passband matched filter of claim 1, wherein the passband filter coefficient generation section comprises:

a multiplying section for convoluting the cosine wave generated in the cosine wave generation section according to the baseband matched filter coefficients selectively outputted from the baseband filter coefficient output section in a proper frequency region;

a serial delay section, including a plurality of delays, for successively delaying outputs signals of the multiplying section; and a parallel delay section, including a plurality of delays connected with one another in parallel, which is enabled by the coefficient renewal control signal, for delaying in parallel the baseband matched filter coefficients of N+1 tap adapted to the carrier frequency by simultaneously delaying the output of the serial delay section.

7. A digital passband matched filter having a carrier recovery section for converting a passband digital signal of a specific channel into a baseband digital signal, removing a frequency offset and a phase jitter by demodulating the passband digital signal into a complex carrier frequency, the matched filter comprising:

a baseband matched filter coefficient storage ROM and control signal generation section for storing baseband matched filter coefficients according to a number of N+1 (N=(L−1)/2, L: a tap number) samples, selectively outputting the stored baseband matched filter coefficients on a carrier frequency adaptive mode established during a predetermined interval, while generating a coefficient renewal control signal for controlling a renewal of a passband matched filter to each N+1 sample;

a passband filter coefficient generation section for generating passband matched filter coefficients adapted to the carrier frequency by convoluting the baseband matched filter coefficients according to a cosine wave provided from the carrier recovery section in a proper frequency region, and outputting the passband matched filter coefficients in accordance with the coefficient renewal control signal; and a L-tap Finite Impulse Response (FIR) filter for convoluting the passband digital signal in a time axis based on a filter coefficient of the passband matched filter coefficients outputted from the passband filter coefficient generation section.

8. The digital passband matched filter of claim 7, wherein the carrier frequency adaptive range is a point of activating a reset signal, or duration from a point of activating a lock control signal generating in accordance with a carrier recovery state in the carrier recovery section to a N+1 sample interval.

9. The digital passband matched filter of claim 7, wherein the baseband matched filter coefficient storage ROM and control signal generation section comprises:

a memory for pre-storing the baseband matched filter coefficient according to the number of N+1; and a selection section for outputting the N+1 baseband matched filter stored in the memory in accordance with a baseband filter selection address signal;

a K bit modulo-N counter for generating and outputting to the selection section, a baseband filter coefficient selection address of K bits by repeatedly counting a carrier frequency adaptive interval control signal representing the carrier frequency adaptive interval from 0~N; and a comparison section for generating and outputting a coefficient renewal control signal for renewing the passband filter coefficient when a counted value of the counter is N.

10. The digital passband matched filter of claim 7, wherein the passband filter coefficient generation section comprises:

a multiplying section for convoluting the cosine wave generated in the carrier recovery section by the baseband matched filter coefficients selectively outputted from the baseband matched filter coefficient storage ROM and control signal generation section in a proper frequency region;

a serial delay section, including a plurality of delays, for successively delaying outputs signals of the multiplying section; and a parallel delay section, including a plurality of delays connected with one another in parallel which is enabled by the coefficient renewal control signal, for delaying in parallel the baseband matched filter coefficients of N+1 tap adapted to the carrier frequency by simultaneously delaying the output of the serial delay section.

11. A method of filtering a digital passband matched filter having a carrier recovery section for converting a passband digital signal of a specific channel into a baseband digital signal, removing a frequency offset and a phase jitter by demodulating the passband digital signal into a complex carrier frequency, the method comprising the steps of:

generating passband matched filter coefficients adapted to the carrier frequency by convoluting a carrier frequency outputted from the carrier recovery section according to stored baseband matched filter coefficients in a proper frequency range; and convoluting the passband matched filter coefficients according to the passband digital signal in a time region, wherein the passband matched filter coefficients generating step further comprises the steps of:

storing the baseband matched filter coefficients according to a number of N+1 (N=(L−1)/2. L: a tap number) samples, and selectively outputting the stored baseband matched filter coefficients on a carrier frequency adaptive mode established during a predetermined range, while generating a coefficient renewal control signal for controlling a renewal of a passband matched filter to each N+1 sample; and generating passband matched filter coefficients adapted to the carrier frequency by convoluting the baseband matched filter coefficients according to a cosine wave provided from the carrier recovery section in a proper frequency region, and outputting the passband matched filter coefficients in accordance with the coefficient renewal control signal.

12. The method of filtering the digital passband matched filter of claim 11, wherein the step of generating a passband matched filter coefficients further comprises the steps of:

a1) generating a coefficient renewal control signal for controlling a renewal of a passband matched filter to each of a N+1 (N=(L−1)/2, L: a tap number) sample of a cosine wave address of M bits (M: a natural number) and a baseband filter selection address of K bits (K: a natural number) adapted to the carrier frequency outputted from the carrier recovery section;

b1) storing a cosine wave corresponding to 0~2π, and generating a cosine wave corresponding to the cosine wave address;

c1) storing the baseband matched filter coefficient according to the number of N+1 (N=(L−1)/2, L: a tap number) samples, and selectively outputting the baseband matched filter coefficient in accordance with the baseband filter selection address; and d1) generating a passband matched filter coefficients adapted to the carrier frequency by convoluting the baseband matched filter coefficients according to a cosine wave in a proper frequency region, and outputting the passband matched filter coefficients in accordance with the coefficient renewal control signal.

13. The method of filtering the digital passband matched filter of claim 12, wherein the a1) generating step further comprises the steps of:
   a2) generating a baseband filter coefficient selection address of K bits by counting 0~N repeatedly;
   b2) outputting a coefficient renewal control signal for renewing the passband filter coefficient when a counted value of the counter is N;
   c2) accumulating with a symbol unit and outputting the carrier wave outputted from the carrier recovery section or outputting a zero value in accordance with the coefficient renewal control signal; and
   d2) generating a cosine address signal by extracting M bits from the c2) accumulating step.

14. The method of filtering the digital passband matched filter of claim 12, wherein the c1) step of storing the baseband matched filter coefficient comprises the steps of:
   pre-storing the baseband matched filter coefficient according to the number of N+1; and
   selectively outputting the stored N+1 baseband matched filter coefficient in accordance with the baseband filter selection address signal.

15. The method of filtering a digital passband matched filter of claim 11, wherein the carrier frequency adaptive range is a point of activating a reset signal, or a duration from a point of activating a lock control signal generated in accordance with a carrier recovery state in the carrier recovery section to an N+1 sample interval.

16. The method of filtering the digital passband matched filter of claim 11, wherein the coefficient renewal control signal generating step further comprises the steps of:
   pre-storing the baseband matched filter coefficient according to the number of N+1;
   selectively outputting the N+1 baseband matched filter in accordance with a baseband filter selection address signal;
   generating a baseband filter coefficient selection address of K bits by repeatedly counting a carrier frequency adaptive interval control signal representing the carrier frequency adaptive interval from 0~N; and
   generating a coefficient renewal control signal for renewing the passband filter coefficient when a counted value of the counter is N.

17. A digital broadcast receiver outputting a passband digital signal by digitalizing an analog signal of a specific channel, the digital broadcast receiver comprising:
   a carrier recovery section for converting a passband digital signal of a specific channel into a baseband digital signal, removing a frequency offset of a carrier wave and a phase jitter by demodulating the passband digital signal into a sine/cosine wave synchronized in-phase with each other and generating a carrier frequency adaptive interval control signal representing a carrier frequency adaptive mode during a predetermined interval; and
   a passband matched filter for generating passband matched filter coefficients adapted to the carrier frequency by convoluting the cosine wave generated in the carrier recovery section according to stored baseband matched filter coefficients in a proper frequency range when the state of the carrier frequency adaptive interval control signal becomes active and convoluting the passband matched filter coefficients according to the passband digital signal in a time axis.

18. The digital broadcast receiver of claim 17, wherein the carrier recovery section comprises:
   a lock detection section for outputting a lock control signal corresponding to a recovery state of the carrier;
   a carrier frequency generation section for generating the carrier frequency by adding a frequency offset renewed by a symbol unit on a fixed intermediate frequency; and
   a cosine wave generation section for generating the carrier frequency adaptive interval control signal during a time beginning from a point of activation for the lock control signal or an initial system reset signal to a predetermined interval and the cosine wave for adapting the carrier wave, and generating the cosine wave for the carrier recovery in a non-activating interval of the carrier frequency adaptive interval control signal.

19. The digital broadcast receiver of claim 18, wherein the cosine generation section comprises:
   a first integrator for accumulating the carrier frequency with a symbol unit;
   a second integrator for accumulating with a symbol unit and outputting the carrier wave outputted from the carrier recovery section or outputting a zero value in accordance with the carrier frequency adaptive interval control signal;
   a selection section for selecting an output of the second integrator when the carrier frequency adaptive interval control signal is in an active state, while selecting an output of the first integrator when the carrier frequency adaptive interval control signal is in a non-active state;
   an address generation section for generating a cosine wave address signal of M bits (M is a natural number) by extracting M bits from an output of the selection section;
   a cosine ROM table, in which a plurality of cosine waves are previously stored, for outputting the cosine wave corresponding to a cosine wave address signal generated in the address generation section; and
   an adaptive interval control signal generation section for generating the carrier frequency adaptive interval control signal during a time from a point of activation for the lock control signal or an initial system reset signal to an N+1 sample interval by performing a logical combination of the lock control signal of the lock detection section and the initial system reset signal.

20. The digital broadcast receiver of claim 19, wherein the second integrator selects zero at a starting point of the carrier frequency adaptive interval by controlling the adaptive interval control signal generation section, the cosine wave address signal generated in the address generation section starts at 0 with a period of N+1 sample signal; and the cosine wave generated in reference to the cosine wave address signal starts at +1 during the carrier frequency adaptive interval by accumulating and outputting the carrier wave with a symbol unit in another interval[; wherein,] the +1 become a central tap coefficient of the passband matched filter by multiplying a central tap coefficient of the passband matched filter.

21. The digital broadcast receiver of claim 17, wherein the passband matched filter comprises:
   a baseband matched filter coefficient storage ROM and control signal generation section for storing the baseband matched filter coefficients according to a number of N+1 (N=(L−1)/2, L: a tap number) samples, selectively outputting the stored baseband matched filter coefficients according to activation of the carrier frequency adaptive interval control signal, while generating a coefficient renewal control signal for controlling a renewal of a passband matched filter to each N+1 sample;

a passband filter coefficient generation section for generating passband matched filter coefficients adapted to the carrier frequency by convoluting the baseband matched filter coefficients on the cosine wave provided from the cosine wave generation section of the carrier recovery section in a proper frequency region, and renewing the passband matched filter coefficients in accordance with a coefficient renewal control signal; and a L-tap Finite Impulse Response (FIR) filter for convoluting the passband digital signal in a time axis based on a filter coefficient of the passband matched filter coefficients outputted from the passband filter coefficient generation section.

22. The digital broadcast receiver of claim 21, wherein the baseband matched filter coefficient storage ROM and control signal generation section comprises:

a memory for prestoring the baseband matched filter coefficients according to the number of N+1; and a selection section for outputting the N+1 baseband matched filter stored in the memory in accordance with a baseband filter selection address signal;

a K bit modulo-N counter for generating and outputting to the selection section a baseband filter coefficient selection address of K bits by repeatedly counting a carrier frequency adaptive interval control signal representing the carrier frequency adaptive interval from ON; and a comparison section for generating and for outputting a coefficient renewal control signal for renewing the passband filter coefficient when a counted value of the counter is N.

23. The digital broadcast receiver of claim 21, wherein the passband filter coefficient generation section comprises:

a multiplying section for convoluting the cosine wave generated in the carrier recovery section according to the baseband matched filter coefficients selectively outputted from the baseband matched filter coefficient storage ROM and control signal generation section in a proper frequency region;

a serial delay section, including a plurality of delays, for successively delaying outputs signals of the multiplying section; and a parallel delay section, including a plurality of delays connected with one another in parallel which is enabled by the coefficient renewal control signal, for delaying in parallel the baseband matched filter coefficients of N+1 tap adapted to the carrier frequency by simultaneously delaying the outputs of the serial delay section.

24. A multimedia digital broadcast receiver outputting a passband digital signal by digitalizing an analog signal of a specific channel, the digital broadcast receiver comprising:

a carrier recovery section for converting an I, Q passband digital signal of a specific channel into a baseband digital signal, removing a frequency offset of a carrier wave and a phase jitter by demodulating the passband digital signal into a sine/cosine wave synchronized in phase with each other;

a passband matched filter for generating passband matched filter coefficients adapted to a frequency of the carrier by convoluting a cosine wave according to stored baseband matched filter coefficients in a proper frequency range after generating the cosine wave from a carrier frequency outputted from the carrier recovery section, and convoluting the passband matched filter coefficients according to the passband digital signal in a time axis;

a phase separation section for separating the I, Q passband digital signal from the passband digital signal filtered in the passband matched filter; and a channel equalizing and decryption section for removing an interference among symbols included in the I, Q passband digital signal provided from the carrier recovery section, and removing a burst and sporadic noises included in the signal in which the interference among symbols are removed.

25. The multimedia digital broadcast receiver of claim 24, wherein the passband matched filter comprises:

a control signal generation section for generating a coefficient renewal control signal for controlling a renewal of a passband matched filter to each of an N+1 (N= (L−1)/2, L: a tap number) sample of a cosine wave address of M bits (M: a natural number) and a baseband filter selection address of K bits (K: a natural number) adapted to the carrier frequency outputted from the carrier recovery section;

a cosine generation section for storing a cosine wave corresponding to 0~2π, and for generating a cosine wave corresponding to the cosine wave address;

a baseband filter coefficient output section for storing baseband matched filter coefficient according to the number of N+1 (N=(L−1)/2, L: a tap number) samples, and selectively outputting the baseband matched filter coefficient in accordance with the baseband filter selection address;

a passband filter coefficient generation section for generating passband matched filter coefficients adapted to the carrier frequency by convoluting the baseband matched filter coefficient outputted from the baseband filter coefficient output section according to a cosine wave generated in the cosine generation section in a proper frequency region, and outputting the passband matched filter coefficients in accordance with a coefficient renewal control signal; and a L-tap Finite Impulse Response (FIR) filter for convoluting the passband digital signal in a time axis based on a filter coefficient of the passband matched filter coefficients outputted from the passband filter coefficient generation section.

26. The multimedia digital broadcast receiver of claim 25, wherein the control signal generation section comprises:

a K bit modulo-N counter for generating a baseband filter coefficient selection address of K bits by counting 0~N repeatedly;

a comparison section for outputting a coefficient renewal control signal for renewing the passband filter coefficient when a counted value of the counter is N;

an integrator for accumulating with a symbol unit and outputting the carrier wave outputted from the carrier recovery section or outputting a zero value in accordance with an output of the comparison section; and an address generation section for generating a cosine address signal by extracting M bits from an output of the integrator, and providing the cosine address signal to the cosine generation section.

27. The multimedia digital broadcast receiver of claim 25, wherein the passband filter coefficient generation section comprises:

a multiplying section for convoluting the cosine wave generated in the cosine wave generation section according to the baseband matched filter coefficients selectively outputted from the baseband filter coefficient output section in a proper frequency region;

a serial delay section, including a plurality of delays, for successively delaying outputs signals of the multiplying section; and a parallel delay section, including a plurality of delays connected with one another in parallel which is enabled by the coefficient renewal control signal, for delaying in parallel the baseband matched filter coefficients of N+1 tap adapted to the carrier frequency by simultaneously delaying the output of the serial delay section.

28. A multimedia digital broadcast receiver outputting a passband digital signal by digitalizing an analog signal of a specific channel, the digital broadcast receiver comprising:

a carrier recovery section for converting a passband digital signal of an I, Q specific channel into a baseband digital signal, removing a frequency offset of a carrier wave and a phase jitter by demodulating the passband digital signal into a sine/cosine wave synchronized in phase with each other and generating a carrier frequency adaptive interval control signal during a predetermined interval;

a digital passband matched filter for generating passband matched filter coefficients adapted to the carrier frequency by convoluting the cosine wave generated in the carrier recovery section according to stored baseband matched filter coefficients in a proper frequency range when the state of the carrier frequency adaptive interval control signal become an active state, and filtering the passband digital signal according to the passband matched filter coefficients;

a phase separation section separating the I, Q passband digital signal from the passband digital signal filtered in the digital passband matched filter; and a channel equalizing and decryption section removing an interference among symbols included in the I, Q passband digital signal provided from the carrier recovery section, and removing a burst and sporadic noises included in the signal from which the interference among symbols are removed.

29. The multimedia digital broadcast receiver of claim 28, wherein the carrier recovery section comprises:

a lock detection section for outputting a lock control signal corresponding to a recovery state of the carrier;

a carrier frequency generation section for generating a carrier frequency by adding the frequency offset renewed by symbol unit on a fixed intermediate frequency; and a cosine wave generation section for generating the carrier frequency adaptive interval control signal during a time beginning from a point of activation for the lock control signal or an initial system reset signal to a predetermined interval and the cosine wave for adapting the carrier wave, and generating the cosine wave for the carrier recovery in a non-activating interval of the carrier frequency adaptive interval control signal.

30. The multimedia digital broadcast receiver of claim 29, wherein the cosine generation section comprises:

a first integrator for accumulating the carrier frequency with a symbol unit;

a second integrator for accumulating with a symbol unit and outputting the carrier wave outputted from the carrier recovery section or outputting a zero value in accordance with the carrier frequency adaptive interval control signal;

a selection section for selecting an output of the second integrator when the carrier frequency adaptive interval control signal is in an active state, while selecting an output of the first integrator when the carrier frequency adaptive interval control signal is in a non-active state;

an address generation section for generating a cosine address signal of M bits by extracting M bits from an output of the selection section;

a cosine ROM table, in which a plurality of cosine waves are previously pre-stored, for outputting the cosine wave corresponding to a cosine wave address signal generated in the address generation section; and an adaptive interval control signal generation section for generating the carrier frequency adaptive interval control signal during a time beginning from a point of activation for the lock control signal or an initial system reset signal to an N+1 sample interval (N is a natural number) by performing a logical combination of the lock control signal of the lock detection section and the initial system reset signal.

31. The multimedia digital broadcast receiver of claim 28, wherein the passband matched filter comprises:

a baseband matched filter coefficient storage ROM and control signal generation section for storing baseband matched filter coefficients according to a number of N+1 (N=(L−1)/2, L: a tap number) samples, selectively outputting the stored baseband matched filter coefficients according to activation of the carrier frequency adaptive interval control signal, while generating a coefficient renewal control signal for controlling a renewal of a passband matched filter to each N+1 sample;

a passband filter coefficient generation section for generating passband matched filter coefficients adapted to the carrier frequency by convoluting the baseband matched filter coefficients on the cosine wave provided from the cosine wave generation section of the carrier recovery section in a proper frequency region, and renewing the passband matched filter coefficients in accordance with a coefficient renewal control signal; and a L-tap Finite Impulse Response (FIR) filter for convoluting the passband digital signal in a time axis based on a filter coefficient of the passband matched filter coefficients outputted from the passband filter coefficient generation section.

32. The multimedia digital broadcast receiver of claim 31, wherein the baseband matched filter coefficient storage ROM and control signal generation section comprises:

a memory for pre-storing the baseband matched filter coefficients according to the number of N+1;

a selection section for outputting the N+1 baseband matched filter coefficients stored in the memory in accordance with a baseband filter selection address signal;

a K bit modulo-N counter for generating and outputting to the selection section a baseband filter coefficient selection address of K bits by repeatedly counting a carrier frequency adaptive interval control signal representing the carrier frequency adaptive interval from ON; and a comparison section for generating and outputting a coefficient renewal control signal for renewing the passband filter coefficients when a counted value of the counter is N.

* * * * *